(12) United States Patent
Connard, III

(10) Patent No.: US 10,265,882 B2
(45) Date of Patent: Apr. 23, 2019

(54) DUAL CONTAINER CONCRETE MIXING TRANSPORT TRUCK CHUTE WASHOUT SYSTEM

(71) Applicant: Leslie R. Connard, III, Upland, CA (US)

(72) Inventor: Leslie R. Connard, III, Upland, CA (US)

( * ) Notice: Subject to any disclaimer, the term of this patent is extended or adjusted under 35 U.S.C. 154(b) by 0 days.

(21) Appl. No.: 15/934,145

(22) Filed: Mar. 23, 2018

(65) Prior Publication Data

US 2018/0250848 A1 Sep. 6, 2018

Related U.S. Application Data

(63) Continuation-in-part of application No. 14/611,058, filed on Jan. 30, 2015, now Pat. No. 9,937,636.

(51) Int. Cl.
| | |
|---|---|
| *B03B 9/06* | (2006.01) |
| *B08B 3/04* | (2006.01) |
| *B28C 5/42* | (2006.01) |
| *B01F 13/00* | (2006.01) |
| *B01F 15/00* | (2006.01) |
| *B08B 17/02* | (2006.01) |
| *B65G 11/02* | (2006.01) |

(52) U.S. Cl.
CPC ........ *B28C 5/4203* (2013.01); *B01F 13/0035* (2013.01); *B01F 15/00025* (2013.01); *B03B 9/063* (2013.01); *B08B 17/025* (2013.01); *B01F 2215/0047* (2013.01); *B08B 3/04* (2013.01); *B65G 11/026* (2013.01)

(58) Field of Classification Search
CPC ............ B01F 13/0035; B01F 15/00025; B01F 2215/0047; B03B 9/063; B08B 17/025; B08B 3/04; B28C 5/4203; B65G 11/026
See application file for complete search history.

(56) References Cited

U.S. PATENT DOCUMENTS

| | | | |
|---|---|---|---|
| 3,606,278 A | 9/1971 | Jackson | |
| 3,951,572 A | 4/1976 | Ray, Jr. et al. | |
| 5,685,978 A * | 11/1997 | Petrick | .................. B01D 29/03 |
| | | | 210/241 |
| 5,741,065 A | 4/1998 | Bell et al. | |
| 5,836,456 A | 11/1998 | Lappin et al. | |
| 6,000,645 A * | 12/1999 | Preisser | .................. B03B 9/063 |
| | | | 241/41 |

(Continued)

*Primary Examiner* — Tony G Soohoo
(74) *Attorney, Agent, or Firm* — Karish & Bjorgum, PC

(57) ABSTRACT

A dual container concrete mixing transport truck chute washout system with (a) a chute attachable funnel container having an open mouth with an upper rim, an attachment for detachably attaching the funnel container below an exit end of a concrete truck concrete chute, and a material outlet connector to drain liquid and debris from the funnel container, and (b) a truck mountable holding container having an upper portion that is adapted to store the funnel container when the funnel container is not affixed to the chute, a lower portion for collection of fluid and solid materials, a seat located between the upper space and the lower portion, a material inlet connector, and a fluid drain valve for draining fluid from the holding container, wherein the upper rim of the funnel container is adapted to sit on the seat of the holding container to act as a lid.

15 Claims, 62 Drawing Sheets

(56) References Cited

U.S. PATENT DOCUMENTS

| | | | |
|---|---|---|---|
| 6,155,277 A | 12/2000 | Barry | |
| 6,325,311 B1* | 12/2001 | Preisser | B03B 9/063 |
| | | | 241/299 |
| 6,354,439 B1 | 3/2002 | Arbore | |
| 6,758,590 B1 | 7/2004 | Black | |
| 6,866,047 B1 | 3/2005 | Marvin | |
| 7,077,559 B2 | 7/2006 | Hlavinka et al. | |
| 7,117,995 B2* | 10/2006 | Connard, III | B28C 5/4203 |
| | | | 209/421 |
| 7,296,919 B2 | 11/2007 | Petersen et al. | |
| 7,479,225 B1* | 1/2009 | Venable | B03B 9/063 |
| | | | 210/250 |
| 7,506,672 B2* | 3/2009 | Manno | B03B 9/063 |
| | | | 134/104.4 |
| 7,594,524 B2* | 9/2009 | DeCollibus | B03B 9/063 |
| | | | 134/104.4 |
| 7,635,010 B1* | 12/2009 | Manno | B08B 3/006 |
| | | | 134/104.4 |
| 7,913,704 B1* | 3/2011 | Abney, Sr. | B01D 21/0012 |
| | | | 134/109 |
| 8,080,111 B1* | 12/2011 | Abney | B01D 21/0012 |
| | | | 134/10 |
| 8,083,394 B2* | 12/2011 | Fischer | B08B 9/08 |
| | | | 366/41 |
| 8,734,587 B2* | 5/2014 | Pruyn | B28C 5/4203 |
| | | | 134/10 |
| 8,931,495 B1* | 1/2015 | Abney, Sr. | B03B 9/063 |
| | | | 134/104.2 |
| 2002/0117427 A1* | 8/2002 | Arbore | B01D 29/05 |
| | | | 209/421 |
| 2002/0163142 A1* | 11/2002 | Silbernagel | B28C 5/4203 |
| | | | 280/6.151 |
| 2004/0036236 A1* | 2/2004 | Silbernagel | B28C 5/4203 |
| | | | 280/6.151 |
| 2004/0040916 A1* | 3/2004 | Ruppert | B03B 9/063 |
| | | | 210/805 |
| 2004/0159595 A1* | 8/2004 | Connard, III | B28C 5/4203 |
| | | | 209/680 |
| 2005/0213422 A1* | 9/2005 | Silbernagel | B28C 5/4203 |
| | | | 366/28 |
| 2006/0000490 A1* | 1/2006 | Barragan | B08B 3/02 |
| | | | 134/10 |
| 2006/0180507 A1* | 8/2006 | DeHart | B01D 21/02 |
| | | | 209/311 |
| 2006/0266390 A1* | 11/2006 | Lake | B08B 3/02 |
| | | | 134/104.2 |
| 2007/0002677 A1* | 1/2007 | DeCollibus | B03B 9/063 |
| | | | 366/68 |
| 2007/0062941 A1* | 3/2007 | Jenkins | B08B 17/00 |
| | | | 220/23.87 |
| 2007/0086270 A1* | 4/2007 | Harris | B08B 9/08 |
| | | | 366/59 |
| 2007/0256712 A1* | 11/2007 | McCormick | B08B 17/00 |
| | | | 134/34 |
| 2007/0272271 A1* | 11/2007 | Petrowich | B03B 9/063 |
| | | | 134/10 |
| 2007/0272303 A1* | 11/2007 | Vizl | B03B 9/063 |
| | | | 137/313 |
| 2008/0175092 A1* | 7/2008 | Manno | B03B 9/063 |
| | | | 366/68 |
| 2008/0196746 A1* | 8/2008 | Jenkins | B08B 17/00 |
| | | | 134/22.1 |
| 2009/0020534 A1* | 1/2009 | Adamucci, Jr. | B03B 9/063 |
| | | | 220/501 |
| 2009/0045193 A1* | 2/2009 | Jenkins | B08B 17/00 |
| | | | 220/23.87 |
| 2010/0051062 A1* | 3/2010 | Fischer | B08B 9/08 |
| | | | 134/23 |
| 2010/0111449 A1* | 5/2010 | Noble | B08B 17/00 |
| | | | 383/22 |
| 2010/0232253 A1* | 9/2010 | Lundberg | B08B 9/00 |
| | | | 366/68 |
| 2010/0294730 A1* | 11/2010 | Weston | B03B 9/063 |
| | | | 210/767 |
| 2011/0197980 A1* | 8/2011 | Sullivan | B03B 9/063 |
| | | | 137/544 |
| 2012/0037231 A1* | 2/2012 | Janson | B03B 9/063 |
| | | | 137/1 |
| 2012/0111364 A1* | 5/2012 | Pruyn | B08B 3/04 |
| | | | 134/10 |
| 2014/0042656 A1 | 2/2014 | Schuran | |
| 2014/0332546 A1* | 11/2014 | Connard | B08B 17/025 |
| | | | 220/789 |
| 2016/0114497 A1* | 4/2016 | McFarlane | B03B 9/063 |
| | | | 210/435 |
| 2016/0221218 A1* | 8/2016 | Connard, III | B28C 5/4203 |
| 2016/0221221 A1* | 8/2016 | Connard, III | B28C 5/4203 |
| 2017/0066551 A1* | 3/2017 | Sosa | B08B 17/025 |
| 2017/0072916 A1* | 3/2017 | Beck, III | B60S 1/64 |
| 2017/0225204 A1* | 8/2017 | Silkwood | B08B 17/025 |
| 2018/0194035 A1* | 7/2018 | McFarlane | B03B 9/063 |
| 2018/0250848 A1* | 9/2018 | Connard, III | B28C 5/4203 |

* cited by examiner

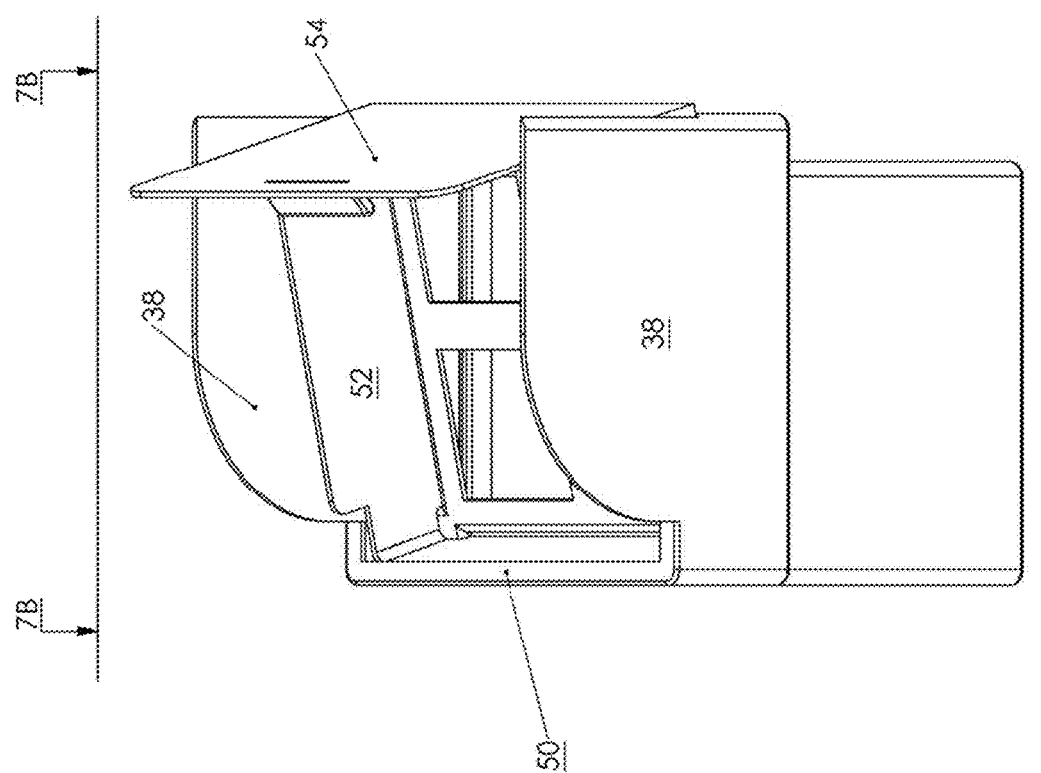

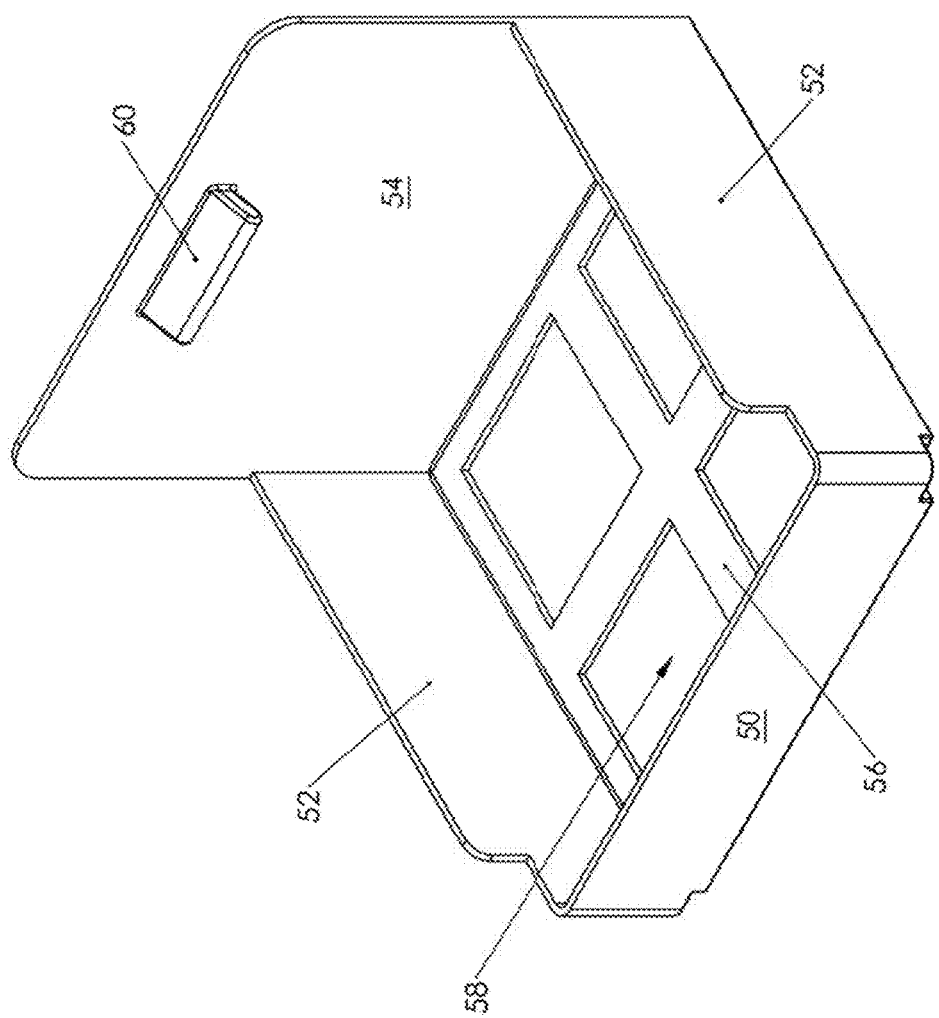

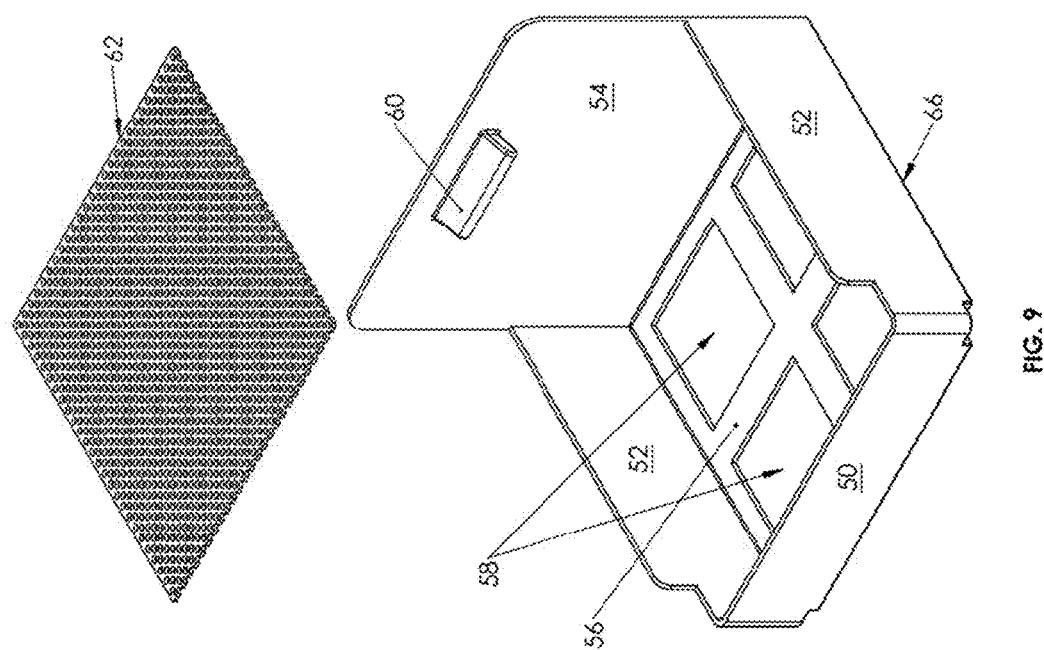

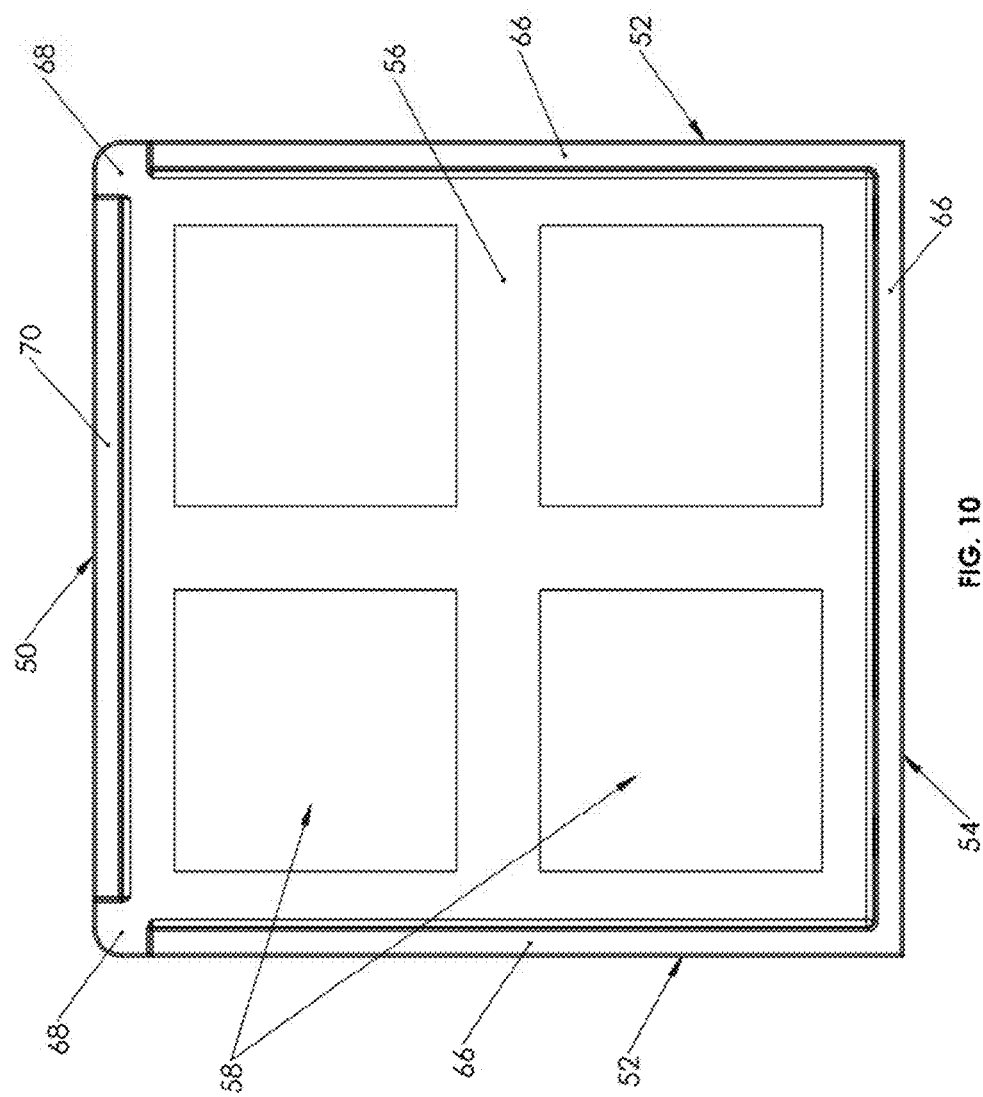

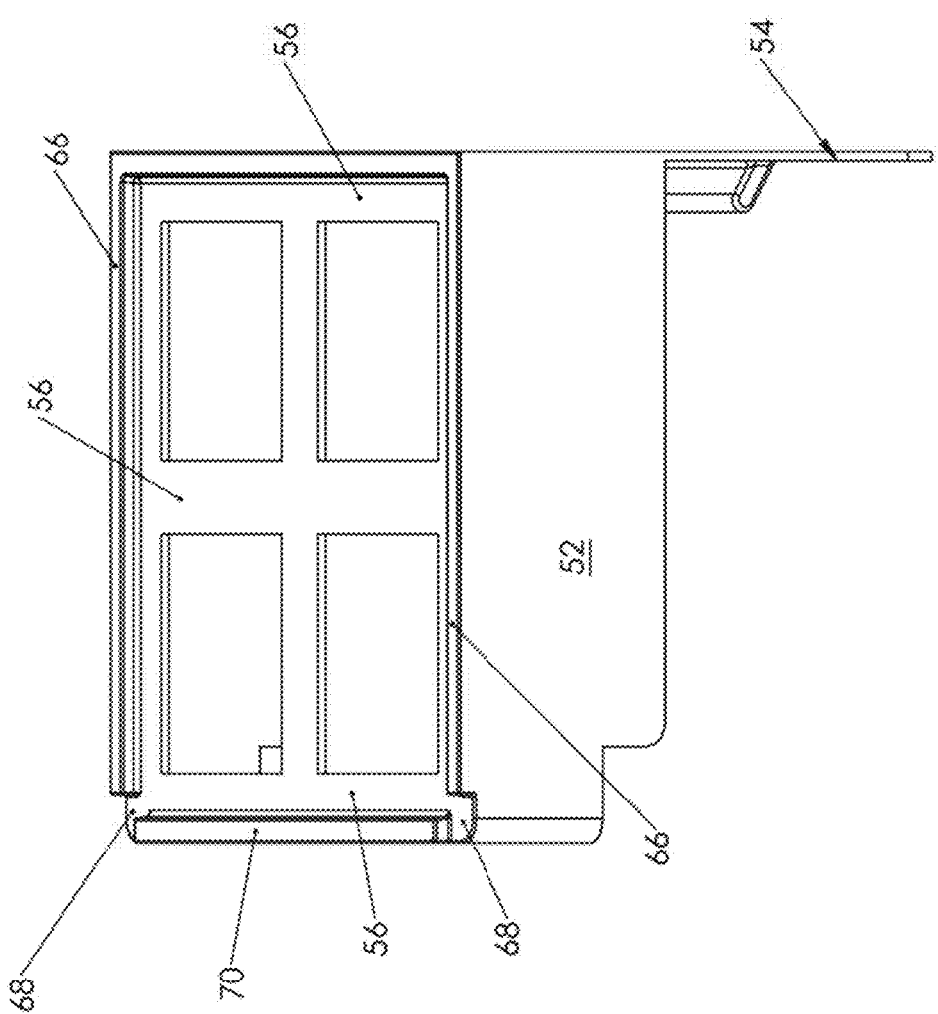

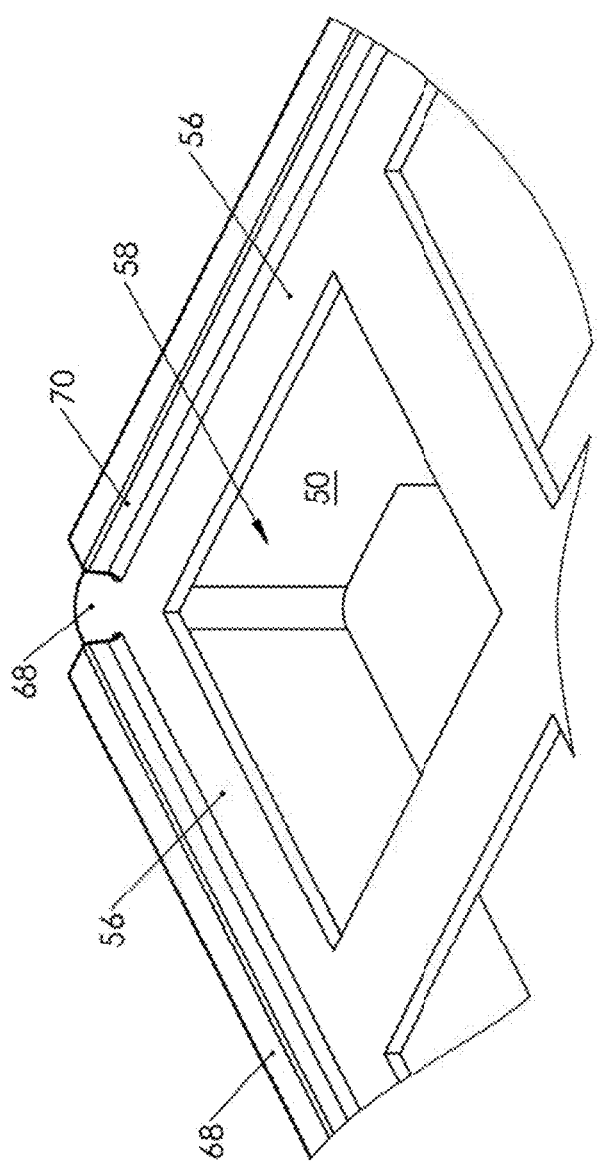

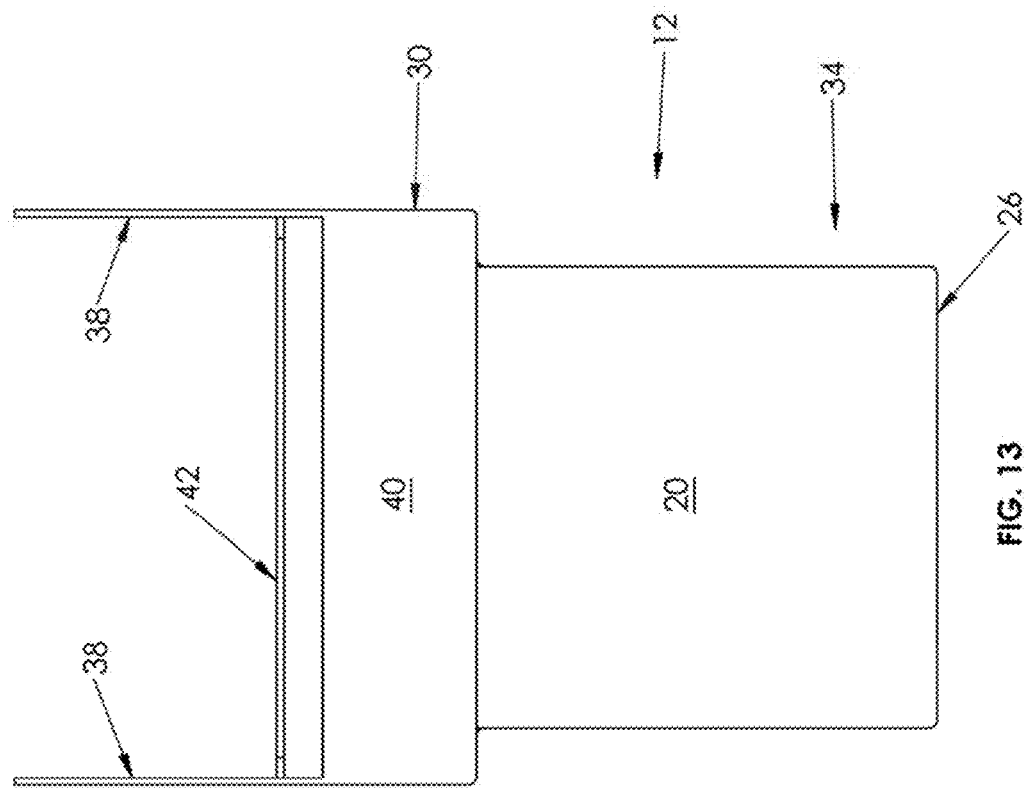

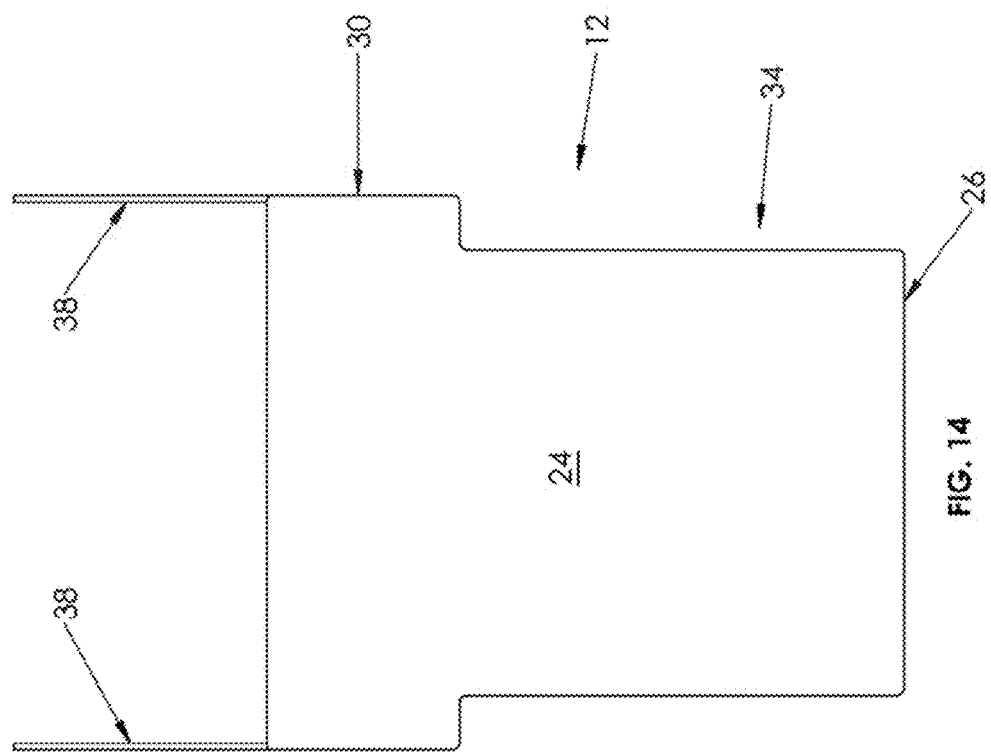

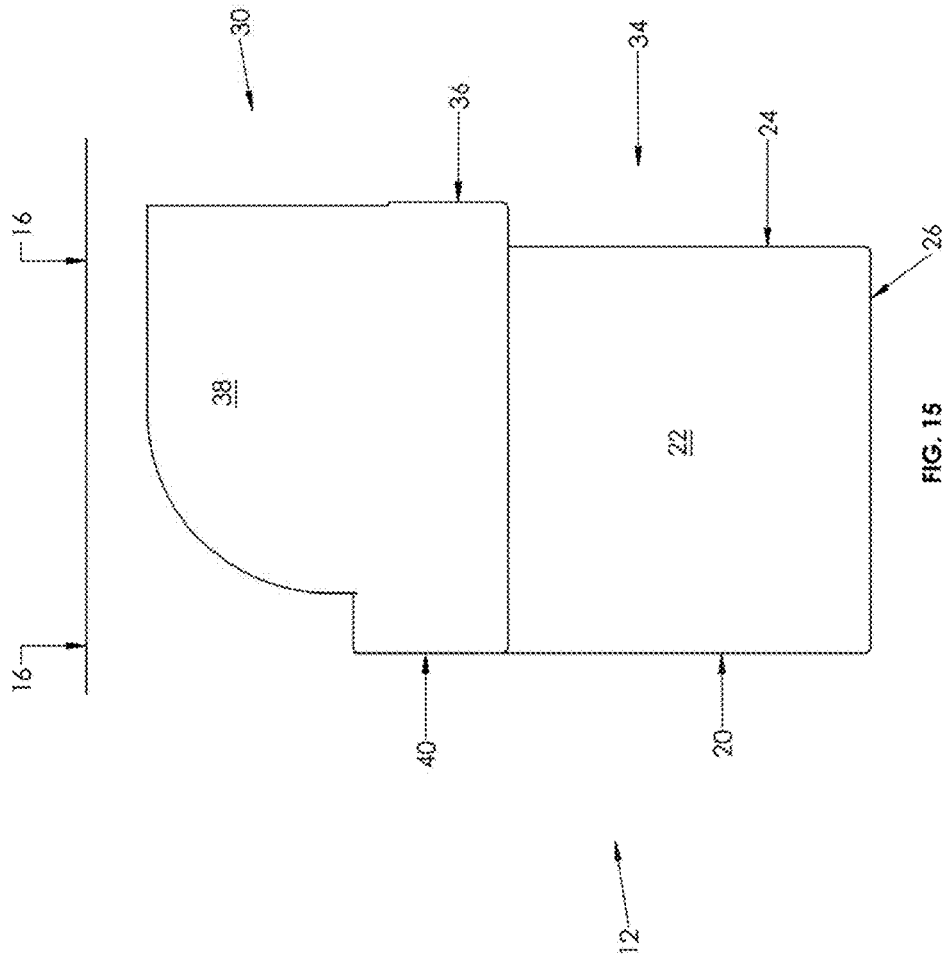

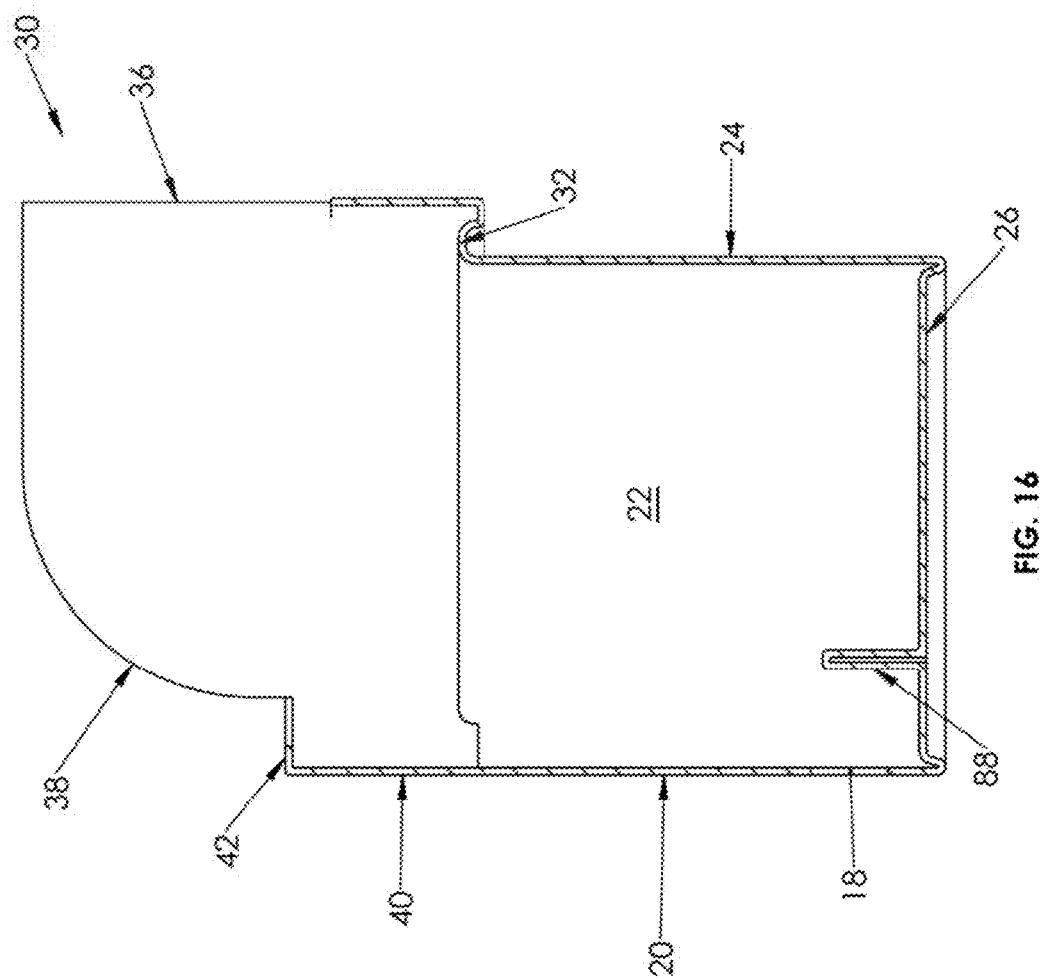

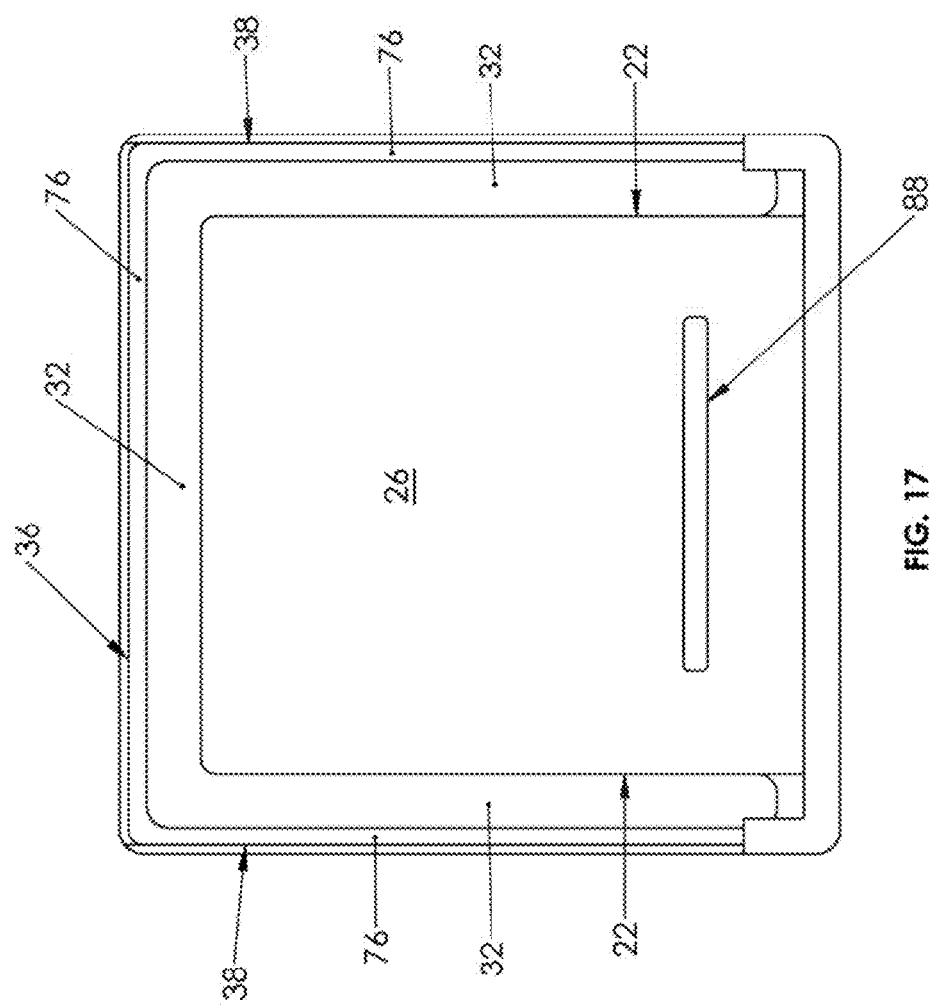

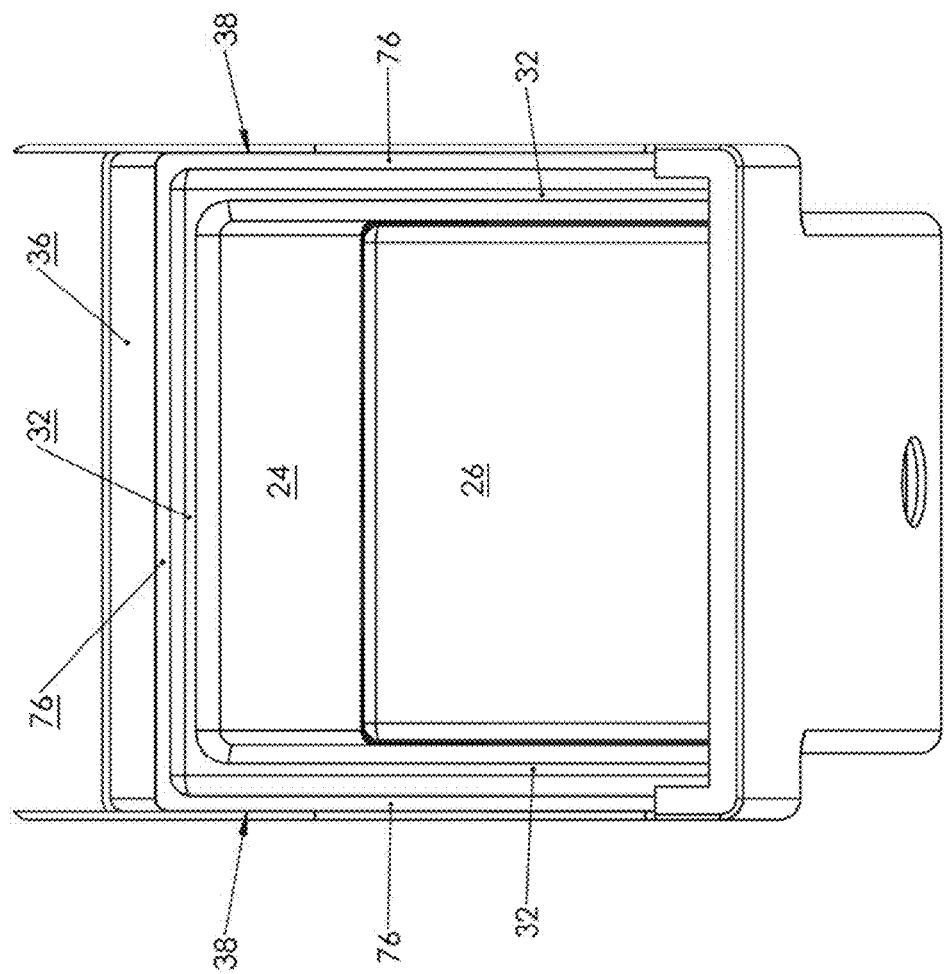

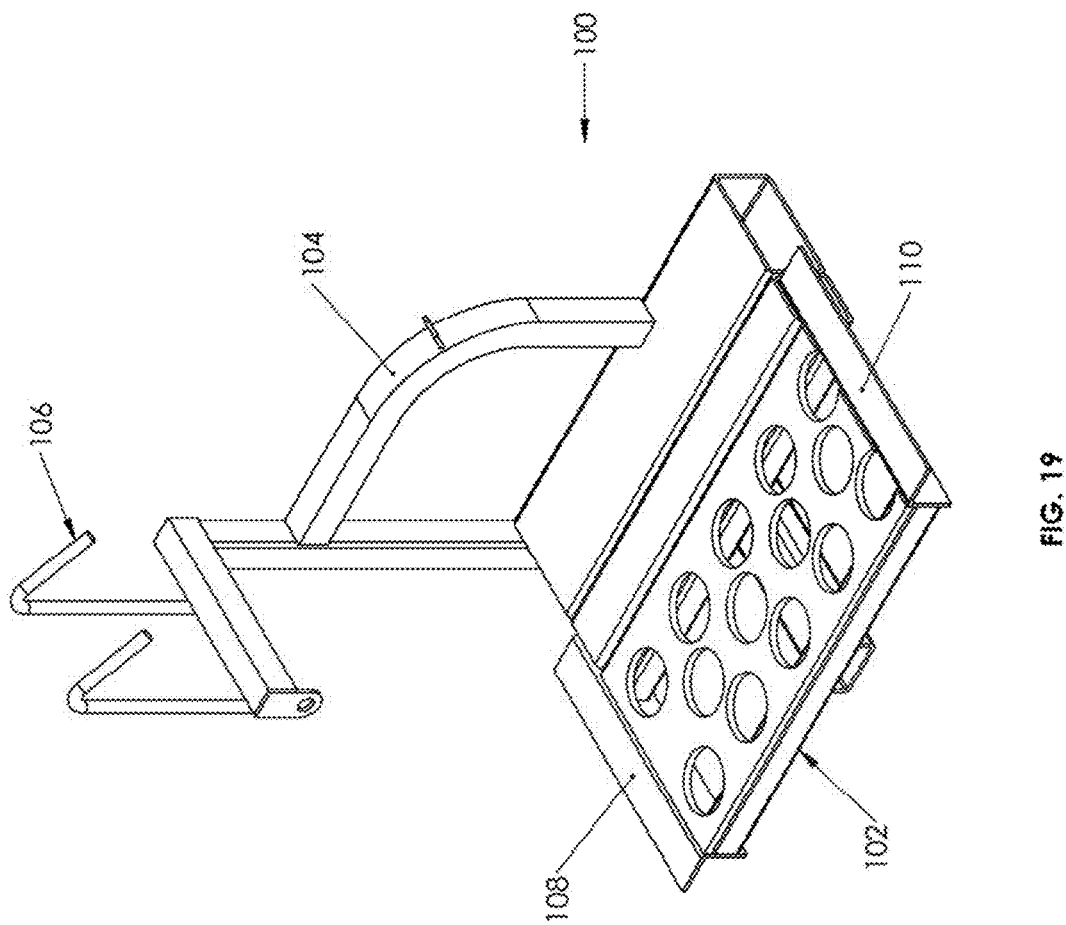

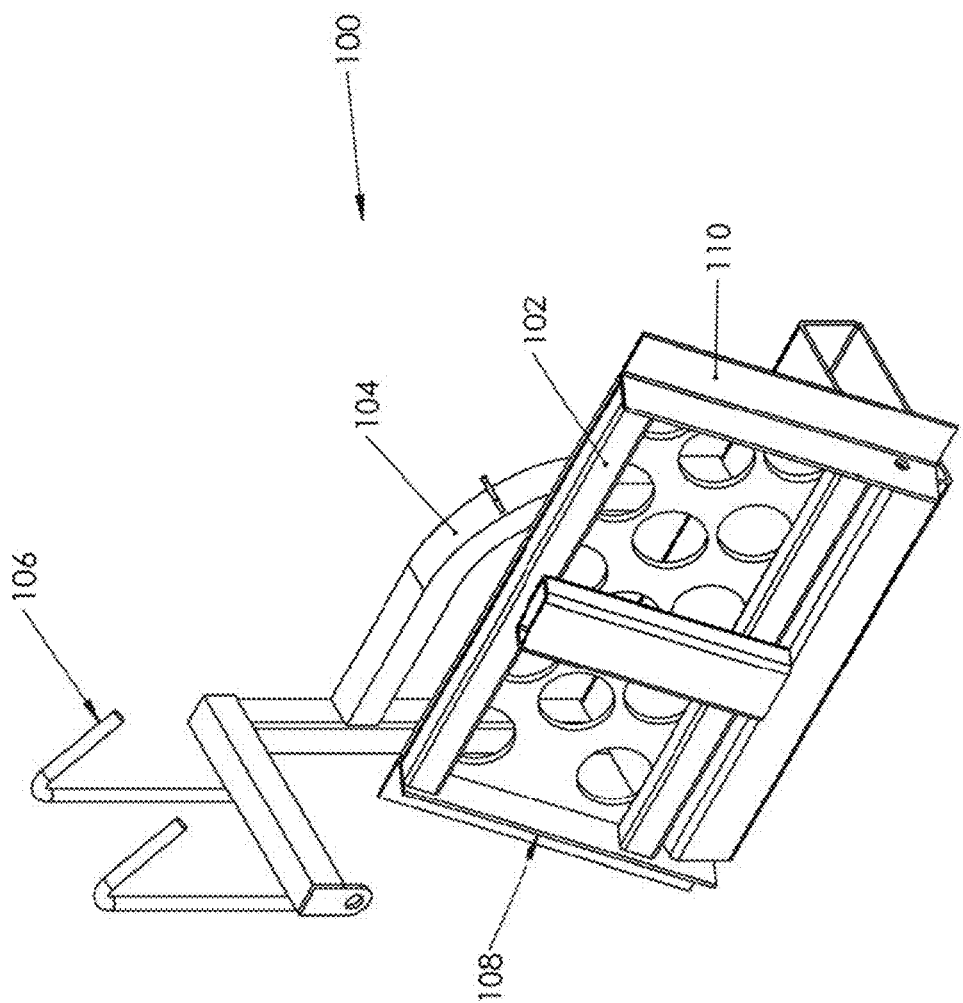

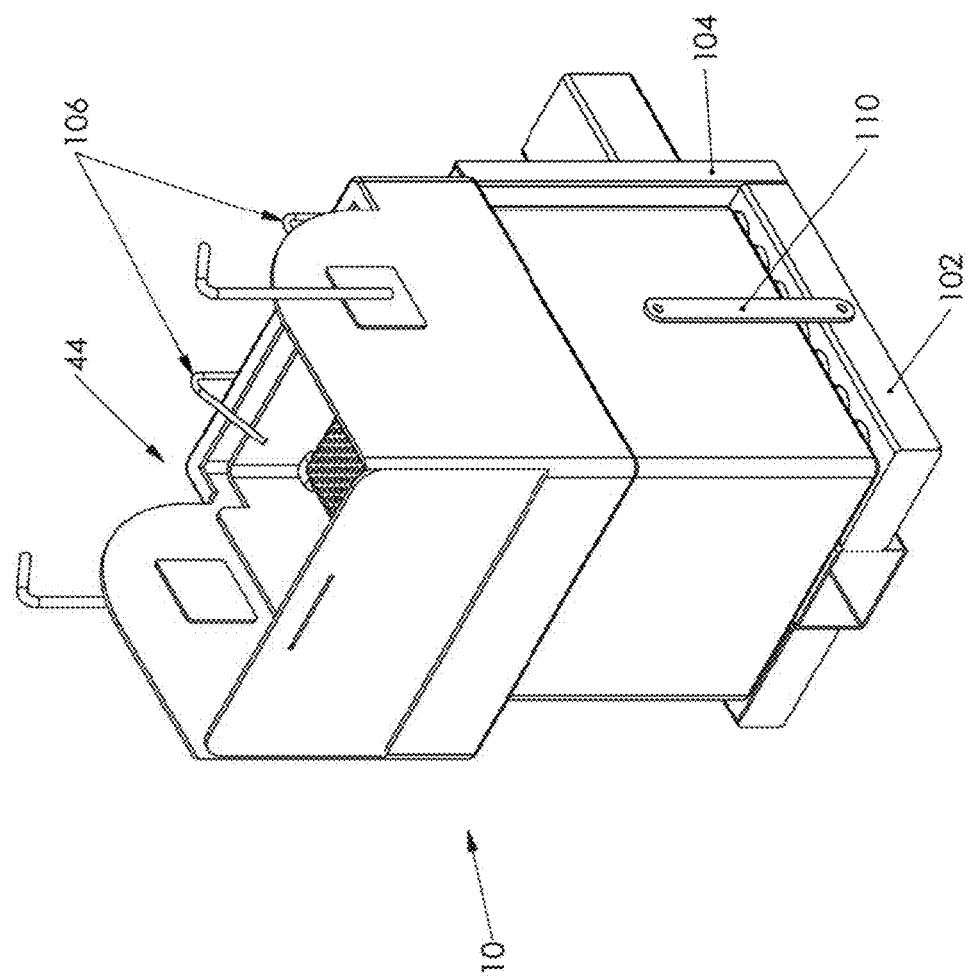

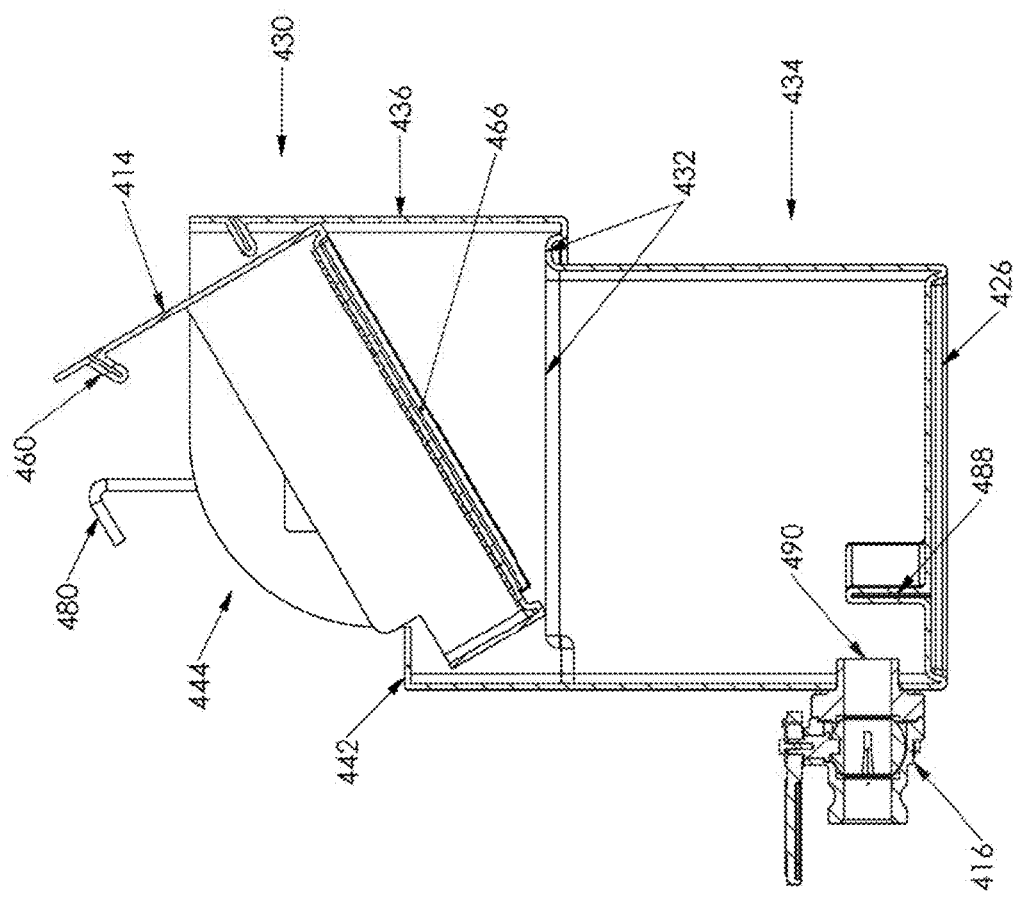

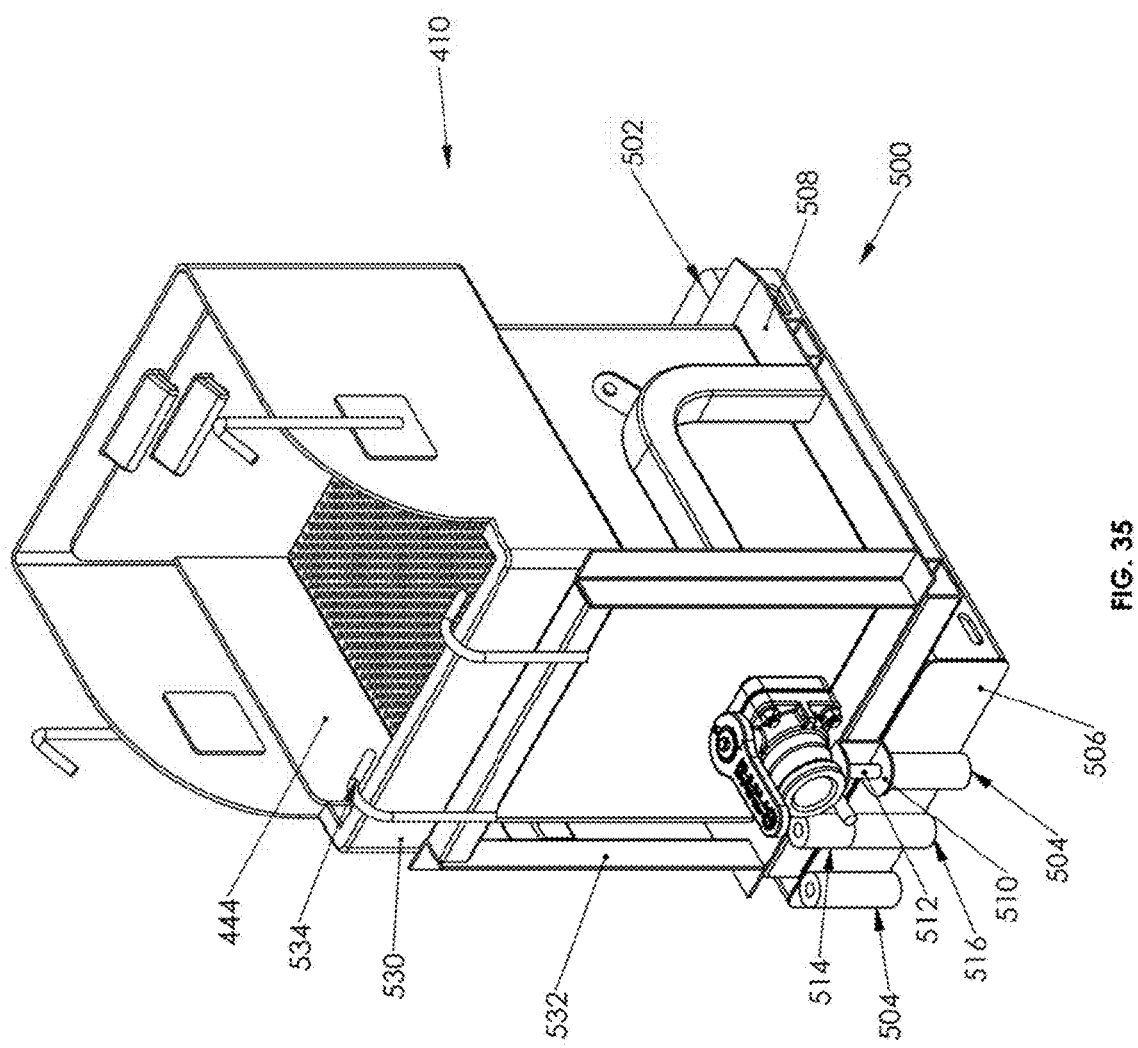

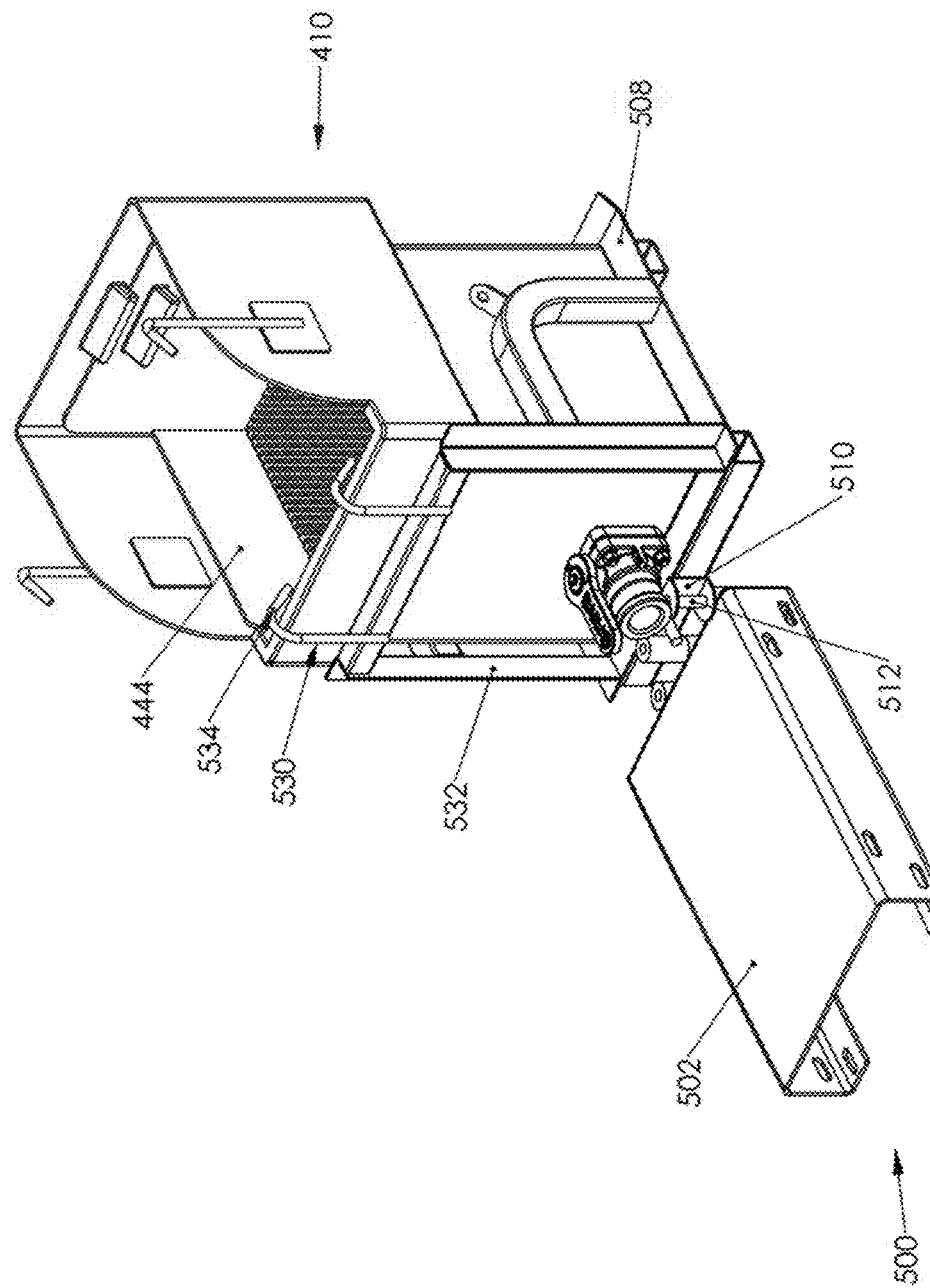

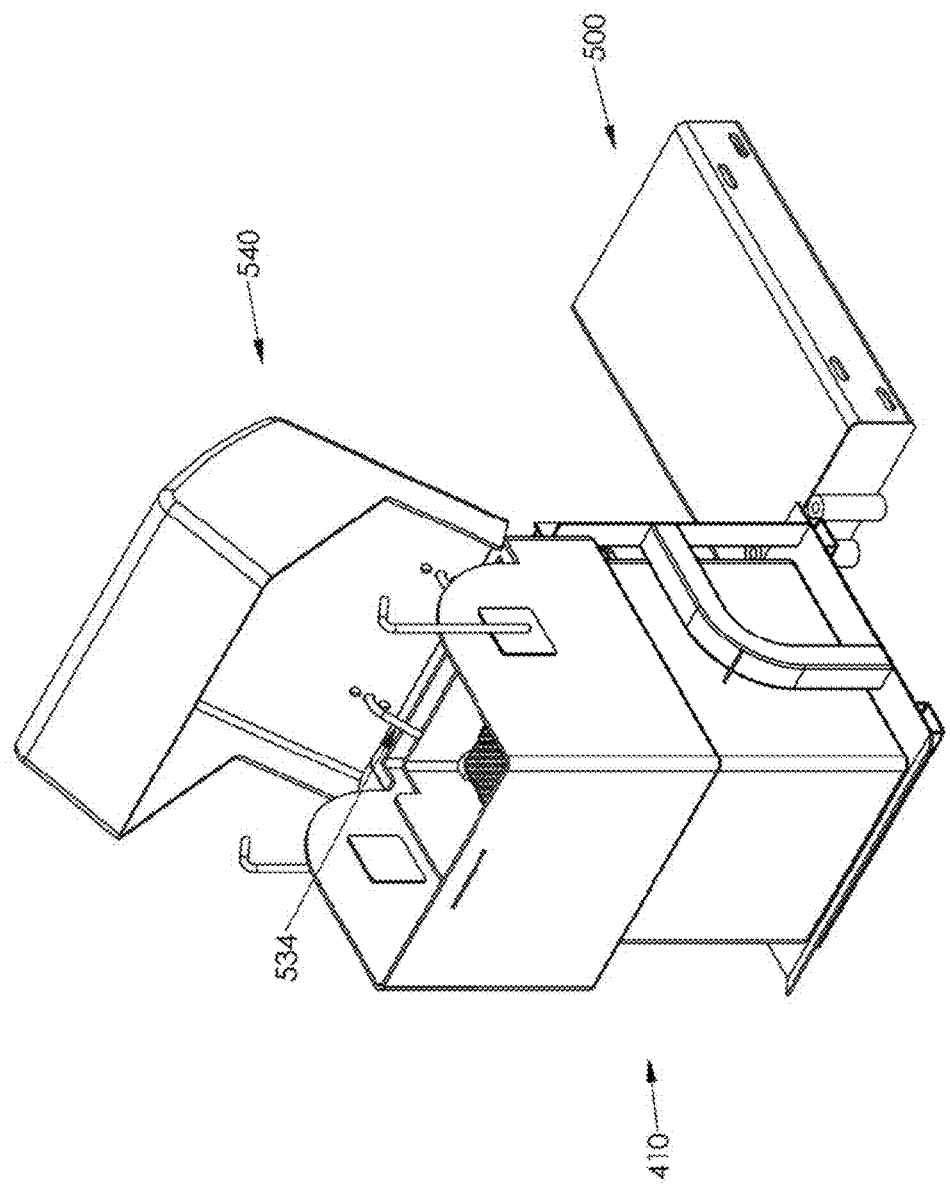

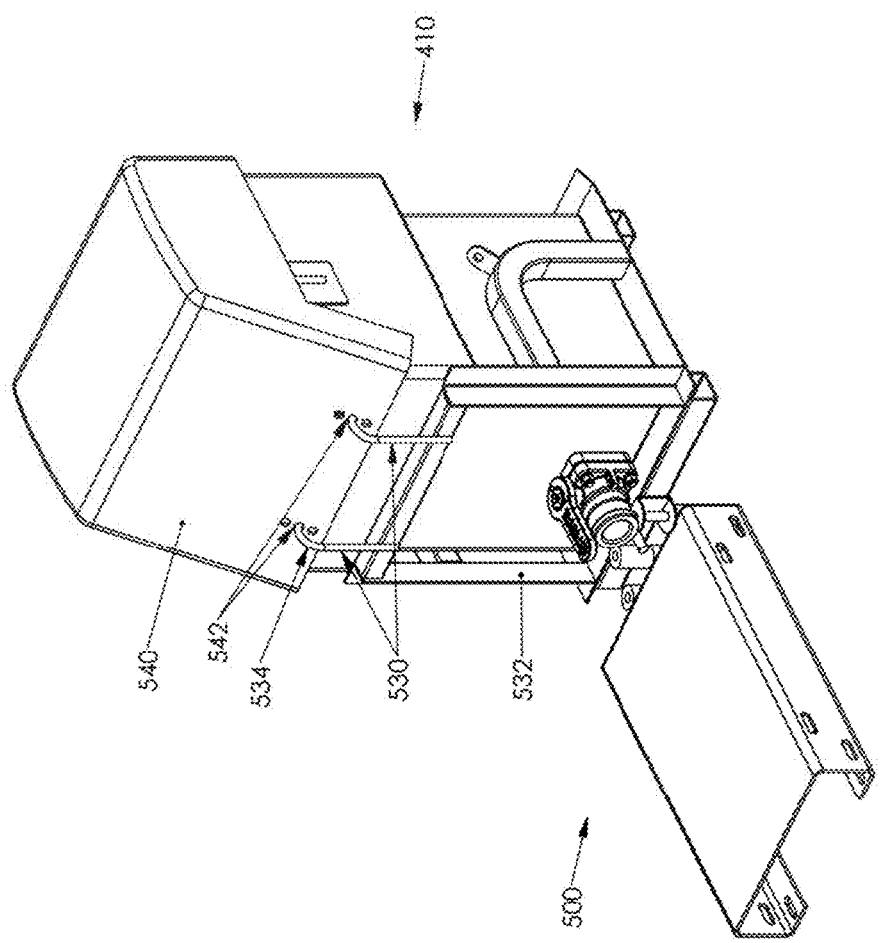

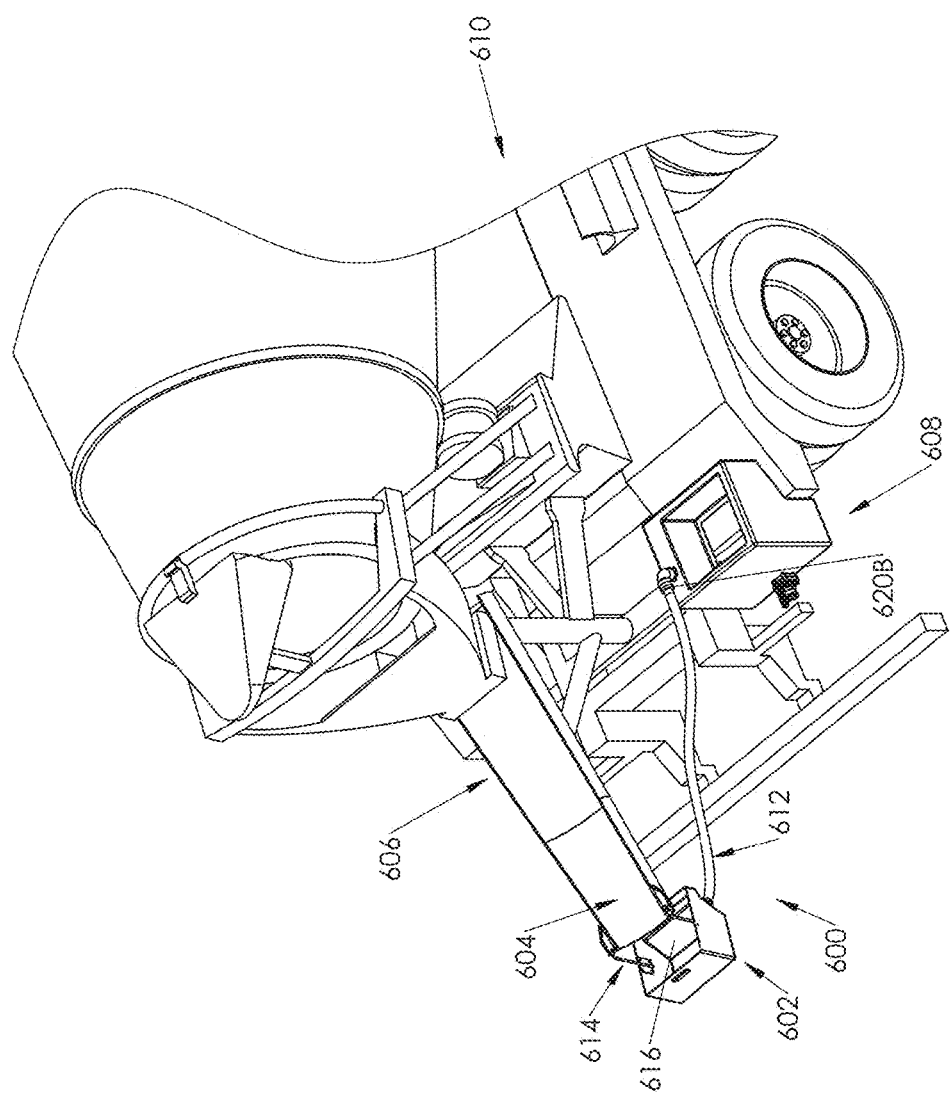

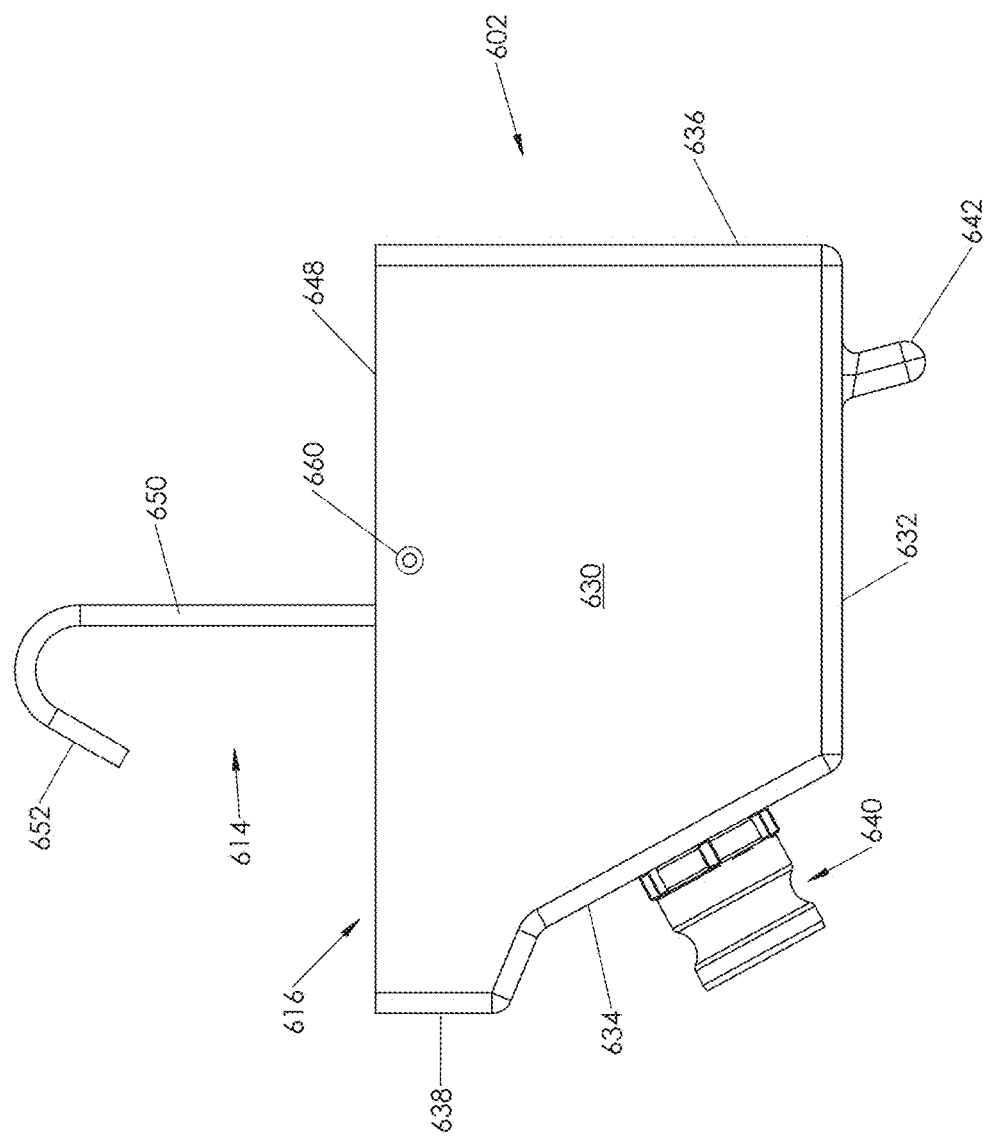

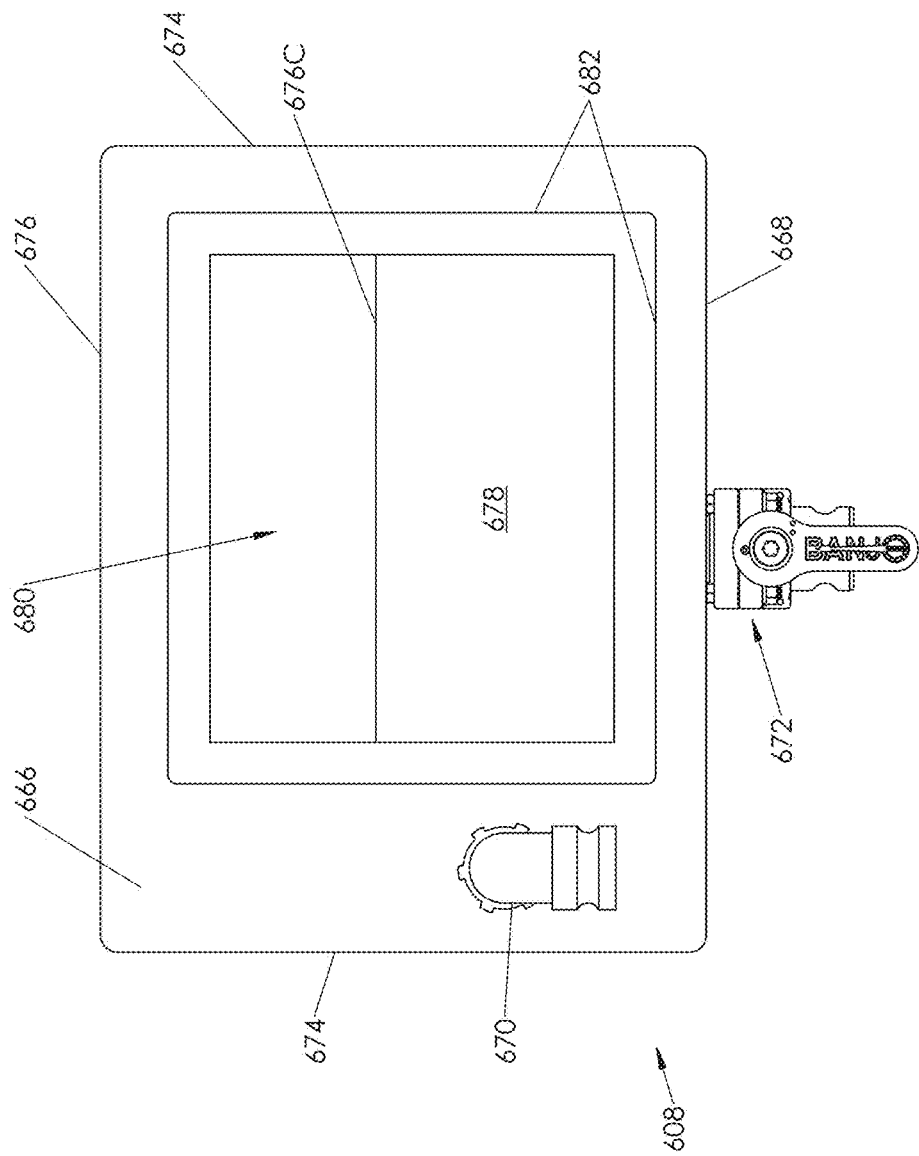

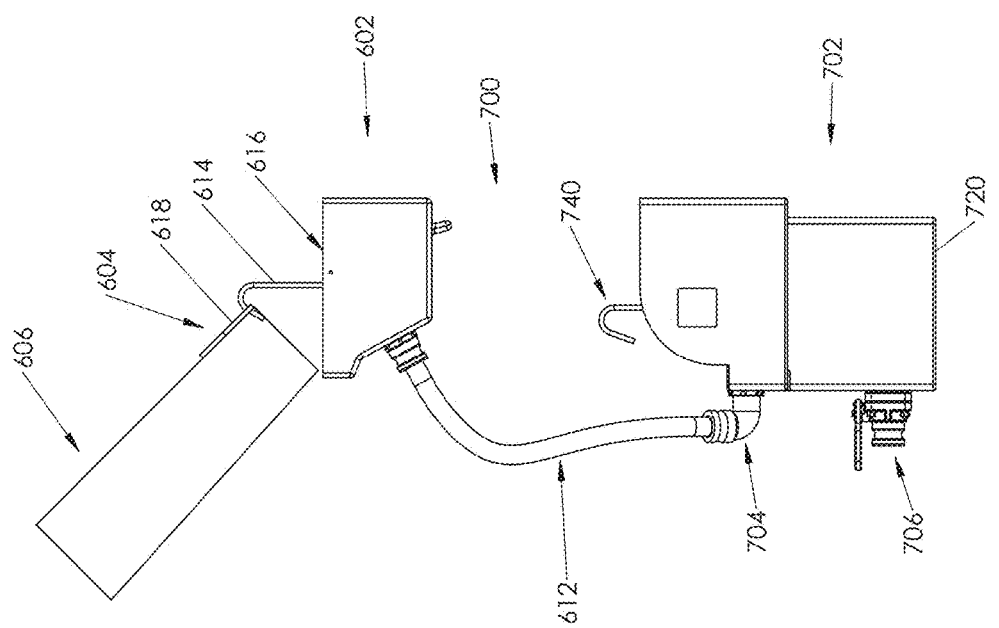

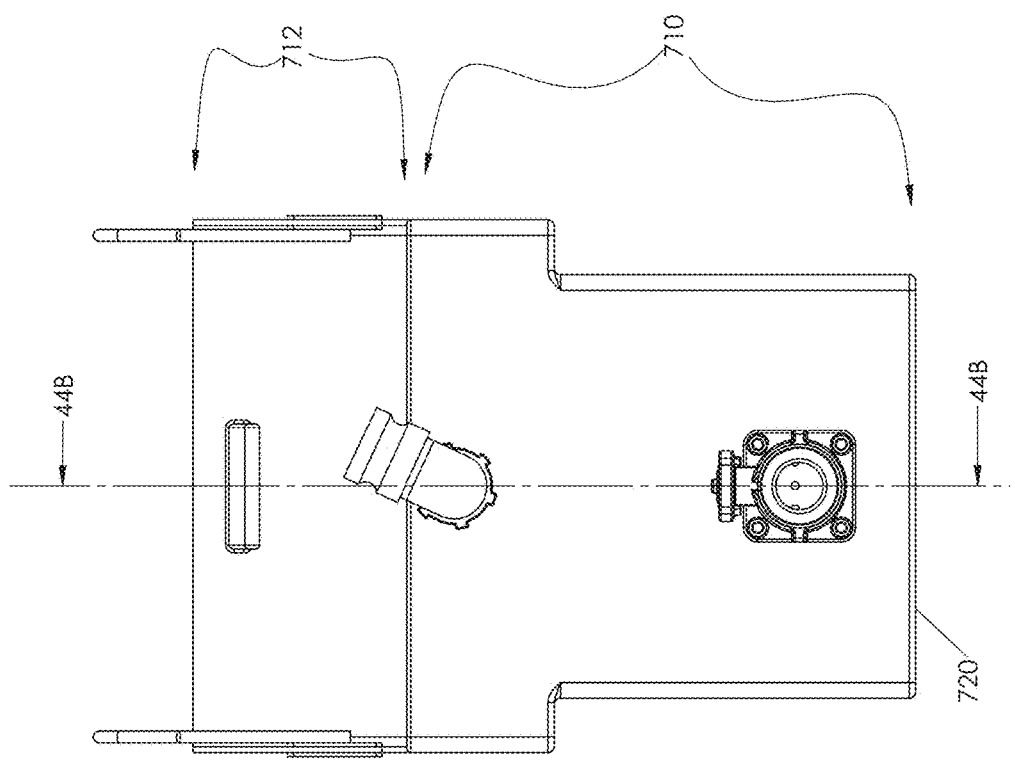

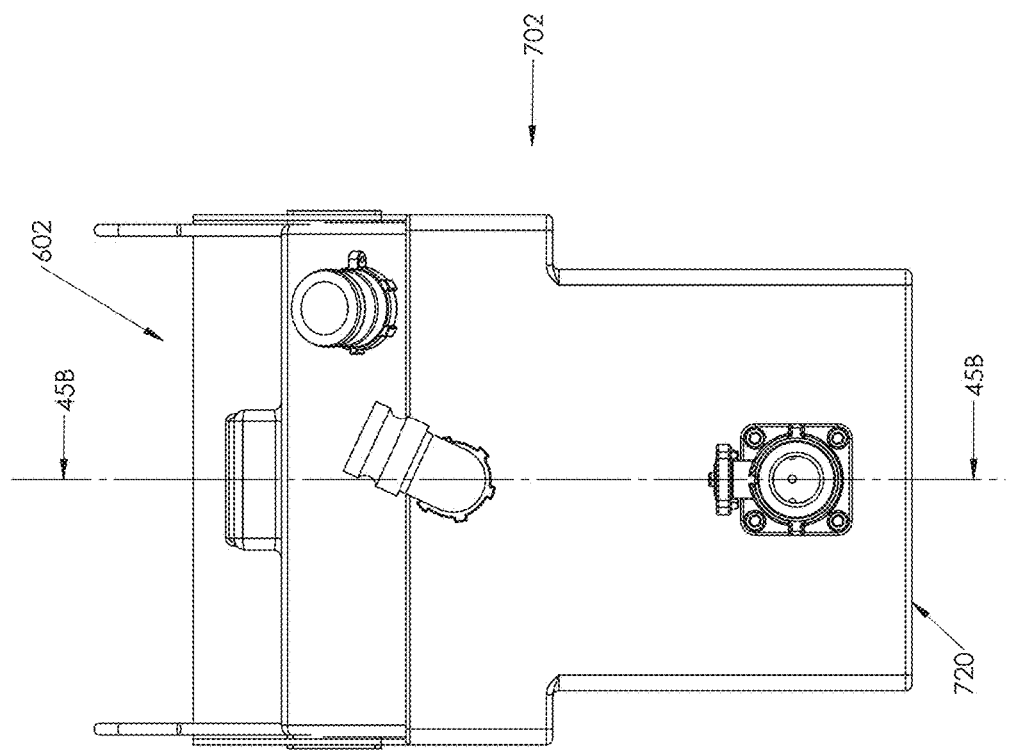

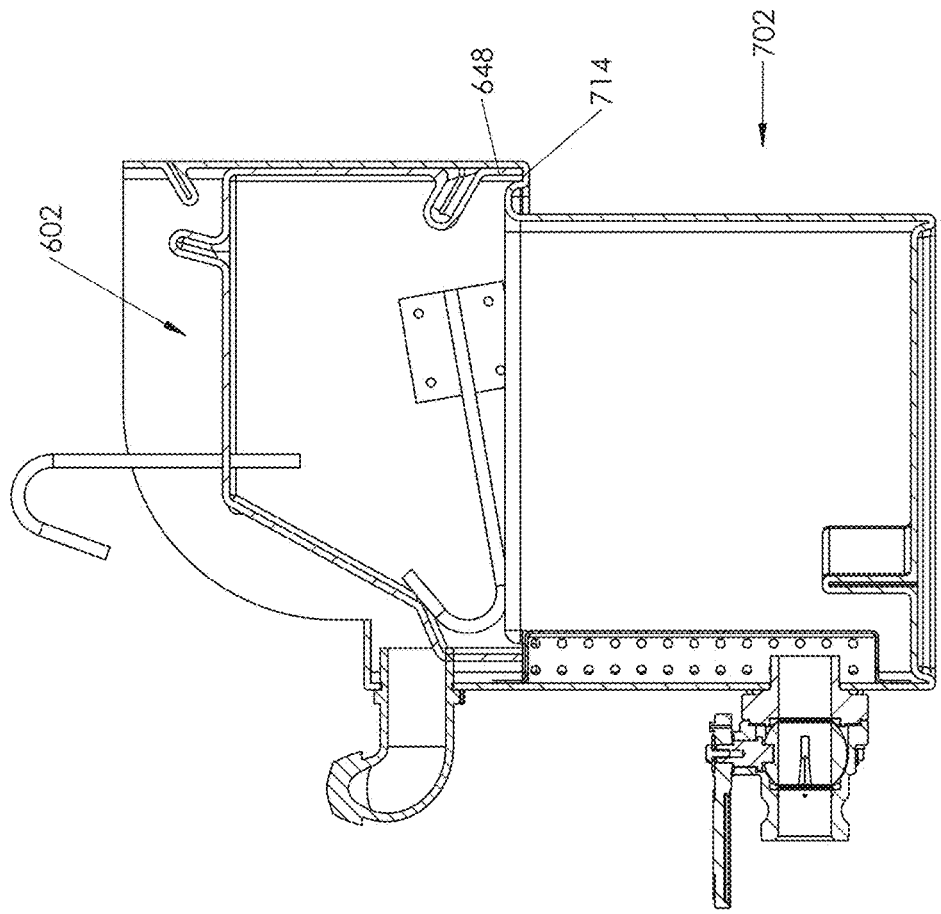

DUAL CONTAINER CONCRETE MIXING TRANSPORT TRUCK CHUTE WASHOUT SYSTEM

CROSS REFERENCE TO RELATED APPLICATION

This patent application is a continuation-in-part and claims priority to U.S. patent application Ser. No. 14/611,058, filed on Jan. 30, 2015, and having the title of "CONCRETE MIXING TRANSPORT TRUCK CHUTE WASHOUT SYSTEM".

FIELD OF THE INVENTION

The invention relates to devices and systems for washing out concrete mixing transport trucks (commonly referred to as "concrete trucks"), and more precisely to a dual container concrete mixing transport truck chute washout system.

BACKGROUND OF THE INVENTION

Concrete is an amalgam of various materials, including water, aggregate (e.g., sand and gravel), and cement, and may include fly ash, fiberglass, chemicals and other additives depending upon the concrete processing plant's abilities and the intended end uses. Concrete is commonly transported to a construction site in concrete mixing transport trucks. The concrete within the delivery vehicles can be loaded at a concrete ready mix facility and prepared and retained within a large rotatable mixing drum. During transportation within the mixing drum, the concrete is in a wet, relatively fluid state. More recently volumetric delivery trucks have come into use where the various separate and unmixed concrete ingredients are separately stored in the truck and are mixed together at the job site as needed to provide the perfect quantity and quality of cement as required.

Regardless of how the concrete is made and delivered, at the construction site, the wet concrete mixture is typically gravitated from the delivery vehicle via pour chutes, which includes a main chute that extends downwardly from an exit of the drum or the concrete feeder, a flop over chute that is hinged to the distal end of the main chute, and sometimes chute extensions. The wet concrete fed from the chutes is poured either directly into the forms at the job site or is channeled into a concrete pump.

After the concrete mixture has been poured from the delivery vehicle, wet concrete mixture commonly continues to adhere to the pour chutes. In the past, it was common practice for contractors and concrete delivery drivers to hose off the remaining wet concrete mixture on the chutes (and even inside the drum) and allow the now diluted concrete to run onto the ground, onto the street, road, or storm drains systems. However, the rinse water used to clean the pour chutes is considered a groundwater contaminant, can cause substantial damage to storm drain systems, and it more or less universally prohibited across the U.S. and many foreign countries. Consequently, environmental laws generally prohibit the disbursal of such rinse waters and runny concrete onto the ground or at the construction side, unless it is deposited in special receiving pools, tanks, and the like. All such rinse waters must be recouped and recycled without being allowed to flow into streets, storm drains or gutters or allowed to percolate into the soil.

Indeed, one way of dealing with concrete mixture rinse waters at large construction sites is to deposit such rinse waters in a prefabricated lined evaporation pit. The construction of a prefabricated evaporation pit at smaller commercial and residential construction sites is not practical, however. U.S. Pat. Nos. 5,741,065, 6,155,277 and 6,354,439 disclose a variety of equipment for allowing the removal of concrete chute rinse water in the delivery vehicle. However, each such proposed equipment requires the use of expensive and bulky hydraulic, pneumatic or electrical components which must be carried on the delivery vehicle. Such hydraulic or electrical components are expensive to purchase and maintain and awkward to carry on the delivery vehicle. Also, such hydraulic, pneumatic or electrical components leave the driver of the delivery vehicle vulnerable to hydraulic, pneumatic and electrical system failures which would prevent use of the equipment at the construction site. Still further, proposed equipment in the prior art frequently suffers from leakage of contaminated water during the disconnecting of hoses from collection vessels. Finally, several of the proposed equipment requires the use of the vehicle's mixing drum to store the recovered rinse water. Storing such rinse water in the mixing drum can adversely affect the integrity of the next load of concrete mixture prepared and transported within the mixing drum, unless the rinse water is thoroughly drained from the mixing drum prior to the preparation of the next batch of concrete mixture. From a practical standpoint, this is a major disadvantage of such proposed equipment because there is a strong temptation among individual concrete mixture preparation personnel to reuse the rinse water (already in the mixing drum) rather than to take the time to thoroughly drain and reconstitute the rinse water and to replace it in the mixing drum with fresh water.

With this in mind, the inventor previously invented and patented as U.S. Pat. No. 7,117,995 a concrete reclamation apparatus. This prior invention is useful for in the separation of solids from a diluted, wet, concrete mixture. This prior device includes (a) a free-standing first container with a drain port and a top opening, (b) a strainer disposed within the first container, (c) a drain port shut-off valve, (d) a second container capable of providing a reservoir for recovered liquid, and (e) a transfer conduit (a hose) for allowing effluent from the drain port of the first container to be gravity feed into the second container. While Applicant's prior system does provide excellent utility, its use requires numerous steps, as follows. A user will need to detach the free-standing first container from a truck mounted rack on hang in on the end of the concrete chute (with provided hooks), connect the transfer conduit between the free-standing first container and the second container (typically retained on the truck), and wash concrete debris on the chutes into the first container. Thereafter, the first container is elevated by raising the pour chute until the drain port of the first container is higher in elevation than the inlet port of the second container. At this point, the first container drain port shut-off valve is opened and the liquid effluent within the second portion of the first container is allowed to gravitate from the first container to the second container. After the first container has been drained, and all effluent has flowed from the first container to the second container via the transfer conduit, the drain port shut-off valve is closed, and the transfer conduit is disconnected from the two containers and stored away. At this point, the user will disengage the free-standing first container from the end of a chute and re-secure it on the concrete truck.

All of these steps require time, effort, and care. Users will need to exercise caution to avoid overfilling the second container since if it is overfilled, the transfer conduit will be full of effluent and this will need to be specially handled to avoid spillage. If more rinse water is needed than is capable of being stored in second container, user may choose to retainer some of the resulting effluent in the first container. If this is the case, a worker will need to lift and move what can be a very heavy effluent and aggregate filled first container from the end of the chute, and reposition it on the truck.

Accordingly, there is a need for a concrete reclamation apparatus which avoids the aforementioned problems in the prior art in an efficient and inexpensive manner.

SUMMARY OF THE INVENTION

The present invention provides a dual container concrete mixing transport truck chute washout system, comprising a chute attachable funnel container having an open mouth with an upper rim, an attachment for detachably attaching the funnel container below an exit end of a concrete truck concrete chute, and a material outlet connector to drain liquid and debris from the funnel container; and a truck mountable holding container having an upper space that is adapted to store the funnel container when the funnel container is not affixed to the chute, a lower portion for collection of fluid and solid materials, a seat, a material inlet connector, and a fluid drain valve for draining fluid from the holding container, wherein the upper rim of the funnel container is adapted to sit on the seat of the holding container to act as a lid.

The present invention further provides a dual container concrete mixing transport truck chute washout system, comprising: a chute attachable funnel container having a pair of opposing side walls, a back wall, a front wall, and a bottom wall, the tops of the opposing side walls, the back wall, and the front wall terminating in an upper rim which defines an open mouth, a pair of hooks, one hook each being mounted to each of the opposing side walls the hooks being for detachably attaching the funnel container below an exit end of a concrete truck concrete chute, and a material outlet connector to drain liquid and debris from the funnel container; and a truck mountable holding container having an upper portion that is adapted to store the funnel container when the funnel container is not affixed to the chute, a lower portion for collection of fluid and solid materials, a seat, a material inlet connector, and a fluid drain valve for draining fluid from the holding container, wherein the upper rim of the funnel container is adapted to sit on the seat of the holding container to act as a lid.

BRIEF DESCRIPTION OF THE DRAWINGS

These and other features, aspects and advantages of the present invention will become better understood with reference to the following description, appended claims and accompanying drawings where:

FIG. 7A is a top front isometric view looking down into the concrete mixing transport truck chute washout system of FIG. 1 but with its tray unit partially removed.

FIG. 8 is a top front isometric view looking down into an exemplary tray unit of the exemplary concrete mixing transport truck chute washout system of FIG. 1.

FIG. 9 is a top front exploded view of the tray unit.

FIG. 10 is a bottom view of the tray unit.

FIG. 11 is a right bottom isometric view of the tray unit.

FIG. 12 is a detail view of the bottom of the tray unit showing perimeter ridging.

FIG. 13 is a front view of the container portion of the concrete mixing transport truck chute washout system of FIG. 1.

FIG. 14 is a rear view of the container portion of FIG. 12.

FIG. 15 is a right side view of the container portion of FIG. 12.

FIG. 16 is a cross-sectional view of the container portion along view lines 16-16 of FIG. 15.

FIG. 17 is a top front isometric view looking down into the container portion of FIG. 13.

FIG. 18 is a detail view showing a tray seating and sealing feature in the container portion of FIG. 13.

FIG. 19 is a front right isometric view showing an exemplary folding chute washout system rack of the invention.

FIG. 20 is another view of the exemplary folding chute washout system rack of the invention of FIG. 19, but this time folded up against a truck to which it is mounted.

FIG. 22 is a right rear isometric view showing the exemplary concrete mixing transport truck chute washout system seated on the exemplary rack of FIG. 19.

FIG. 34 is a cross-sectional view of the concrete mixing transport truck chute washout system of FIG. 31 but with its tray unit partially removed.

FIG. 35 is a front top isometric view of the concrete mixing transport truck chute washout system of FIG. 31 on a pivoting rack system with the washout system swung over the platform of the rack.

FIG. 36B is a front top isometric view of the concrete mixing transport truck chute washout system and rack of FIG. 36A.

FIG. 37 is a rear top isometric view of the concrete mixing transport truck chute washout system and rack of FIG. 36A but equipped with a hood for the washout system in an opened state.

FIG. 38 is a rear top isometric view of the concrete mixing transport truck chute washout system and rack of FIG. 37 with its hood in a closed state.

FIG. 39B is a top right isometric view of the exemplary concrete mixing transport truck chute washout system of FIG. 39A.

FIG. 40D is a side view the chute mountable funnel container of FIG. 40A.

FIG. 41B is a top view of the holding container of FIG. 41A.

FIG. 43A is a detail side detail view of another exemplary embodiment of a concrete mixing transport truck chute washout system of invention having an alternate holding container, showing the funnel container hung on the chute and the alternate holding container with the funnel container and holding container interconnected with the material transport hose.

FIG. 44A is a front view of the alternate holding container of FIGS. 43A and 43B.

FIG. 45A is a front view of the holding container of FIG. 44A with the funnel container of FIGS. 40A-40D placed in the open top of the holding container in the funnel container's storage and transportation position.

FIG. 45B is a cross-sectional view through view lines 45B-45B of the funnel container and holding container of FIG. 45A.

DETAILED DESCRIPTION

Figure 1:
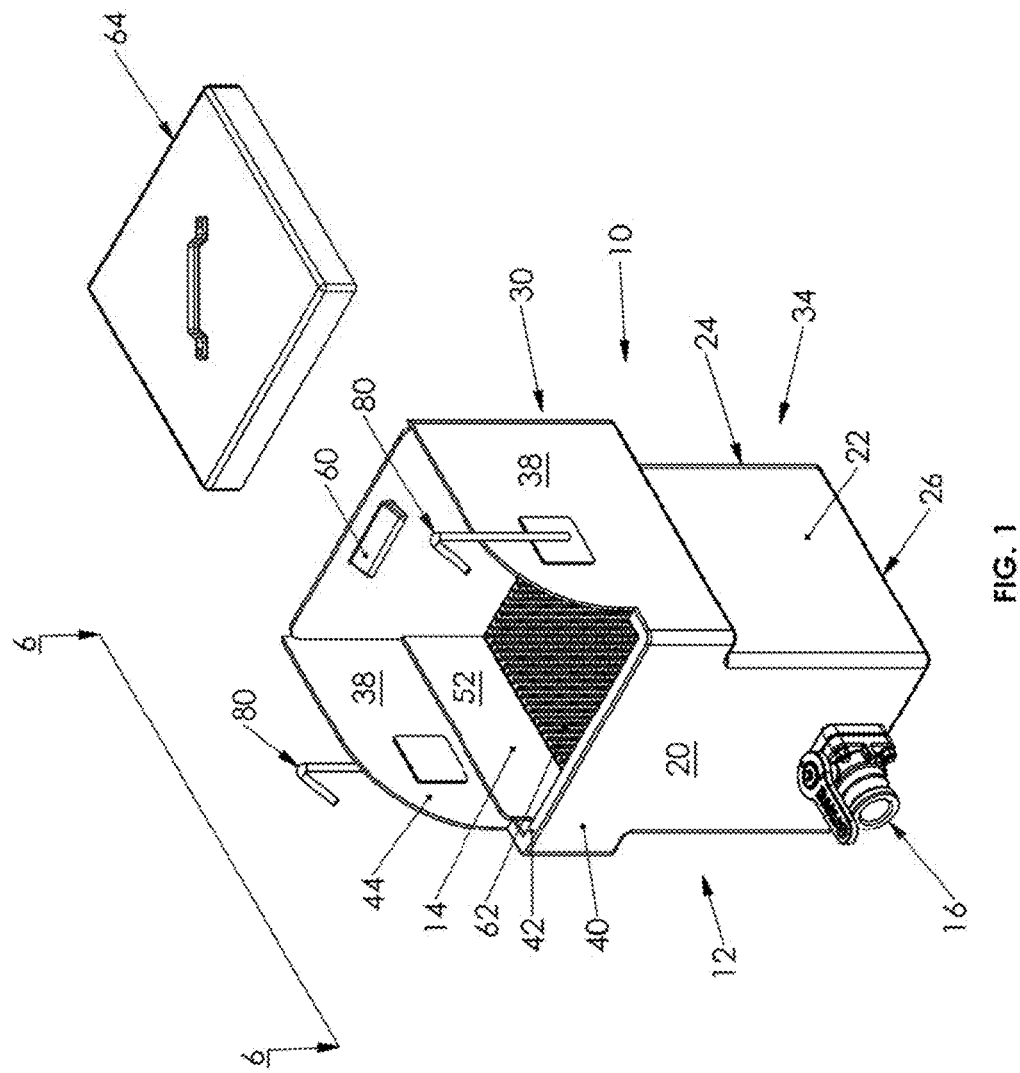
FIG. 1 is a top front right isometric view of an exemplary embodiment of a concrete mixing transport truck chute washout system of the invention.
Figure 2:
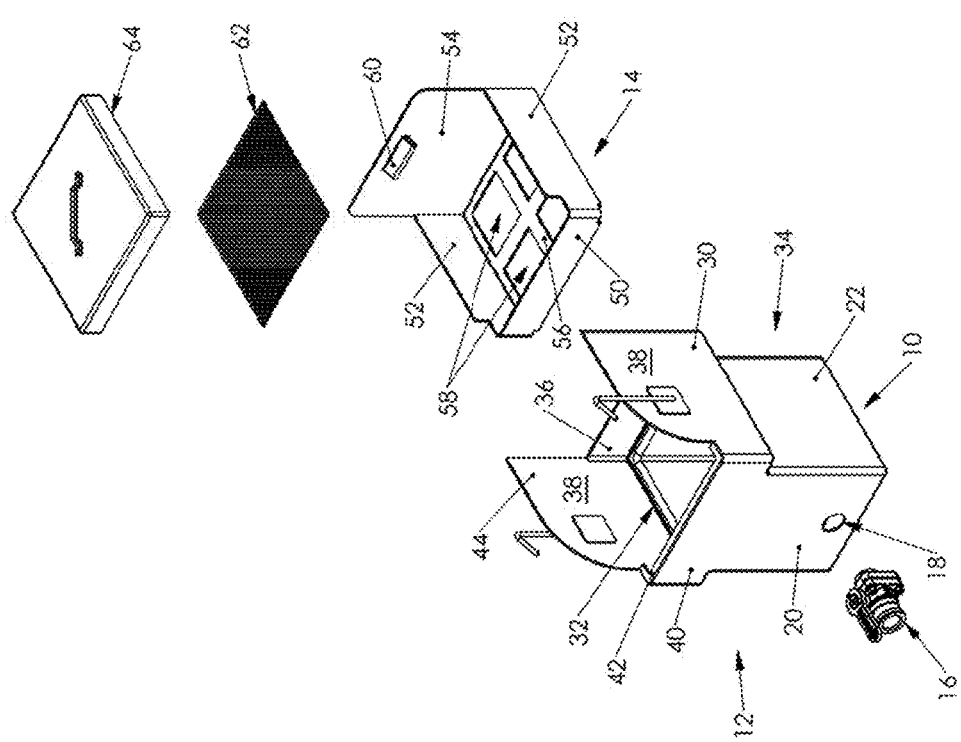
FIG. 2 is an exploded view of the concrete mixing transport truck chute washout system of FIG. 1.
Figure 3:
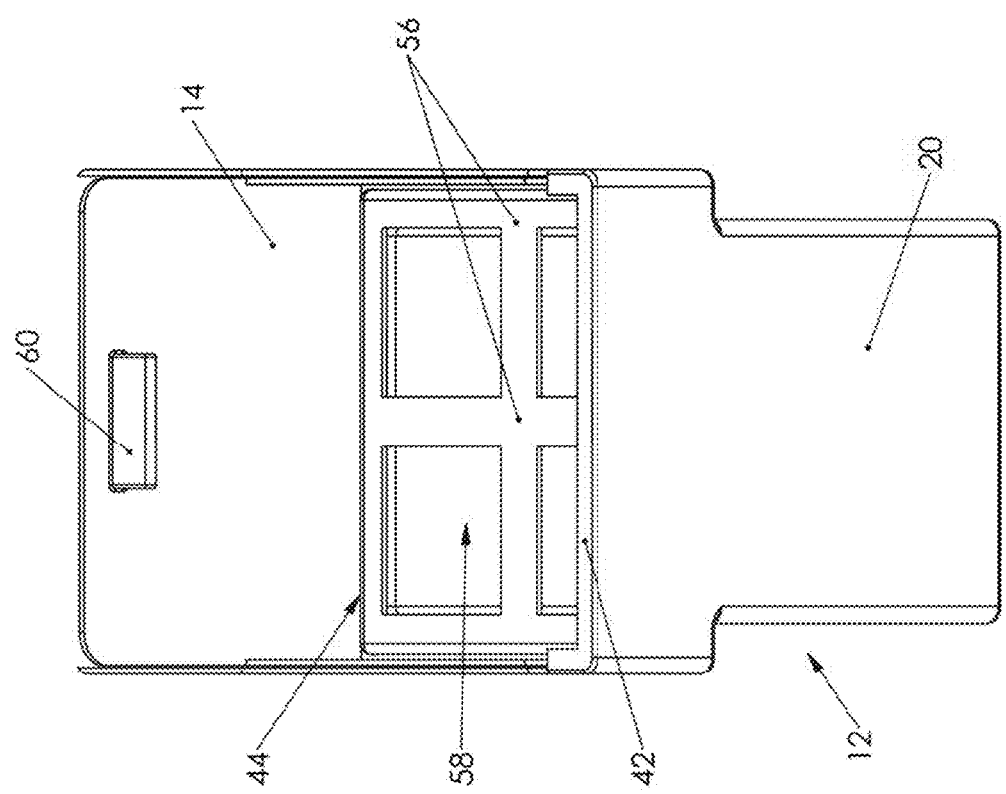
FIG. 3 is a top front isometric view looking down into the concrete mixing transport truck chute washout system of FIG. 1.
Figure 4:
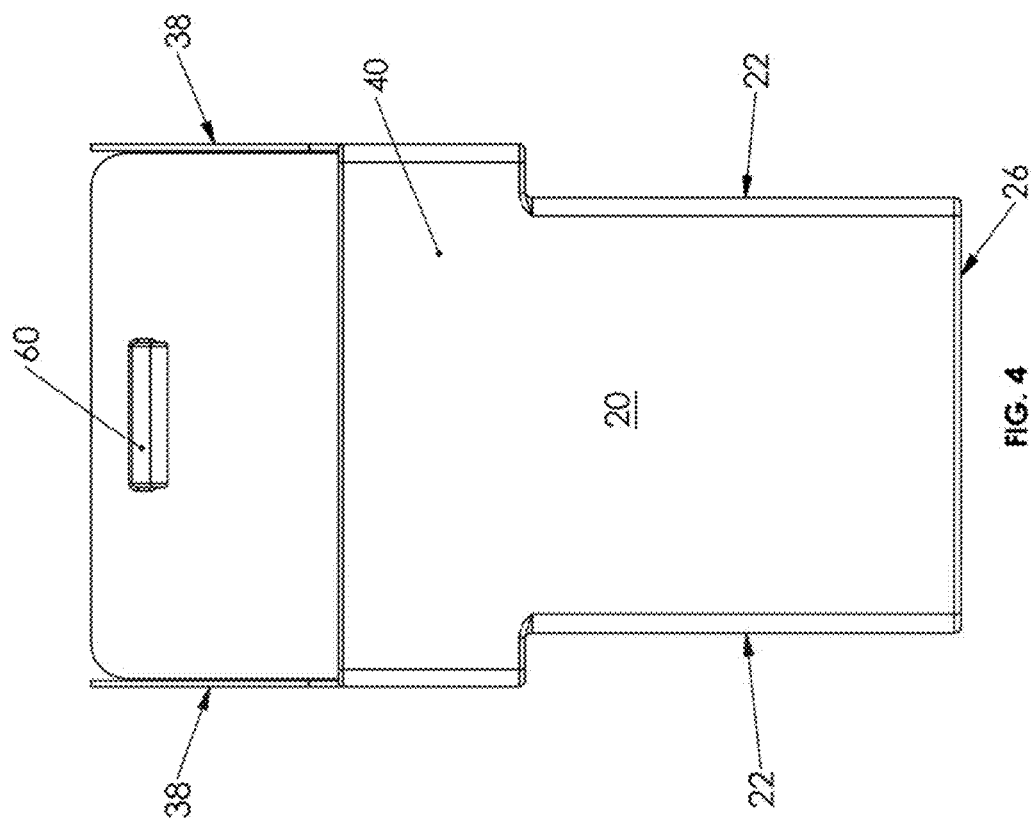
FIG. 4 is a front view of concrete mixing transport truck chute washout system of FIG. 1.
Figure 5:
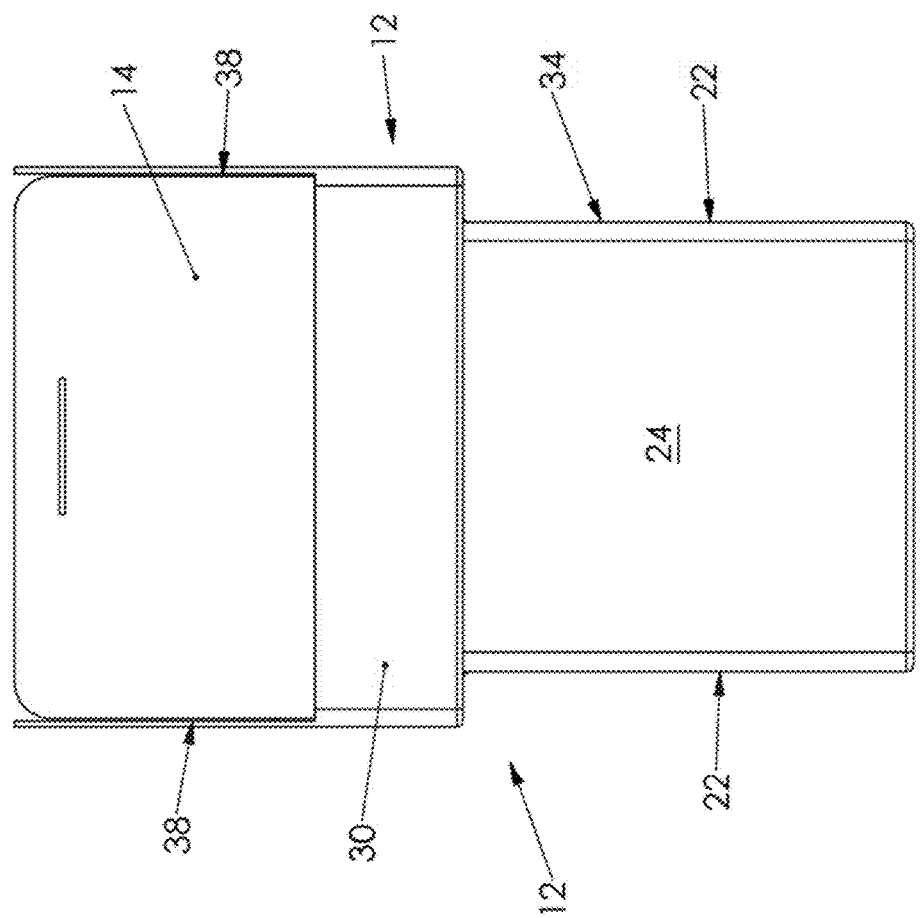
FIG. 5 is a rear view of concrete mixing transport truck chute washout system of FIG. 1.
Figure 6:
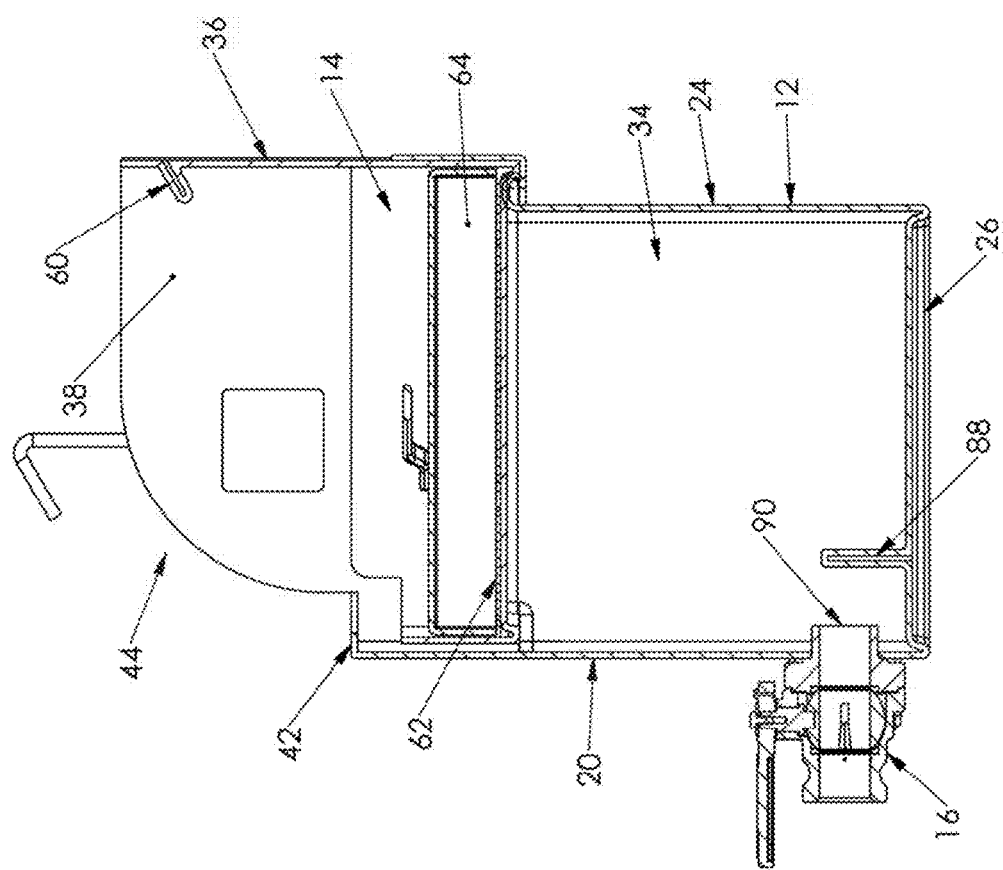
FIG. 6 is a cross-sectional view of the concrete mixing transport truck chute washout system along view lines 6-6 of FIG. 1
Figure 7B:
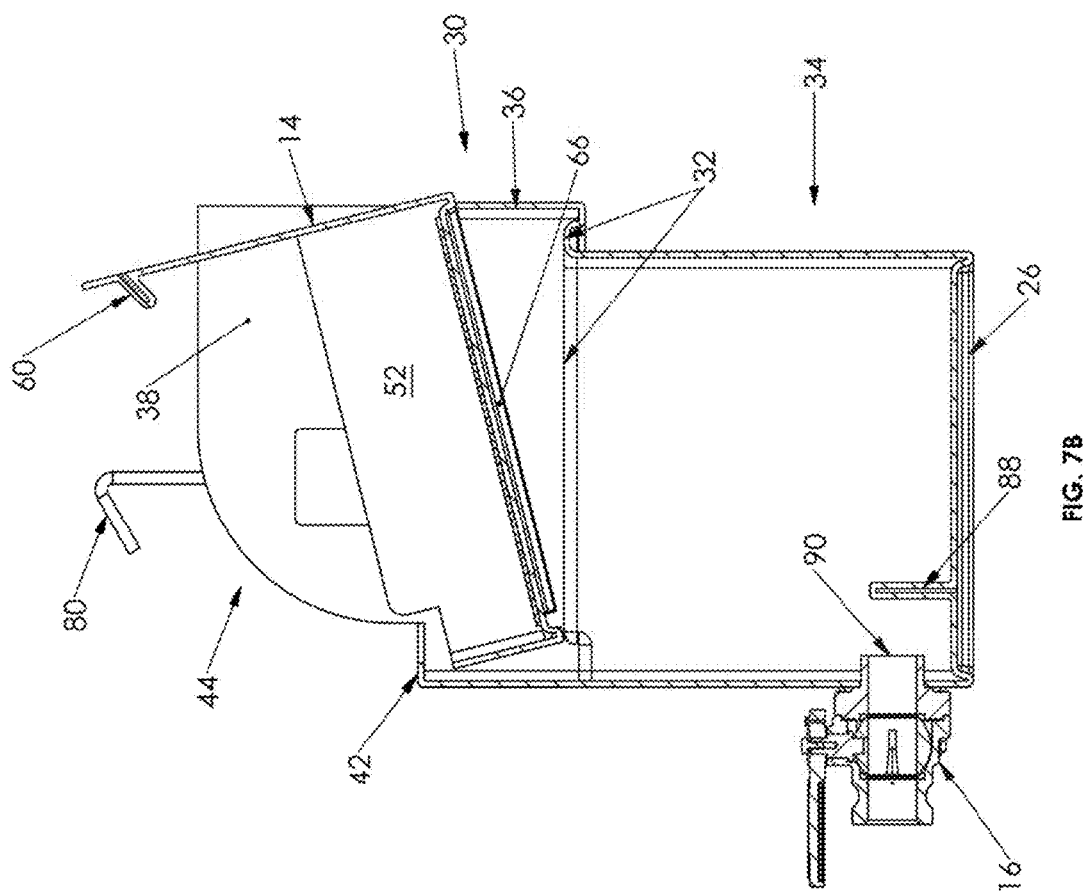
FIG. 7B is a cross-sectional view along view lines 7B-7B of FIG. 7A.
Figure 25:
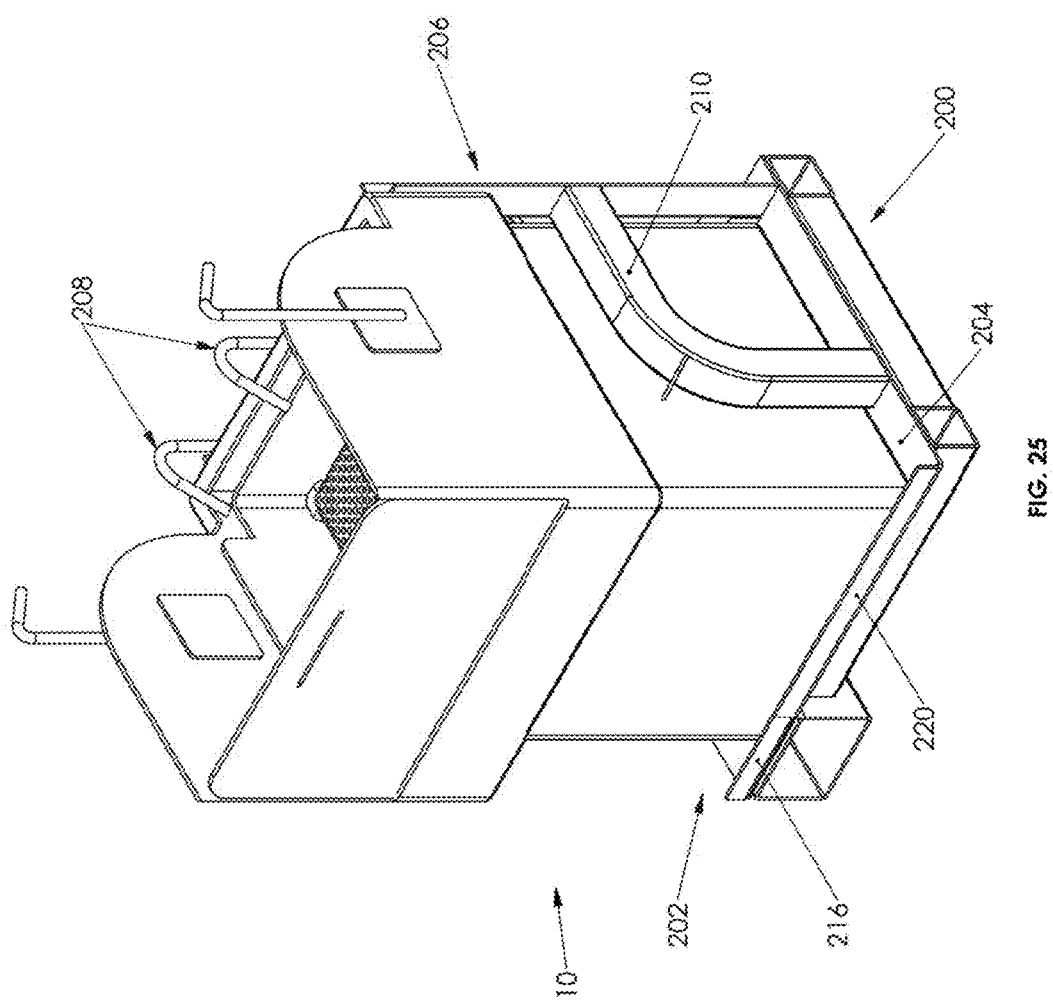
FIG. 25 is a right rear isometric view showing the exemplary concrete mixing transport truck chute washout system seated on an exemplary rack of FIGS. 23A-B with the washout system seated against its restraining arm.

Turning first to FIGS. 1-7A and 7B are various views of exemplary embodiment of a concrete mixing transport truck chute washout system 10 of the invention, wherein FIG. 1 is a top front right isometric view, FIG. 2 is an exploded view, FIG. 3 is a top front isometric view looking down into open tray 14, FIG. 4 is a front view, FIG. 5 is a rear view, FIG. 6 is a cross-sectional view of the concrete mixing transport truck chute washout system 10 along view lines 6-6 of FIG. 1, FIG. 7A is a top front isometric view looking down into the concrete mixing transport truck chute washout system 10 of FIG. 1 but with its tray unit 14 partially removed from the container unit 12, and FIG. 7B is a cross-sectional view along view lines 7B-7B of FIG. 7A. The concrete mixing transport truck chute washout system 10 has a container unit 12 and a tray unit 14 that sits at an upper region 30 of the container unit 12. The container unit 12 has a raised seat 32 at its upper region 30 that engages with the tray 14 to provide a sealing and seating feature. A drainage valve 16 connects via a drain hole 18 in a front wall 20 of the container unit 12. The container unit 12 has opposing side walls 22, a back wall 24, and a bottom 26. The upper region 30 preferably has a larger cross-sectional area than that of a lower region 34. The upper region 30 has a back wall 36 and opposing side walls 38. The front wall 40 is shorter than the back wall 36, and the front wall 40 may be a continuation of the front wall 20 of the container 12. The back wall 36 is made higher than the front wall 40 so that when a cement truck's chute is positioned over an open mouth 44 of the concrete mixing transport truck chute washout system 10, as best shown in FIG. 25, there is less chance for the material being cleaned from the chutes will overflow or overspray. A rim 42 preferably extends inwardly from a top of the front wall 40 towards the back wall 36. The tray unit 14 is adapted to slide into the upper region 30 of the container 12 and slide under the rim 42 and sit on the raised seat 32 and fit snuggly into the upper region 30. The tray unit 14 has a front wall 50, two side walls 52, a back wall 54, and a bottom 56 with openings 58 formed therein. A handle 60 can be formed in the back wall 54 for use in removing the tray 14 from the upper region 30 of the container 12. A strainer 62, such as sheet of perforated metal with predetermined sized hole, will sit on top of an upper surface of the bottom 56 of the tray 14 and will serve to prevent rocks, bits of concrete, or debris larger than the hole size of the strainer 62 from passing through the tray and into the lower region 34 of the container and is the main liquid collection zone. However, water and water with dissolved cement may pass through the tray 14 and drain into the lower region 34 of the container 12. Although the bottom 56 of the tray 14 is shown with a perimeter end and cross bars leaving four openings 58, other arrangement can be provided so long as adequate drainage and support for the strainer 62 is provided. If desired, the strainer 62 may be permanently attached in place to the tray 14 or can be left to be sitting freely on the bottom of the tray 14. As best shown in the cross-sectional view of FIG. 6, a dam 88 preferably extends upwardly from the bottom 26 of the container 12 in front of an entrance 90 of the drainage valve 16. The dam 88 will help prevent any non-liquid debris, e.g., small rocks or sand that may have passed into the lower region 34 of the container 12 from possibly clogging or damaging the valve 16. Referring to FIG. 7A, there is shown a top front isometric view looking down into the concrete mixing transport truck chute washout system 10 of FIG. 1 but with its tray unit 14 partially removed from the container unit 12. As can be seen, the front wall 50 of the tray 14 is slid under the rim 42 extending from the container's front wall 40, and the back wall 54 is lifted to remove the tray unit 14. When the tray unit 14 is secured in place (as shown in FIG. 1), the side walls 52 of the tray unit 14 will be adjacent to the side walls 38 at the upper region 30 of the container unit 12, and the back wall 54 of the tray unit 14 will be adjacent to the back wall 36 at the upper region 30 of the container unit 12. And as previously noted the rim 42 will extend over the front wall 50 of the tray unit so that liquid and debris will be prevented from splashing up and out of the tray unit 14. During transportation of the concrete mixing transport truck chute washout system 10, the user may choose to leave gravel and loose concrete sitting in the tray unit 14 on top of the strainer 62 as this will further prevent liquid from splashing up and out of the concrete mixing transport truck chute washout system 10. Alternatively, an optional cover 64 (see FIGS. 1 and 2) may be placed over the open mouth 44 as a further barrier to prevent liquid from splashing out. The concrete mixing transport truck chute washout system 10 can be molded out of high strength materials, such as polypropylene, which can take shock and impact without cracking or disintegrating and will be resistant to corrosion. FIG. 1 shows the container unit 10 fitted with optional suspension hooks 80, which allows the concrete mixing transport truck chute washout system 10 to be hung on the end of a concrete truck chute if desired.

FIGS. 8-12 are various views of the exemplary tray unit 14, wherein FIG. 1 is a top front isometric view looking into the tray unit 14, FIG. 9 is a top front exploded view, FIG. 10 is a bottom view, FIG. 11 is a right bottom isometric view, and FIG. 12 is a detail view of the bottom of the tray unit showing perimeter ridging 70. As previously described, the tray unit 14 has a front wall 50, two side walls 52, a back wall 54, and a bottom 56 with openings 58 formed therein. A handle 60 can be formed in the back wall 54. A strainer 62, such as sheet of perforated metal with predetermined sized hole, will sit on top of an upper surface of the bottom 56 of the tray 14 and will serve to prevent rocks, bits of concrete, or debris larger than the hole size of the strainer 62 from passing through the tray and into the lower region 34 of the container and is the main liquid collection zone. Referring to FIGS. 10-12, the bottom surface of the tray unit 14 is shown from various angles. As can be seen, a protruding rim 66 extends around of the back wall 54 and two opposing side walls 52. A separate protruding rim 70 preferably extends below the front wall 50 and has two rim interruptions 68. These rim interruptions 68 permit any fluid or debris that may splash up against the bottom of the tray unit 14 to drain back down, as will be described further below. Inwardly of the protruding rims 66 and 70 is a perimeter portion of the bottom 56 of the tray unit 14.

Turning now to FIGS. 13-18, there are shown various views of the container unit 12, wherein FIG. 1 is a front view, FIG. 14 is a rear view, FIG. 15 is a right side view, FIG. 16 is a cross-sectional view of the container unit along view lines 16-16 of FIG. 15, FIG. 17 is a top front isometric view, and FIG. 18 is a detail view showing the tray unit 14 and the raised seat 32 which acts as a seating and sealing feature. The various features of the container unit 12 have been described above, and include the opposing side walls 22, back wall 24, and bottom 26 and an upper region 30 that preferably has a larger cross-sectional area than that of the lower region 34. The upper region 30 has a back wall 36 and opposing side walls 38. The front wall 40 is shorter than the back wall 36, and the front wall 40 may be a continuation of the front wall 20 of the container 12. The back wall 36 is made higher than the front wall 40. As best shown in FIGS. 16-18, the raised seat 32 is located at the bottom of the upper portion 30 of the container 12, and preferably lies at the bottom of the upper region 30 of the container 12. The raised seat 32 is preferably molded together with the rest of the container portion 12 and is spaced away from the side walls 38 and back wall 36 of the upper region 30, leaving a lower border area or a lower gully 76. The area inside of the front wall 78 lacks a section of raised seat 32. This is so that the tray unit 14 can be slid into and out of place in the container portion 12, and so that the protruding rim 66 extending around of the back wall 54 and two opposing side walls 52 at the bottom of the tray unit will seat on the lower border area 76, and so the separate protruding rim 70 extending from the bottom of the tray unit 14 below the front wall 50 will seat on the area inside of the front wall 78 that lacks a section of raised seat. When the tray unit 14 is placed in the upper region 30 of the container portion 12 as shown in FIGS. 1 and 6, the space defined above the raised seat 32 and lower border area 76 of the container portion 12 and below the protruding rims 66 and 70 and perimeter portion of the bottom 56 of the tray unit 14 will provide a seat that will largely prevent liquid from moving out of the lower region 34 of the container, and the rim interruptions 68 will permit any fluid or debris that may splash up against the bottom of the tray unit 14 to drain back down.

FIG. 19 is a front right isometric view showing an exemplary folding chute washout system rack 100 of the invention that is folded down and FIG. 20 is another view of the exemplary folding chute washout system rack 100 that is folded up against a truck T to which it is mounted. The rack 100 has a bottom 102, a front frame 104 with retaining hooks 106, and side pillars 108 and 110. When the rack 100 is folded up, the bottom 102 will be brought against the front frame 104 and the side pillars 108 and 110 will be swung down.

Figure 21:
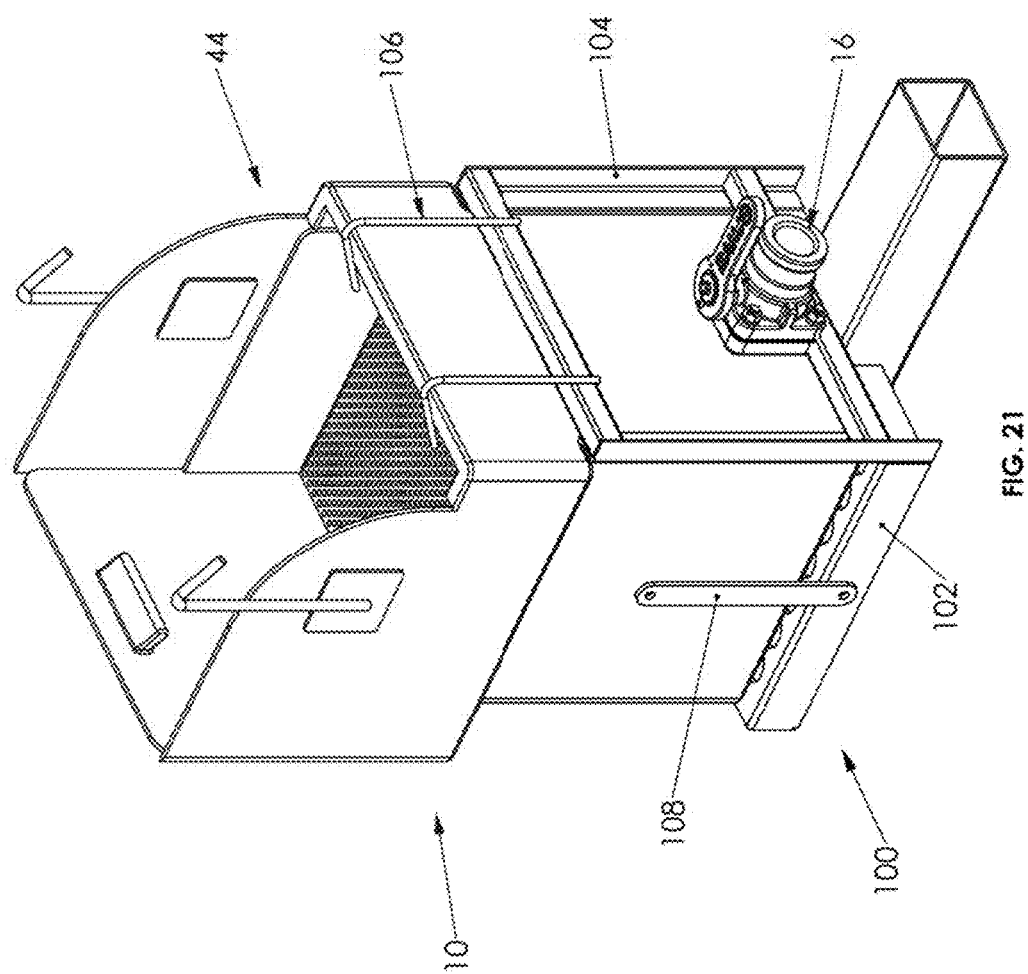
FIG. 21 is a left front isometric view showing the exemplary concrete mixing transport truck chute washout system seated on the exemplary rack of FIG. 19.

FIG. 21 is a left front and FIG. 22 is right rear isometric view showing the exemplary concrete mixing transport truck chute washout system 10 seated on the exemplary rack 10 of FIG. 19. As can be seen, the retaining hooks 106 of the rack 110 will hook over the front of the washout system 10 and the side pillars 108 and 110 and front frame 104 will hold the washout system 10 in place.

Figure 23A:
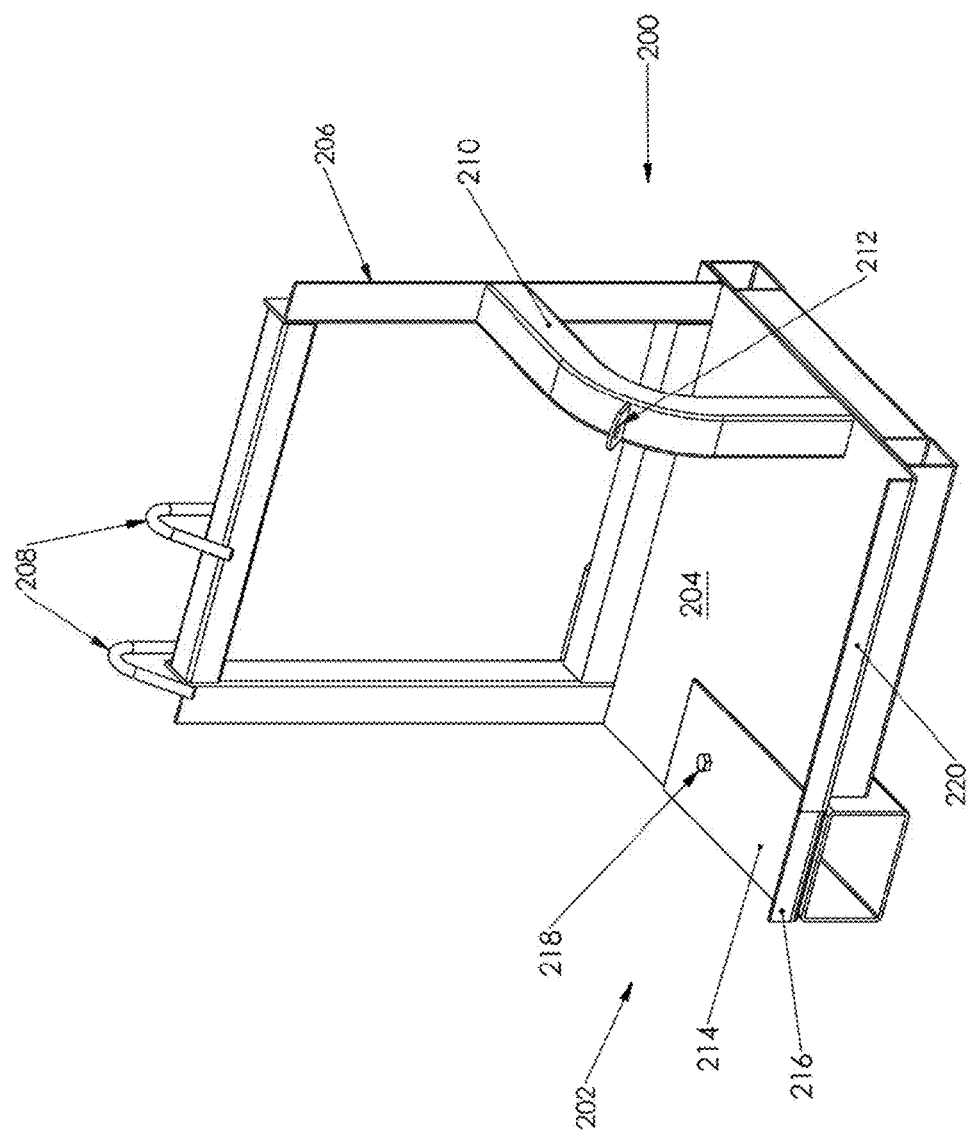
FIG. 23A is a front right isometric view showing another exemplary embodiment of a rack with its extension arm unextended.
Figure 23B:
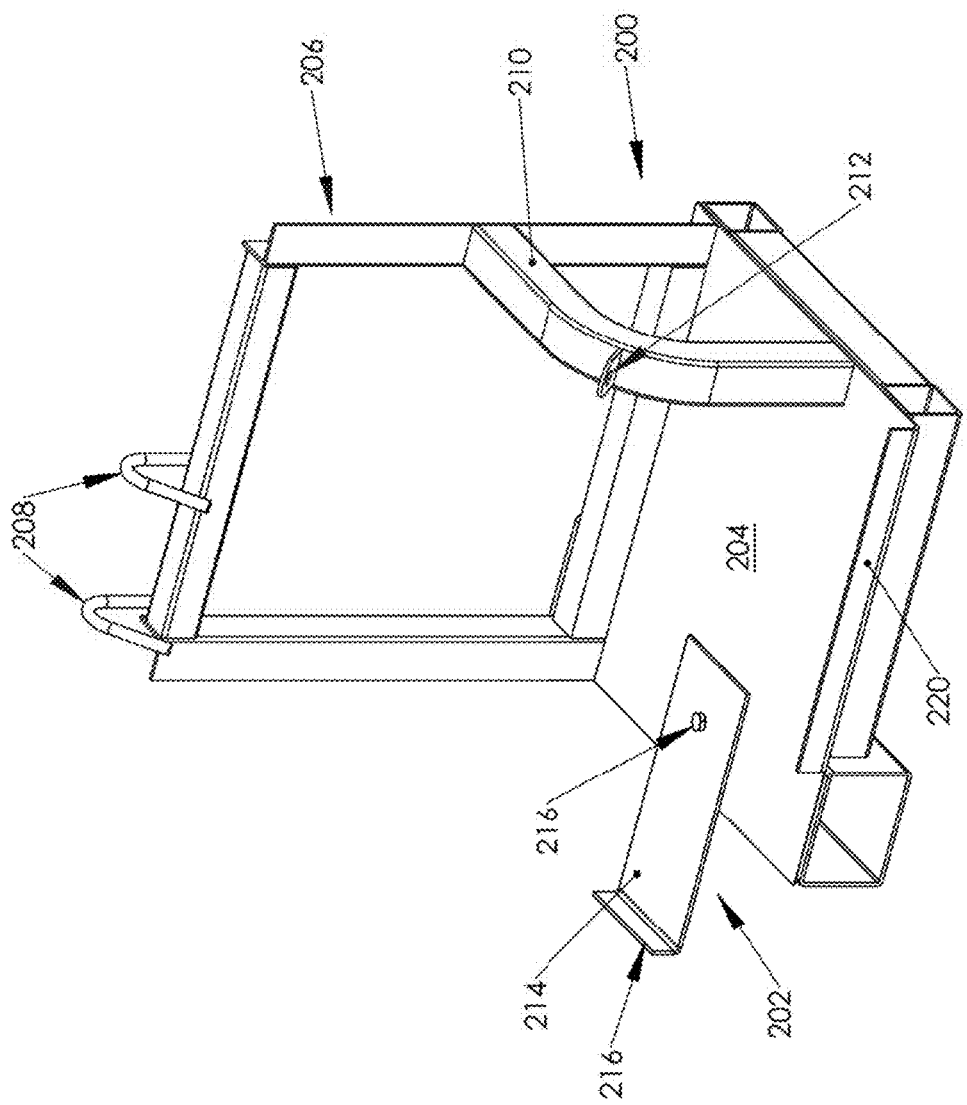
FIG. 23B is a front right isometric view showing the rack of FIG. 23A but with its extension arm extended.

FIG. 23A is a front right isometric view showing another exemplary embodiment of an exemplary folding chute washout system rack 200 of the invention with its extension arm 202 unextended, and FIG. 23B is the same view but with its extension arm 202 extended. The rack 200 has a base 204, a front frame 206 with retaining hooks 208, and a side wall 210. A connection tab 212 may be located on the side wall 210 so that a strap or bungee cord (not shown) can be used. The extension arm 202 preferably has a flat plate bottom 214 and an upturned retention edge 216 and a pivot 218 (e.g., a bolt) pivotally connecting it to the base 214 of the rack 200. When the extension arm 202 is in its unextended position, the upturned retention edge 216 will be flush with a retention edge 220 at the front of the bottom 204 of the rack 200. The retention edge 220 will help retain a container seated thereon. When the extension arm 202 is extended as shown in FIG. 24 by pivoting it on the pivot 216, with effectively widens the base to accommodate a wider container and also allows containers to be shifted on the base 204.

Figure 24A:
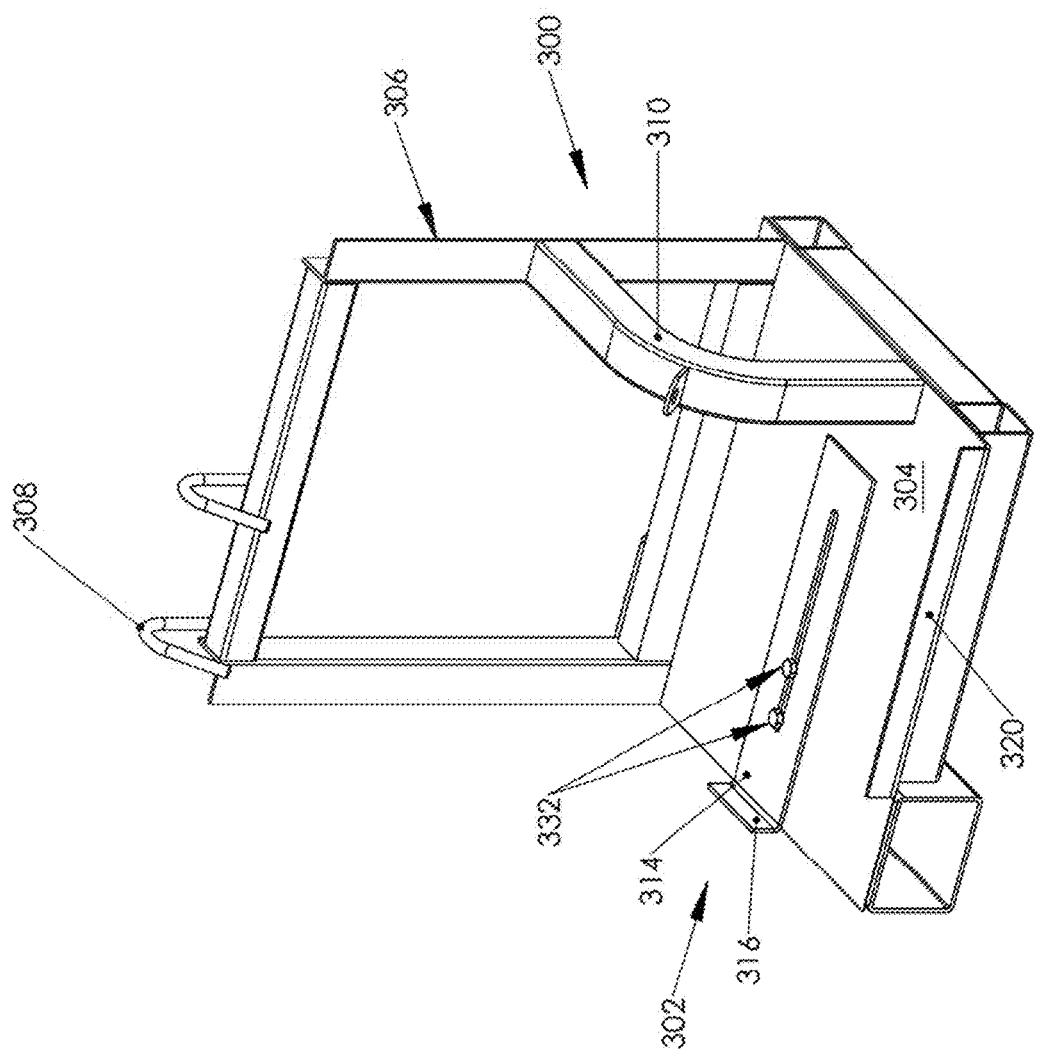
FIG. 24A is a front right isometric view showing yet another exemplary embodiment of a rack with its extension arm unextended.
Figure 24B:
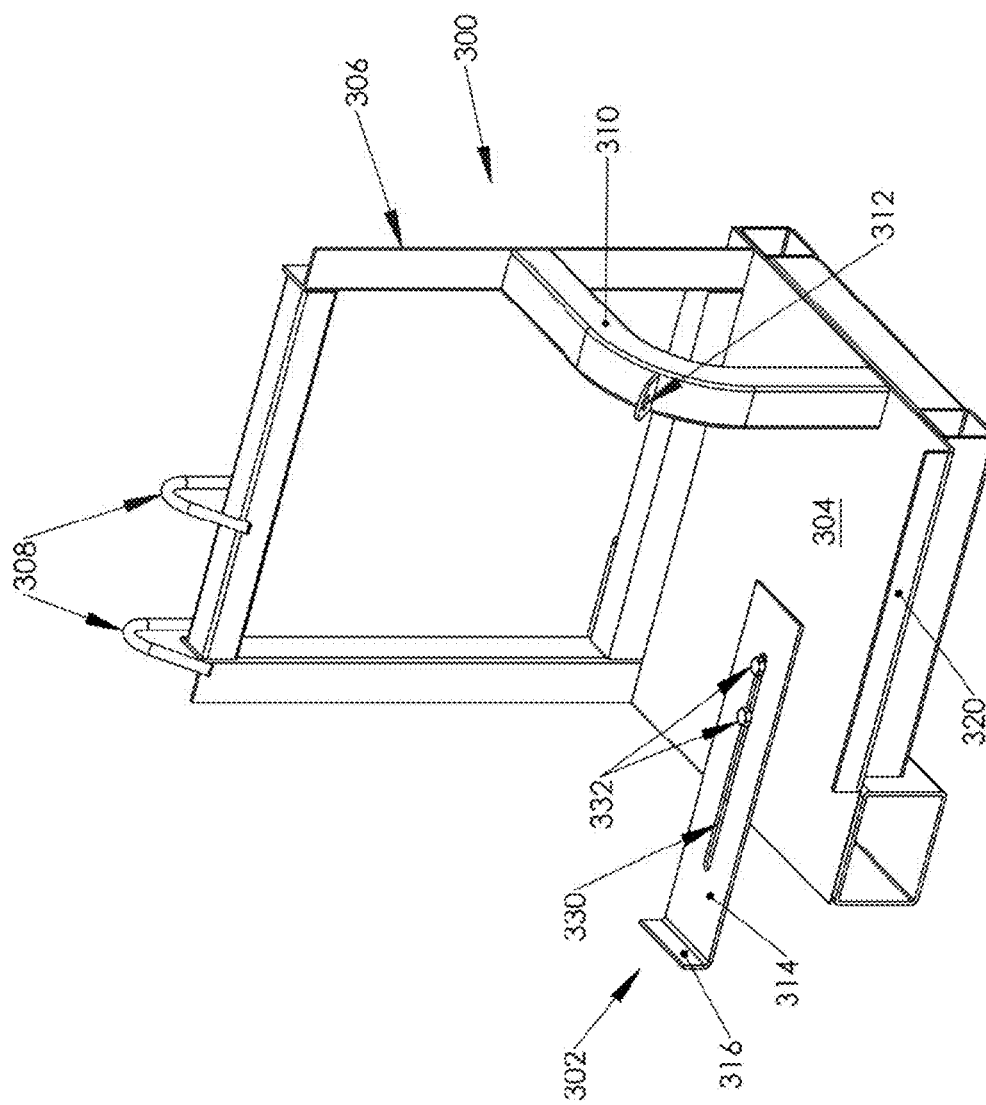
FIG. 24B is a front right isometric view showing the rack of FIG. 24A but with its extension arm extended.

FIG. 24A is a front right isometric view showing yet another exemplary embodiment of a rack 300 with its extension arm 302 unextended, and FIG. 24B is the same view but with its extension arm 302 extended. This embodiment of a rack 300 is very similar to the rack 200 of FIGS. 23A and 23B, and has a base 304, a front frame 306 with retaining hooks 308, and a side wall 310. The base 304 has a retention edge 320 at the front thereof, which will help retain a container seated thereon. A connection tab 312 may be located on the side wall 310 so that a strap or bungee cord (not shown) can be used. The extension arm 302 preferably has a flat plate bottom 314 and an upturned retention edge 316. Unlike the rack 200 of FIGS. 23A and 23B, the extension arm 302 has a slot 330 formed in a flat plate bottom 314 that is slideably retained by two guides 332 affixed to the base 304 that allows the extension arm to be moved between the unextended position of FIG. 24A to the extended position of FIG. 24B. The rack 300 and a pivot 218 (e.g., a bolt) pivotally connecting it to the base 214 of the rack 200. When the extension arm 202 is in its unextended position, the upturned retention edge 216 will be flush with a retention edge 220 at the front of the bottom 204 of the rack 200. When the extension arm 202 is extended as shown in FIG. 24 by pivoting it on the pivot 216, with effectively widens the base to accommodate a wider container and also allows containers to be shifted on the base 204.

Figure 26:
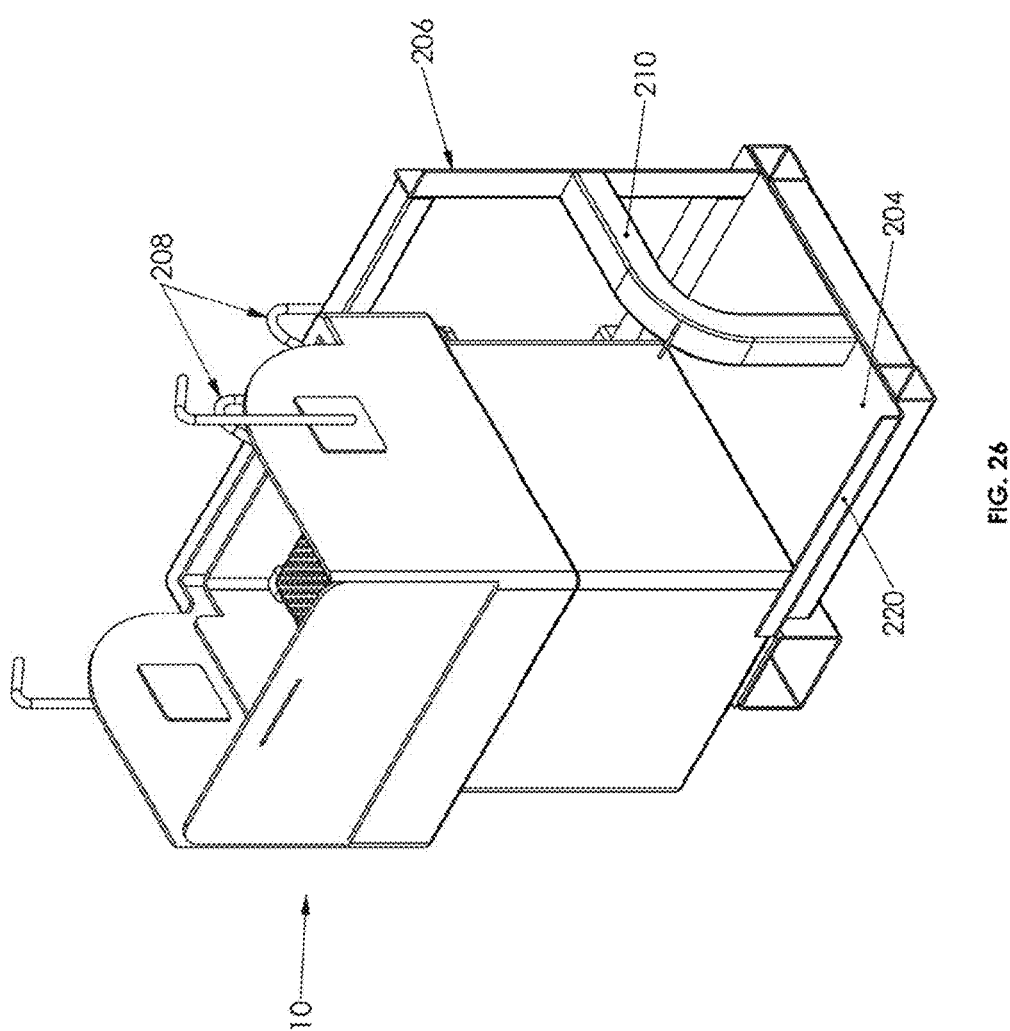
FIG. 26 is a right rear isometric view showing the exemplary concrete mixing transport truck chute washout system seated on an exemplary rack of FIGS. 23A-B with the washout system seated away from its restraining arm.

FIG. 25 is a front right isometric view showing the exemplary concrete mixing transport truck chute washout system 10 seated on an exemplary rack of FIGS. 23A-B with the washout system seated against its back wall 206 and its restraining arm 210, and FIG. 26 is the same view but with the washout system 10 slide away from the restraining arm 210. Not seen, in this position, the washout system will partially rest on the extension arm 202 which has been extended. The upturned retention edge 216 on the base 204 will retain the washout system 10. As can be seen, the retaining hooks 208 of the rack 200 will hook over the front of the washout system 10 and the restraining arm 210 will hold the washout system 10 in place.

Figure 27:
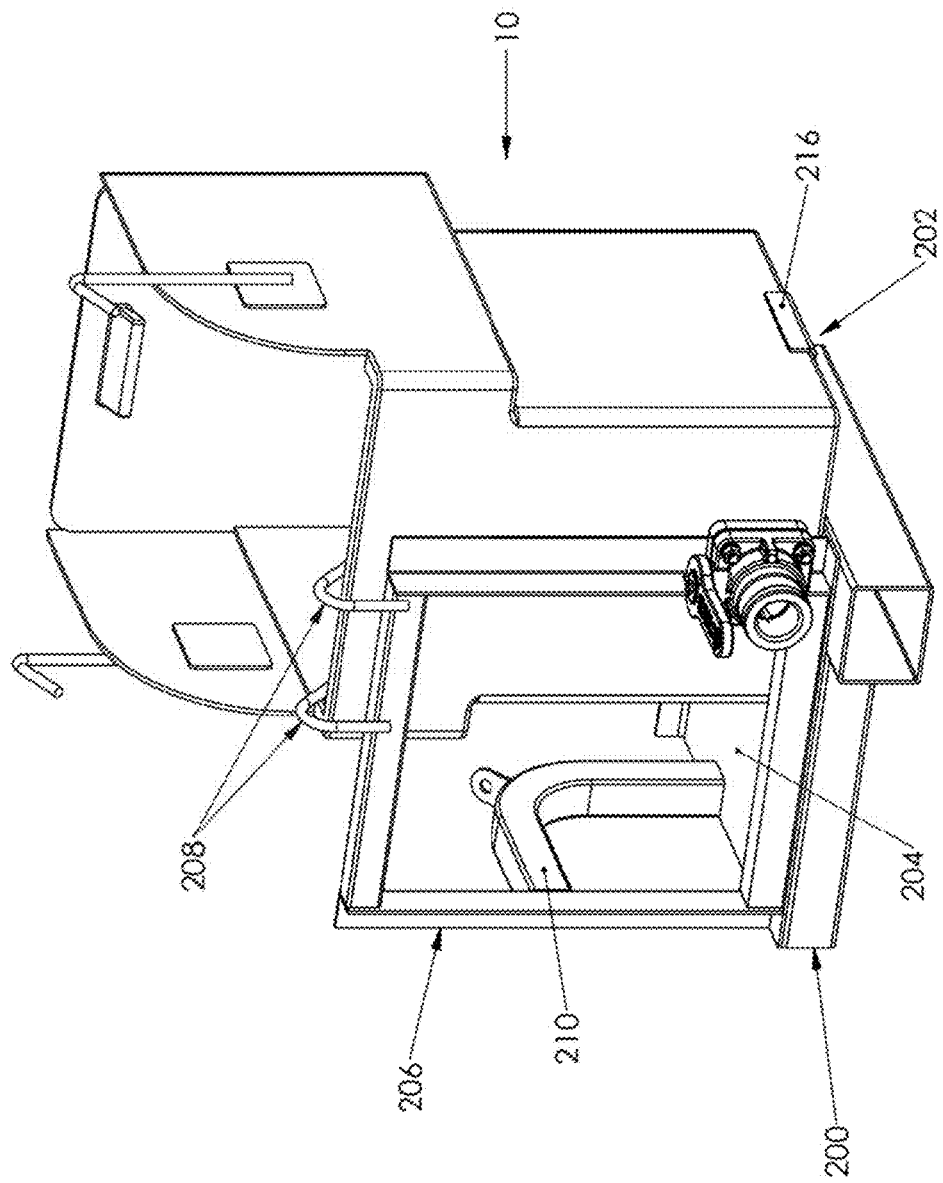
FIG. 27 is a left front isometric view showing the exemplary concrete mixing transport truck chute washout system seated on an exemplary rack of FIGS. 23A-B with the washout system seated away from its restraining arm.

FIG. 26 is a right rear isometric view and FIG. 27 is left front isometric view showing the exemplary concrete mixing transport truck chute washout system seated on an exemplary rack of FIGS. 23A-B with the washout system 10 seated away from its restraining arm 210 on resting on the arm extension 202.

Figure 28:
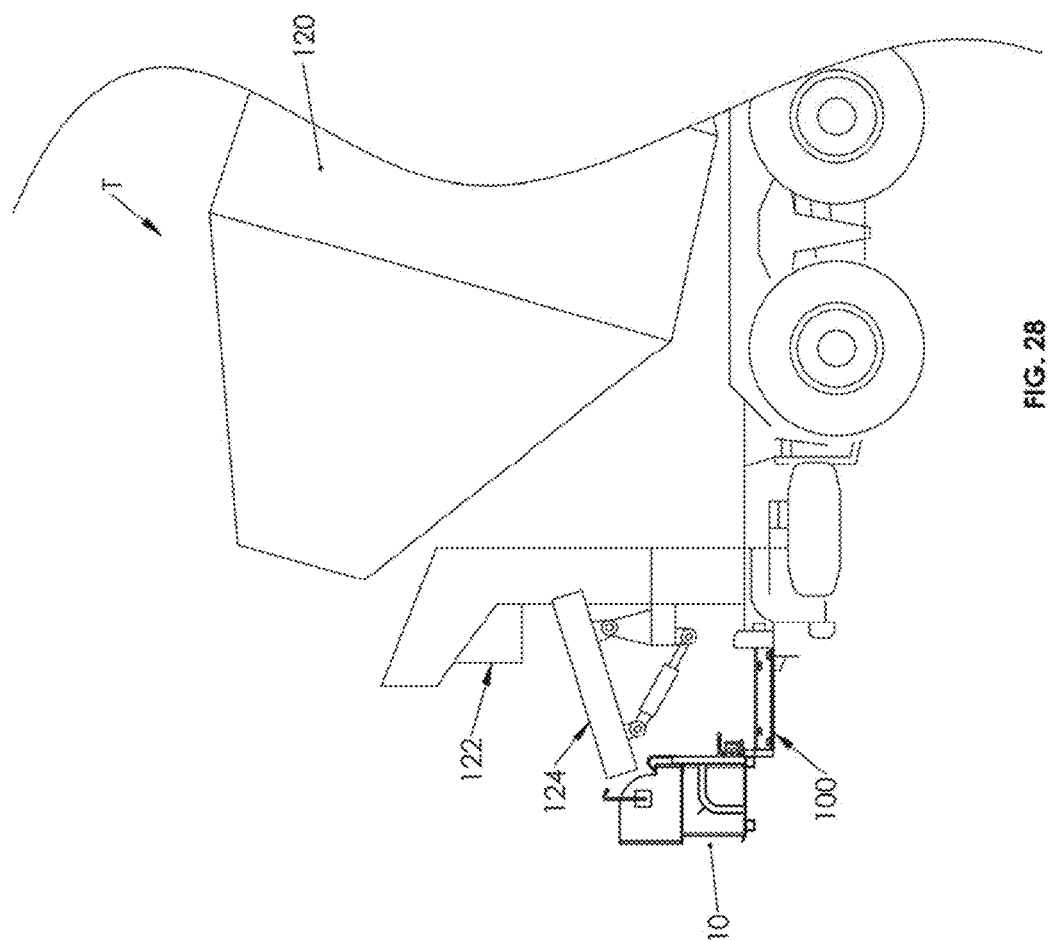
FIG. 28 is a diagrammatic view showing a concrete mixing transport truck equipped with the concrete mixing transport truck chute washout system and rack of the invention.
Figure 29:
FIG. 29 is a side view showing the concrete mixing transport truck chute washout system and rack of the invention mounted to the side of a truck.
Figure 30:
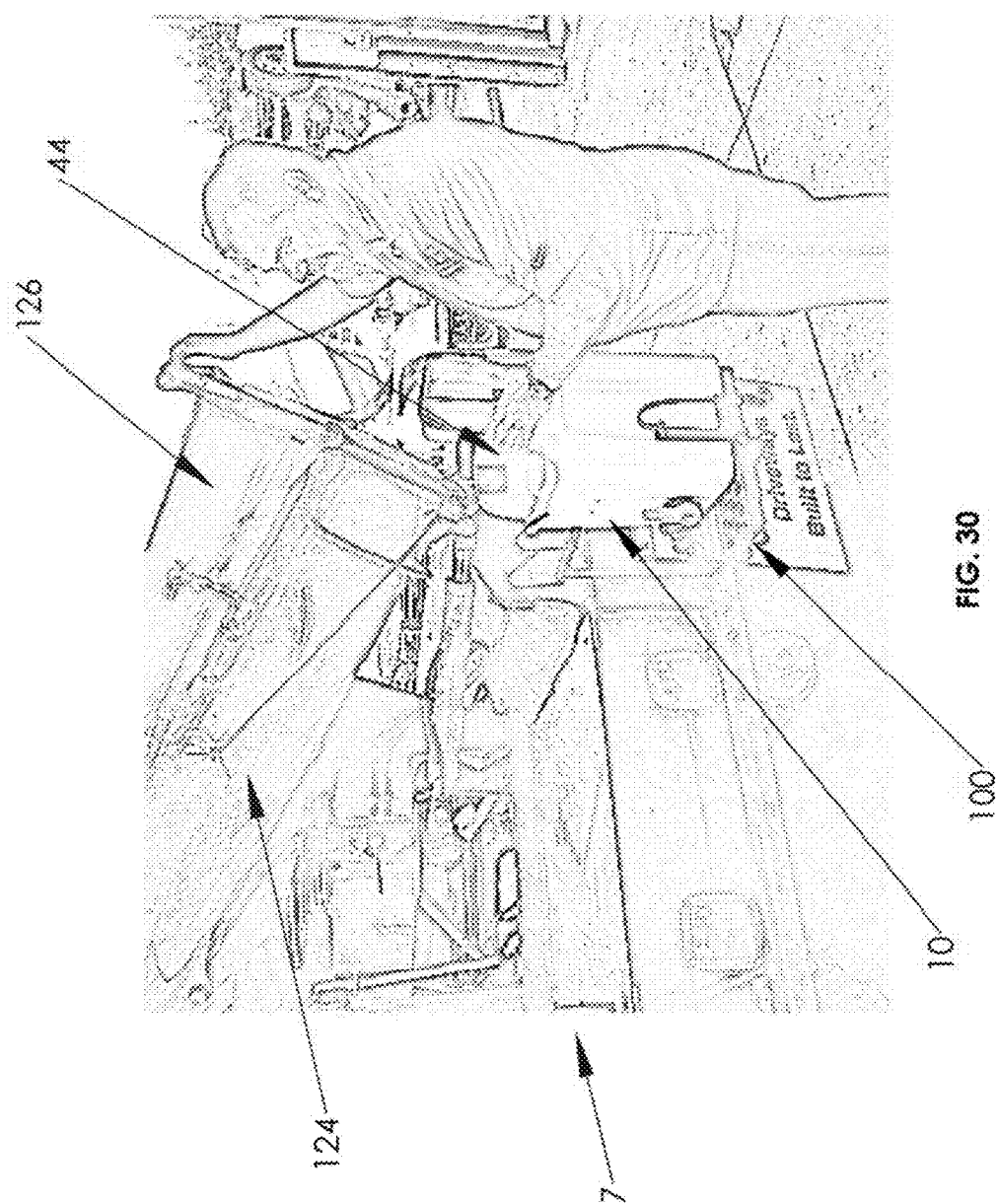
FIG. 30 is a side view showing the concrete mixing transport truck chute washout system and rack of the invention mounted to the side of a truck with a main chute and a flop over chute of the cement truck positions over the washout system.

FIG. 28 is a diagrammatic view showing a concrete mixing transport truck T equipped with the concrete mixing transport truck chute washout system 10 and rack 100 of the invention. The truck T has a mixing drum 120 with an egress 122 that will pass the concrete down a main chute 124, and a flop over chute 126 (seen flopped up over the main chute 124 in FIG. 30), and possible chute extensions that can be added onto the end of the flop over chute to extend the working length of the chute. FIG. 29 is a side view showing the concrete mixing transport truck chute washout system 10 and rack 100 mounted to the side of a truck T.

In use of the concrete mixing transport truck chute washout system 10, the user will first position the concrete mixing transport truck chute washout system 10 on the ground below the terminal end of any chute extension(s) while it/they are still attached to the flop over chute and spray off with water these chute extension(s). Gravel, large aggregate, and chunks of cement will be collected in the tray unit 14 and the liquid will drain into the lower region of the container unit 12. After any chute extensions are cleaned, they may be detached from the end of the flop over chute 126 and stored on the truck. At this point, the concrete mixing transport truck chute washout system 10 will normally be picked up and placed on the tray 100. The weight of the washout system 10 and its collected liquid and debris should still not be substantial at this point since one or at most two chute extensions would have been washed out at this point. Once the washout system 10 is sitting on the rack 100 mounted on the truck, the flop over chute 126 will be flopped over the main chute 124 and the open ends of the main chute 124 and flop over chute 126 will be positioned over the open mouth 44 of the washout system 10. The user will then spray off the main chute 124 and flop over chute 126 with the runoff draining into the tray unit 14 to collect aggregate and with liquid and small debris, such as sand, being collected in the container unit 12. The washout system 10 will preferably be sized to have a fluid volume of between 5 and 12 gallons. For example, in one embodiment of the invention, the upper region 30 of the container can have a width of about 16", a depth of about 15", and a height of about 5" to the front wall and about 11" at the top of the side walls. The lower region 34 can have interior dimensions of about 13"wide, about 13" deep, and a height of about 12", for a total volume of about 2028 cubic inches, or about 8.8 gallons. If more water is needed to clean out the chutes than can be collected in the container unit 12, the user can connect a hose (not shown) between the drainage valve 16 and an auxiliary tank that may be stored on the truck and drain fluid from the container unit 12 to the auxiliary tank, thereby freeing up additional capacity.

Figure 31:
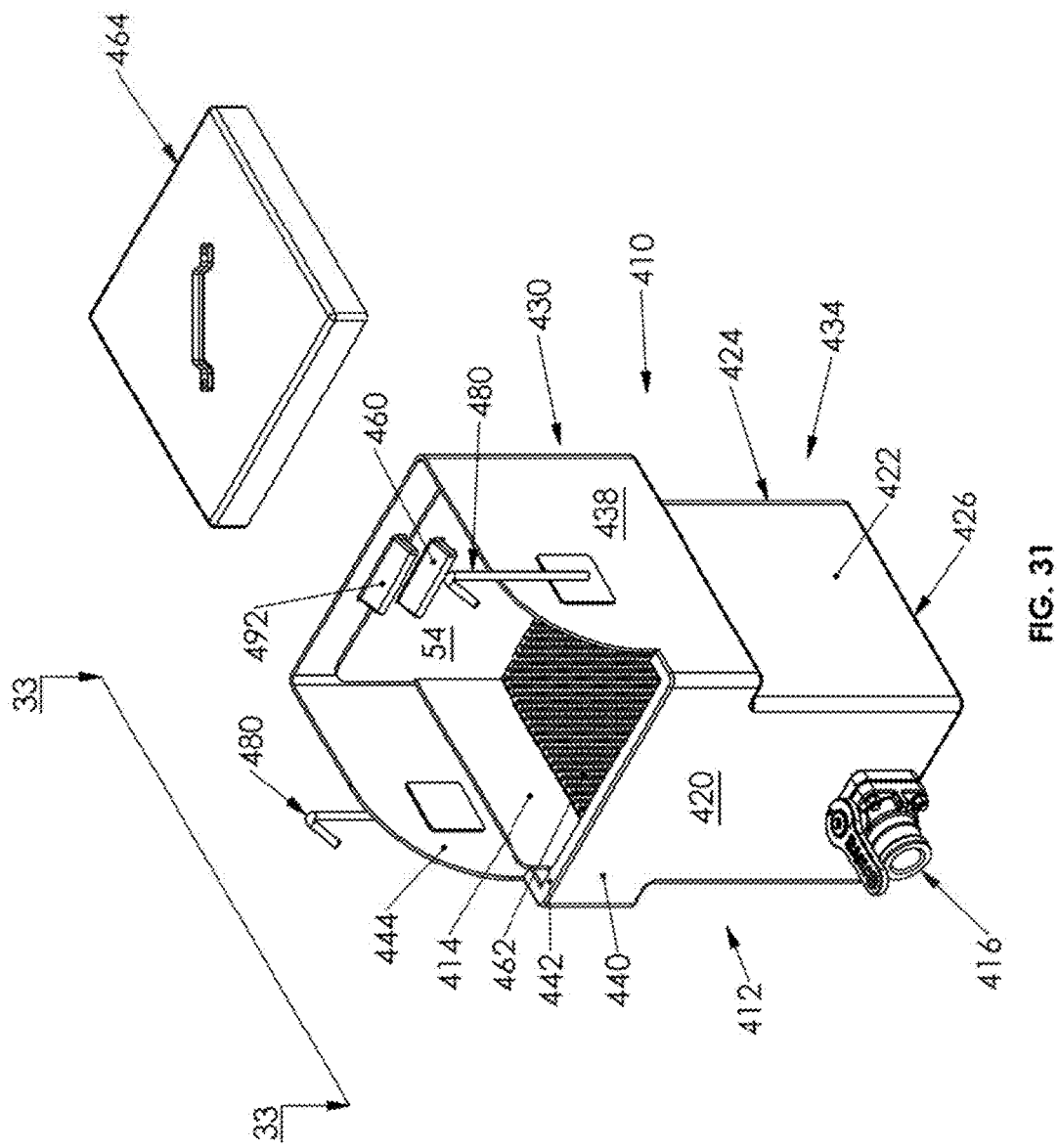
FIG. 31 is a top front right isometric view of another exemplary embodiment of a concrete mixing transport truck chute washout system of the invention.
Figure 32:
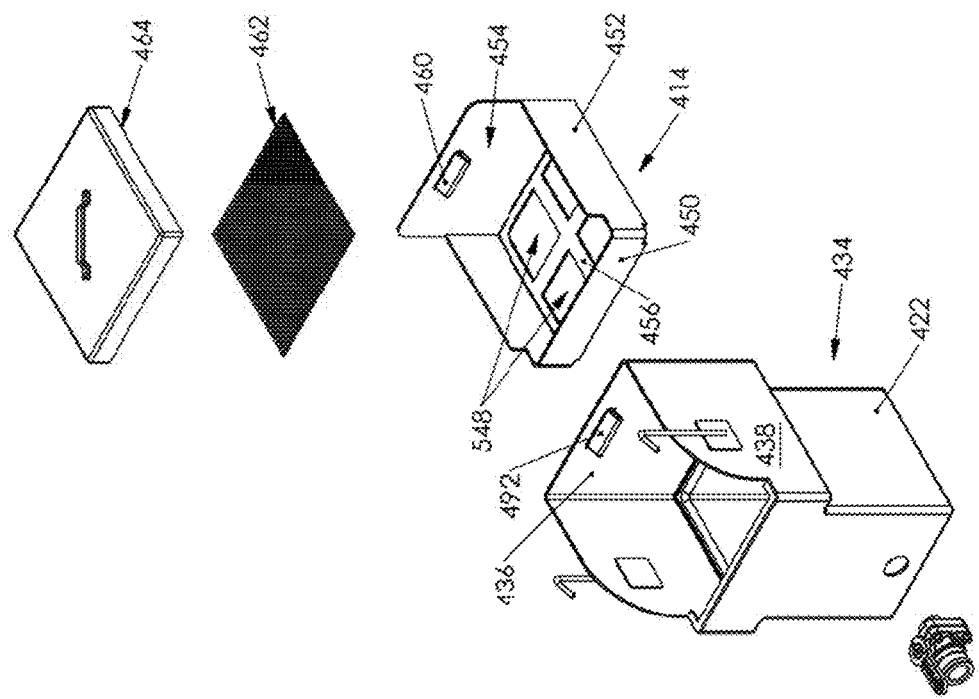
FIG. 32 is an exploded view of the concrete mixing transport truck chute washout system of FIG. 31.
Figure 33:
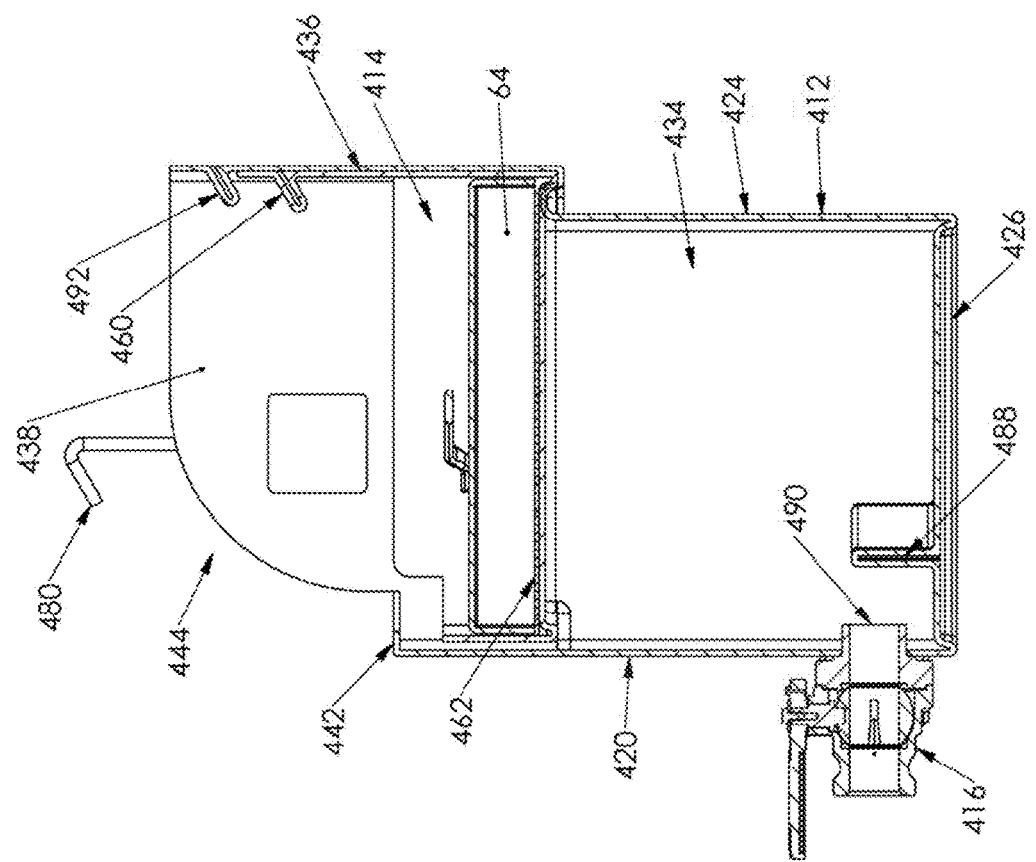
FIG. 33 is a cross-sectional view of the concrete mixing transport truck chute washout system of FIG. 31.

FIGS. 31-34 are views of another exemplary embodiment of a concrete mixing transport truck chute washout system 400 of the invention, wherein FIG. 31 is a top front right isometric view, FIG. 32 is an exploded view, FIG. 33 is a cross-sectional view, and FIG. 34 is a cross-sectional view of the concrete mixing transport truck chute washout system of FIG. 31 but with its tray unit partially removed. The concrete mixing transport truck chute washout system 400 is very similar to the concrete mixing transport truck chute washout system 10 described above, except as described below.

The concrete mixing transport truck chute washout system 400 has a container unit 412 and a tray unit 414 that sits at an upper region 430 of the container unit 412. The container unit 412 has a raised seat 432 at its upper region 430 that engages with the tray 414 to provide a sealing and seating feature. A drainage valve 416 connects via a drain hole 418 in a front wall 420 of the container unit 412. The container unit 412 has opposing side walls 422, a back wall 424, and a bottom 426. The upper region 430 preferably has a larger cross-sectional area than that of a lower region 434. The upper region 430 has a back wall 436 and opposing side walls 438. The front wall 440 is shorter than the back wall 436, and the front wall 440 may be a continuation of the front wall 420 of the container 412. The back wall 436 is made higher than the front wall 440 so that when a cement truck's chute is positioned over an open mouth 444 of the concrete mixing transport truck chute washout system 410, similarly as shown in FIG. 25, there is less chance for the material being cleaned from the chutes will overflow or overspray. A rim 442 preferably extends inwardly from a top of the front wall 440 towards the back wall 436. The tray unit 414 is adapted to slide into the upper region 430 of the container 412 and slide under the rim 442 and sit on the raised seat 432 and fit snuggly into the upper region 430. The tray unit 414 has a front wall 450, two side walls 452, a back wall 454, and a bottom 456 with openings 458 formed therein. A handle 460 can be formed in the back wall 54 for use in removing the tray 414 from the upper region 430 of the container 412. Unlike the concrete mixing transport truck chute washout system 100 noted above where the back wall 54 of the tray 14 fills in a gap in the back side of the container unit 12, in the embodiment of the concrete mixing transport truck chute washout system 400, the container unit 412 has a back wall 436 that is high and has its own integral handle 492. When the tray unit 414 is placed in the container unit 412, a top edge of its back wall 454 will impinge on the handle 492 formed on the back wall of the container unit 412 and help retain the tray unit 414 in place in the container unit 412 and provide enhanced sealing. Moreover, the extra handle 492 on the back wall of the container unit 412 can be used as an additional handhold when handling the device. A strainer 462, such as sheet of perforated metal with predetermined sized hole, will sit on top of an upper surface of the bottom 456 of the tray 414 and will serve to prevent rocks, bits of concrete, or debris larger than the hole size of the strainer 462 from passing through the tray and into the lower region 434 of the container and is the main liquid collection zone. However, water and water with dissolved cement may pass through the tray 414 and drain into the lower region 434 of the container 412. Although the bottom 456 of the tray 414 is shown with a perimeter end and cross bars leaving four openings 458, other arrangement can be provided so long as adequate drainage and support for the strainer 462 is provided. If desired, the strainer 462 may be permanently attached in place to the tray 414 or can be left to be sitting freely on the bottom of the tray 414. As best shown in the cross-sectional views of FIGS. 33 and 34, a dam 488 preferably extends upwardly from the bottom 426 of the container 412 in front of an entrance 490 of the drainage valve 416. The dam 488 will help prevent any non-liquid debris, e.g., small rocks or sand that may have passed into the lower region 434 of the container 412 from possibly clogging or damaging the valve 416.

Referring to FIGS. 35-38, there are shown various isometric views of the concrete mixing transport truck chute washout system of FIG. 31 on a pivoting rack system, with FIGS. 37 and 38 also showing an optional hood cover. More specifically, FIG. 35 is a front top isometric view of the concrete mixing transport truck chute washout system 410 of FIG. 31 on a pivoting rack system 500 with the washout system 410 positioned over a platform 502 of the rack 500, FIG. 36A is a rear top isometric view and FIG. 36B is a front top isometric view of the concrete mixing transport truck chute washout system 410 and rack 500 with the washout system 410 pivoted away from the platform 502 of the rack 500. The platform 502 will be attached to the rear of a concrete truck (not shown.) To provide for the pivot feature, the rack 500 has a pivot, e.g., a tubular portion 504, attached to an end wall 506 of the platform 502 of the rack 500. A washout system stand 508 upon which the washout system 410 is placed has a bracket 510 and a pivot rod 512 to pivotally connect the bracket 510 and tubular portion 504, with the platform 502 of the rack 500 thusly being suspended above the platform 502. The pivot rod 512 is preferably removably attached to the bracket 512 and tubular portion 504 for easy removable. Also, there are preferably more than one tubular portions 504 on the end wall 506 of the platform 502 so that the relative position of the washout system stand 508 can be changed and/or the pivot side of the platform 502 relative to the platform 502. A tubular portion 514 can optionally be mounted to the washout system stand 508 so that it is in alignment with a lock tubular portion 516 when a rod is inserted to join the tubular portion 514 and the lock tubular portion 516, such as to lock the washout system stand 508 in place over the platform 506. This is useful during movement of the concrete truck. The rack 500 includes a pair of spaced apart retention hooks 530 that extend above a back wall 532. The retention hooks 530 have curved over ends 534 that extend into the open mouth 444 of the concrete mixing transport truck chute washout system 410

Figure 36A:
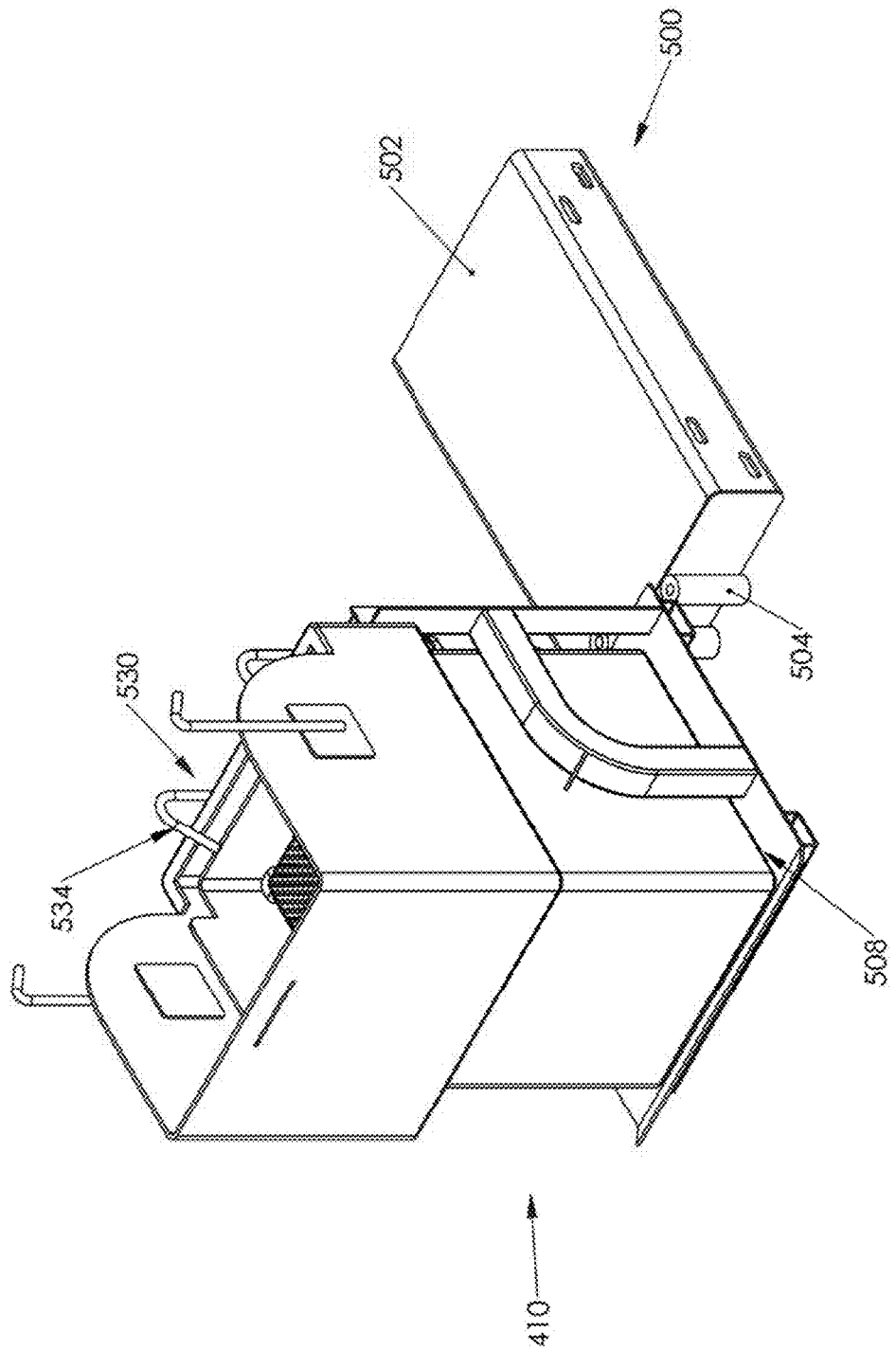
FIG. 36A is a rear top isometric view of the concrete mixing transport truck chute washout system and rack of FIG. 35 but with the washout system pivoted away from the platform of the rack.

Referring now to FIG. 37 and FIG. 38, which are a rear top and front top isometric view respectively of the concrete mixing transport truck chute washout system 410 and rack 500 of FIGS. 35-36A&B but equipped with an optional hood 540 for the washout system in an opened state and closed state, respectively. The hood 540 has holes 540 formed therein that are aligned to receive the curved over ends 534 of the retention hooks 530 on the back wall 532 of the rack 500. The hood 540 is shaped to cover the open top of the washout system 410 when the system is not in use, e.g., during transit or storage, and can be swung down on the hooks 530 when a user wishes to access the washout system 410. The hood 540 as shown is just one of many possible embodiments.

Figure 39A:
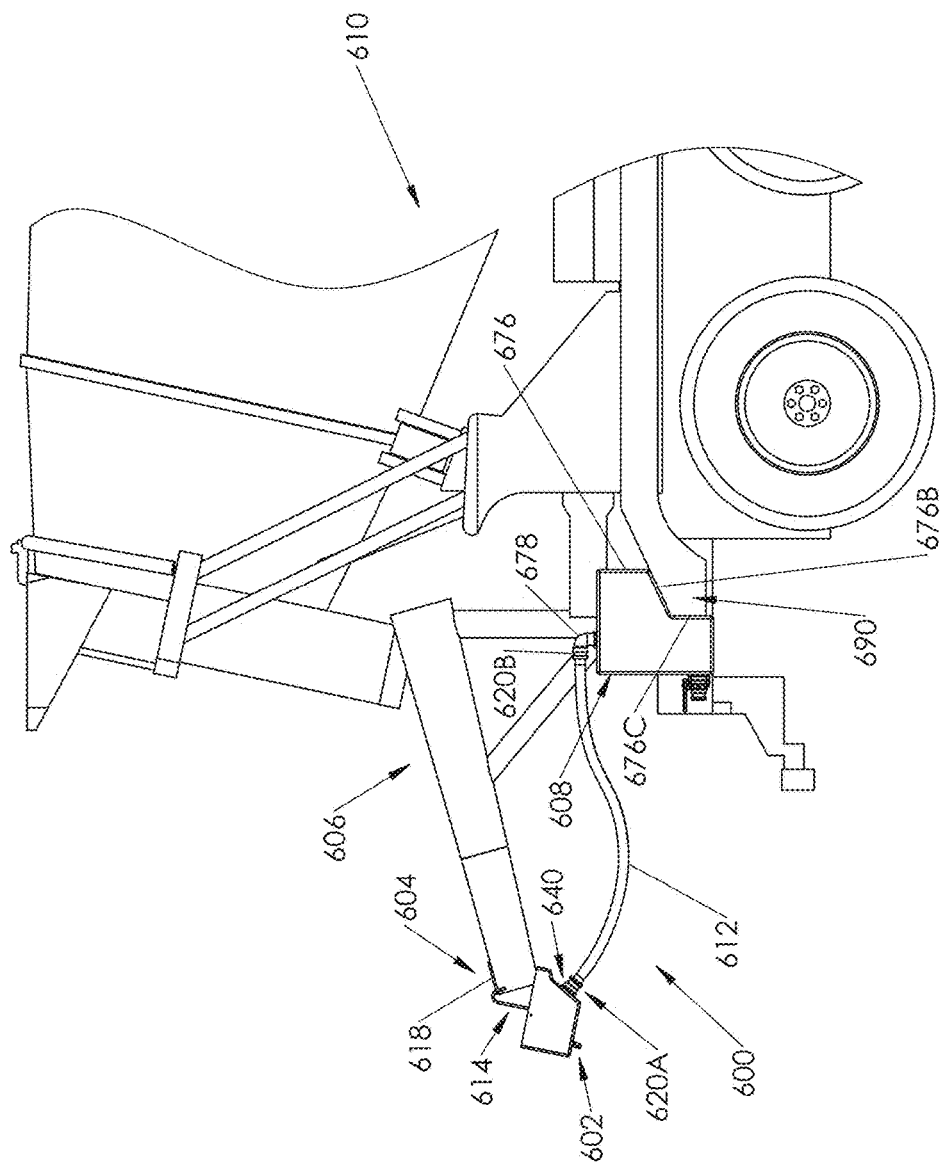
FIG. 39A is a side view of another exemplary embodiment of a concrete mixing transport truck chute washout system shown with an attached funnel container on the chute and a holding container mounted on a concrete mixing transport truck, with the funnel container and holding container interconnected with a material transport hose.

FIGS. 39A and 39B are views of another exemplary concrete mixing transport truck chute washout system 600 shown with an attached funnel container 602 on the exit end 604 of a chute 606 and a holding container 608 mounted on a concrete mixing transport truck 610, with the funnel container 602 and the holding container 608 interconnected with a material transport hose 612. The funnel container 602 has attachments 614 used to suspend an open mouth 616 of the funnel container 602 below the exit end 604 of the chute 606. The attachments 614 can be in the form of a pair suspension hooks 614, which suspension hooks 614 engage with hanging plates 618 on the exit end 604 of the chute 606. The material transport hose 612 has connection ends 620A and 620B which detachably connect to a material outlet connector 640 on the funnel container 602 and a material inlet connector 670 on the holding container 608, respectively.

Figure 40A:
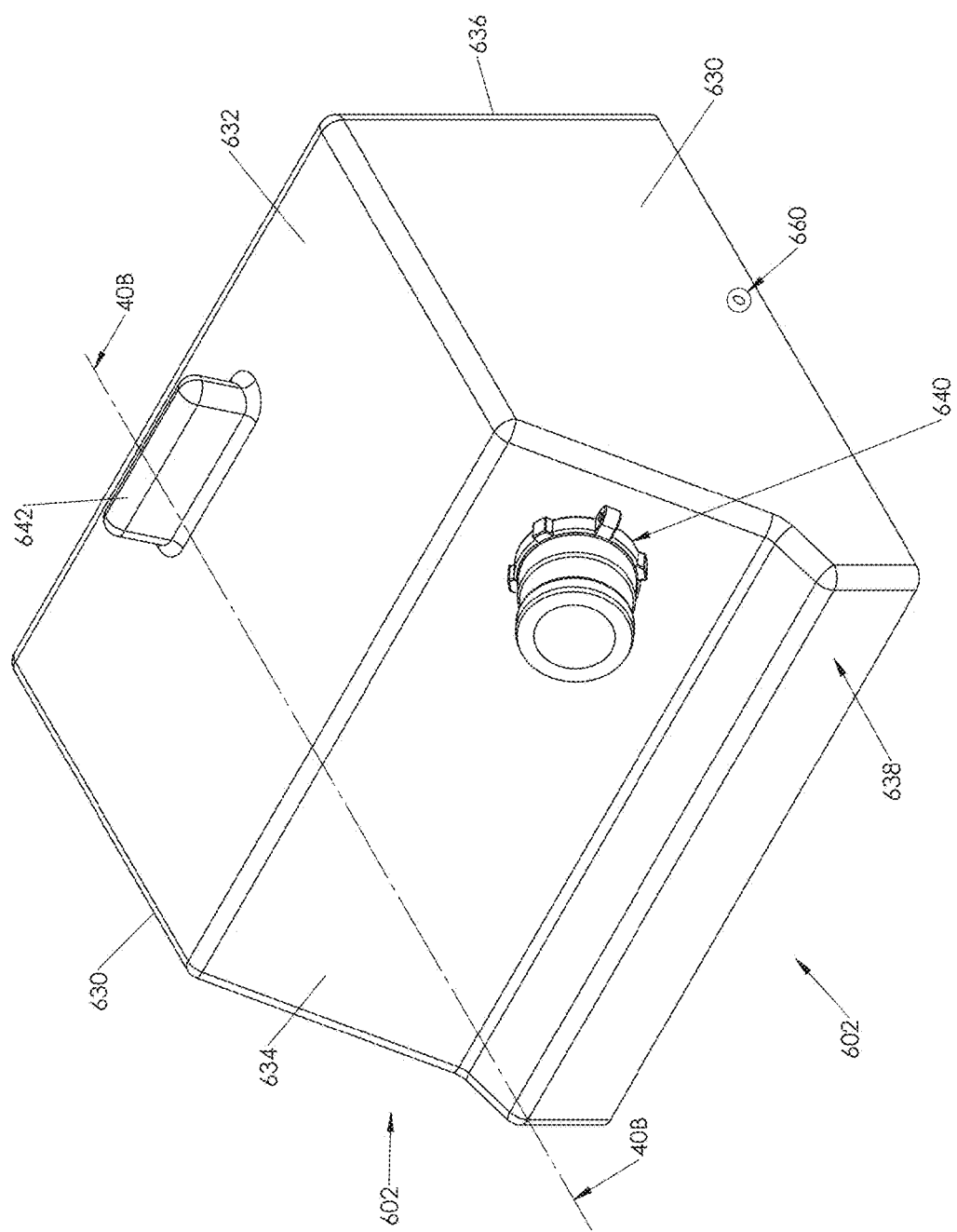
FIG. 40A is a bottom isometric view of the chute mountable funnel container of the exemplary concrete mixing transport truck chute washout system of FIGS. 39A and 39B.
Figure 40B:
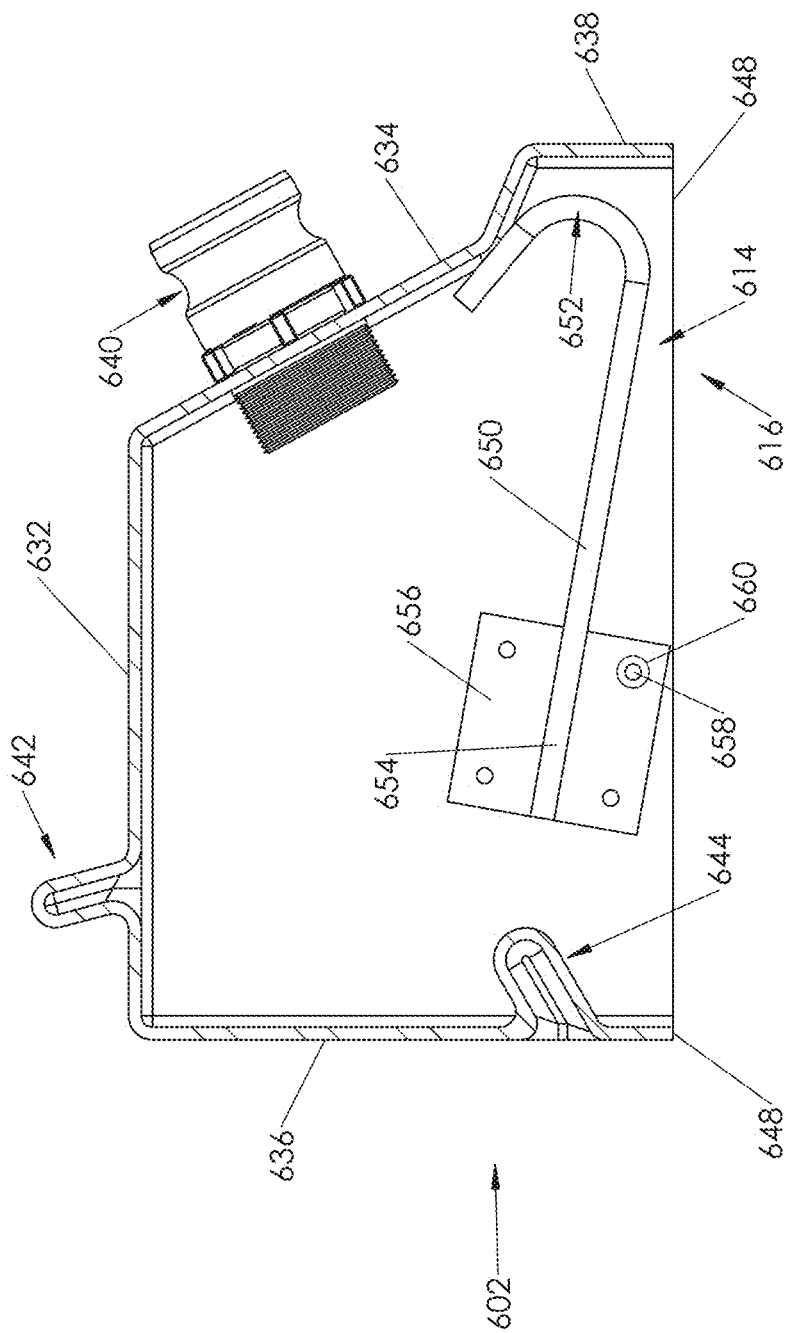
FIG. 40B is a cross-sectional view through view lines 40B-40B of FIG. 40A of the chute mountable funnel container.
Figure 40C:
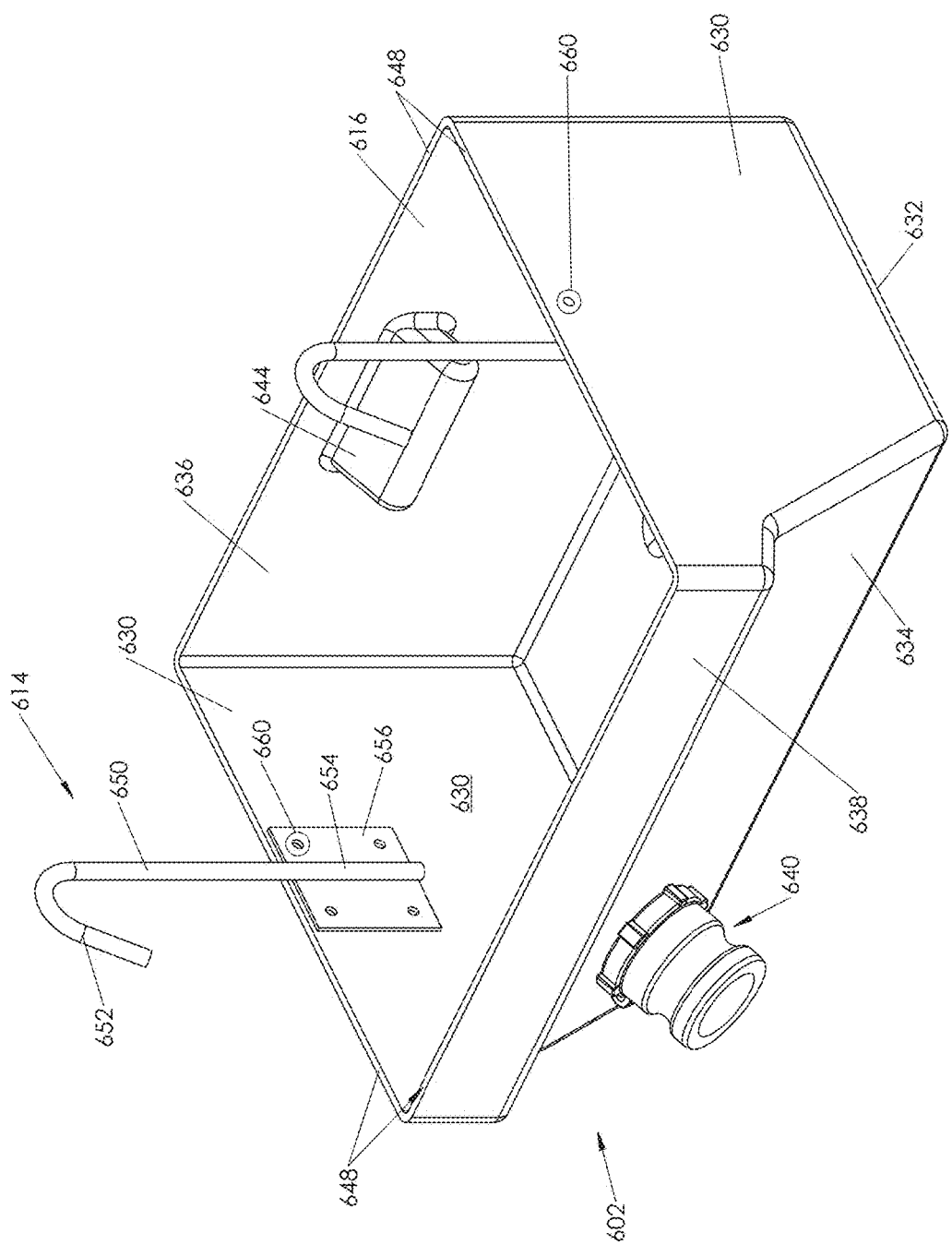
FIG. 40C is a top isometric view of the chute mountable funnel container of FIG. 40A.

FIGS. 40A-D are views of the chute mountable funnel container 602. The chute mountable funnel container 602 has opposite side walls 630, a bottom wall 632, a front wall 634, a back wall 636, and an optional lip wall 638 that continues from the front wall 634. A material outlet connector 640 is preferably located on the front wall 634. The funnel container 602 has an open mouth 616, and an upper seating rim 648 defined by upper edges of the side walls 630, the back wall 636, and the lip wall 638A. In embodiments of the funnel container 602 where there is no lip wall 638 and the front wall 634 is continuous, the upper seating rim 648 will likewise extend to the top edge of the front wall 634. A bottom handle grip 642 preferably extend downwardly and outwardly from the bottom wall 634, and a back wall handle grip 644 preferably extends inwardly from the back wall 636. The bottom handle grip 642 and the back wall handle grip 644 will provide convenient handholds for use in handling the chute mountable funnel container 602. The front wall 634 is preferably slated relative to the bottom wall 632. Each of the two attachments 614 are preferably rotatably mounted to one of the two opposite side walls 630 and include a rod 650 having a distal hook end 652 and a proximal end 654 attached to a plate 656. The plate 656 includes at least one pivot hole 658. A rivet or bolt and nut 660 is used to rotatably mount the plate 656 of the attachment 614 to the side wall 630. Thus, the attachments 614 can be rotated from their retracted positions, as shown in FIGS. 40A-B, to their deployed positions, as shown in FIGS. 39A-B and FIG. 40C-D. The chute mountable funnel container 602 is preferably made of high strength yet corrosion resistant material, such as plastics including nylon, polypropylene, etc., or can be made of metal.

Figure 41A:
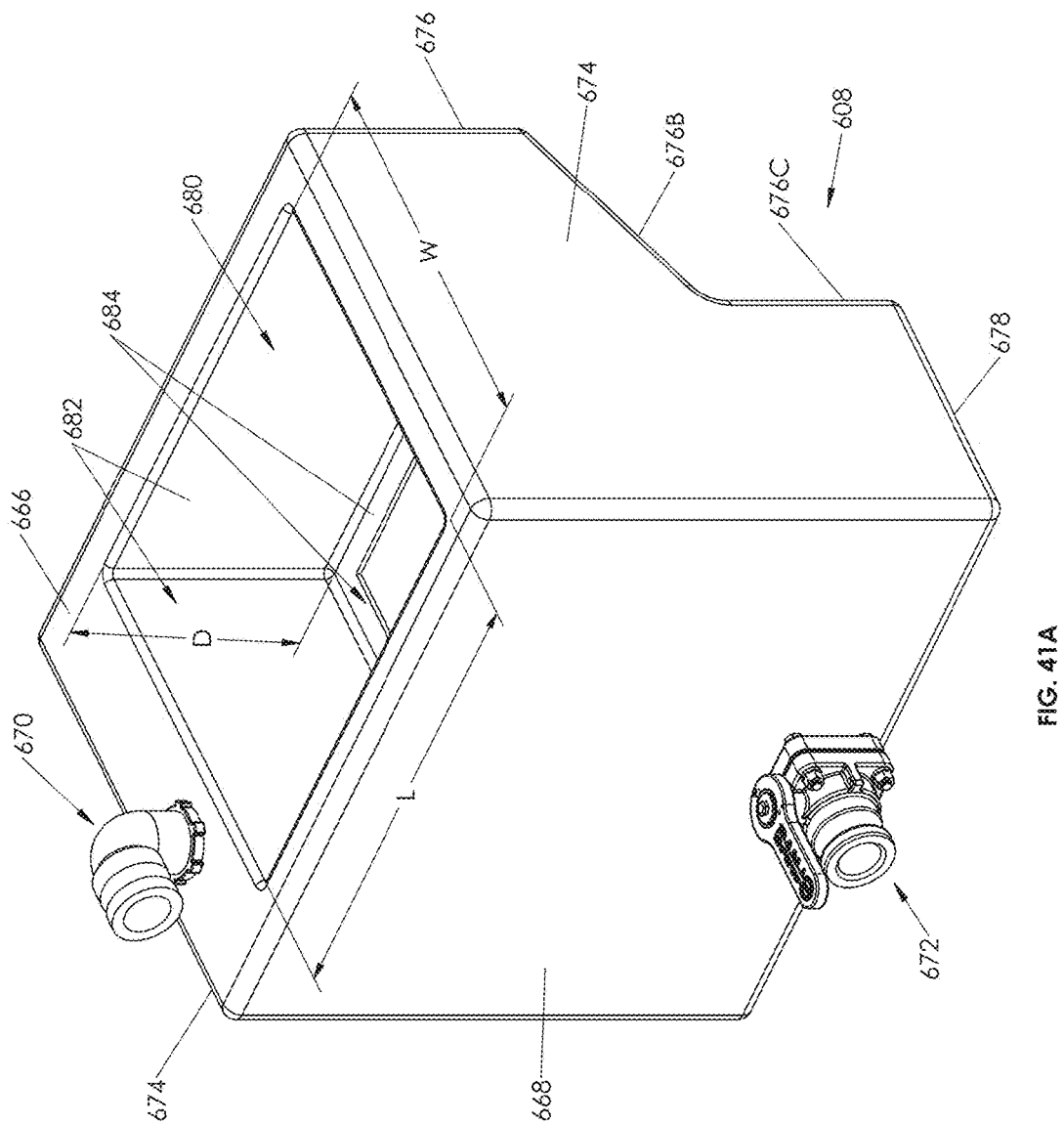
FIG. 41A is a top front isometric view of the holding container of the exemplary concrete mixing transport truck chute washout system of FIGS. 39A and 39B.
Figure 41C:
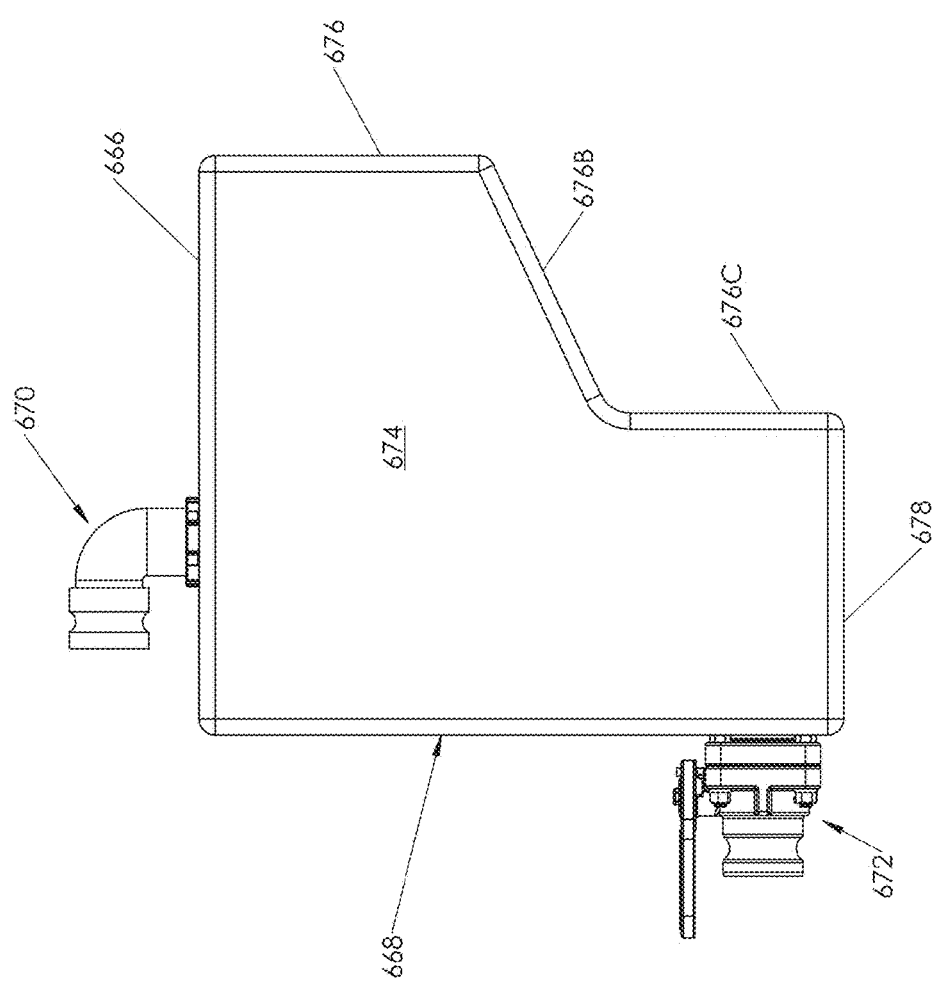
FIG. 41C is a side view of the holding container of FIG. 41A.
Figure 42A:
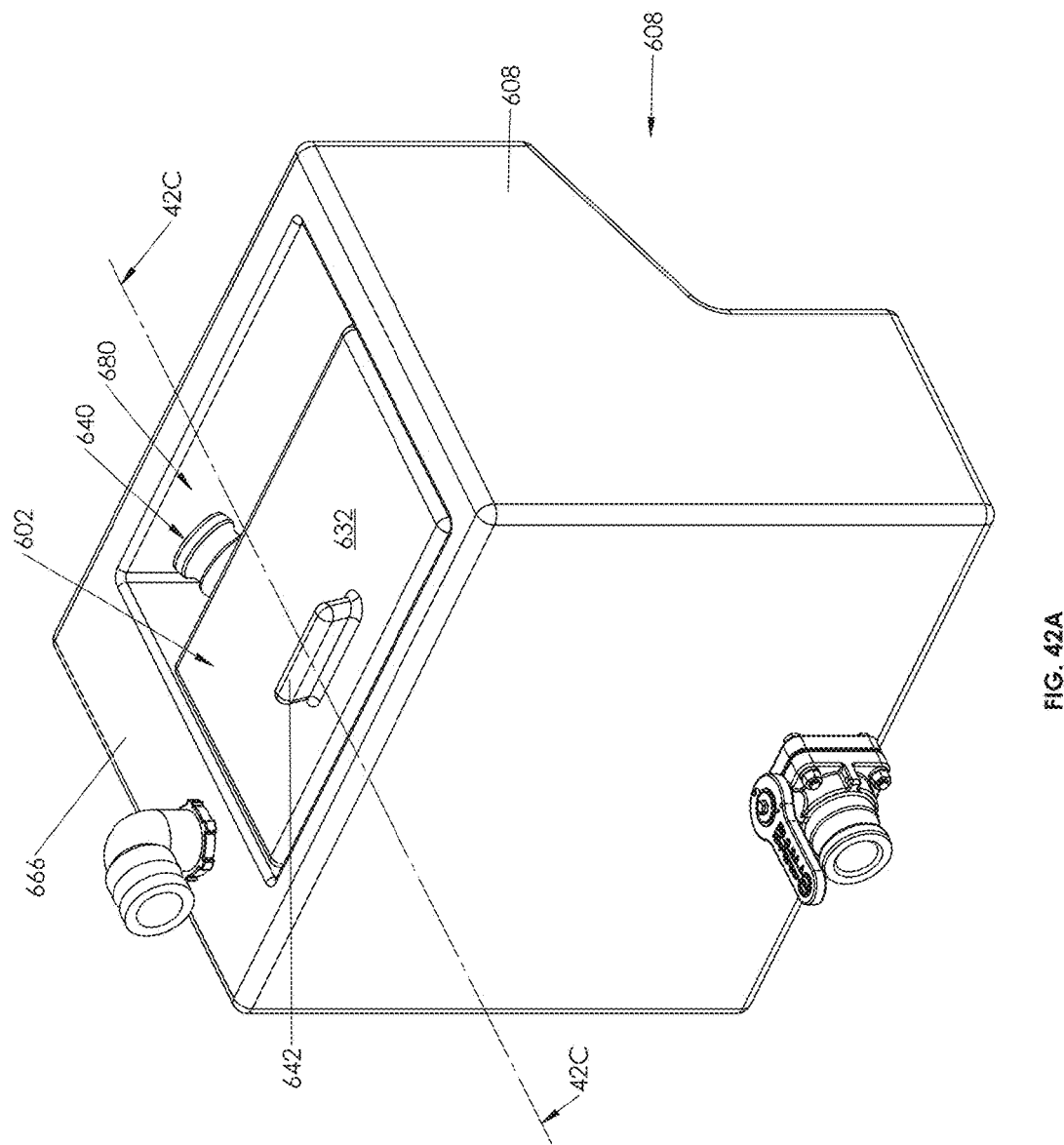
FIG. 42A is a top front isometric view of the holding container of the exemplary concrete mixing transport truck chute washout system of FIG. 39A, with the funnel container in its storage and transportation position placed in the well of the holding container.
Figure 42B:
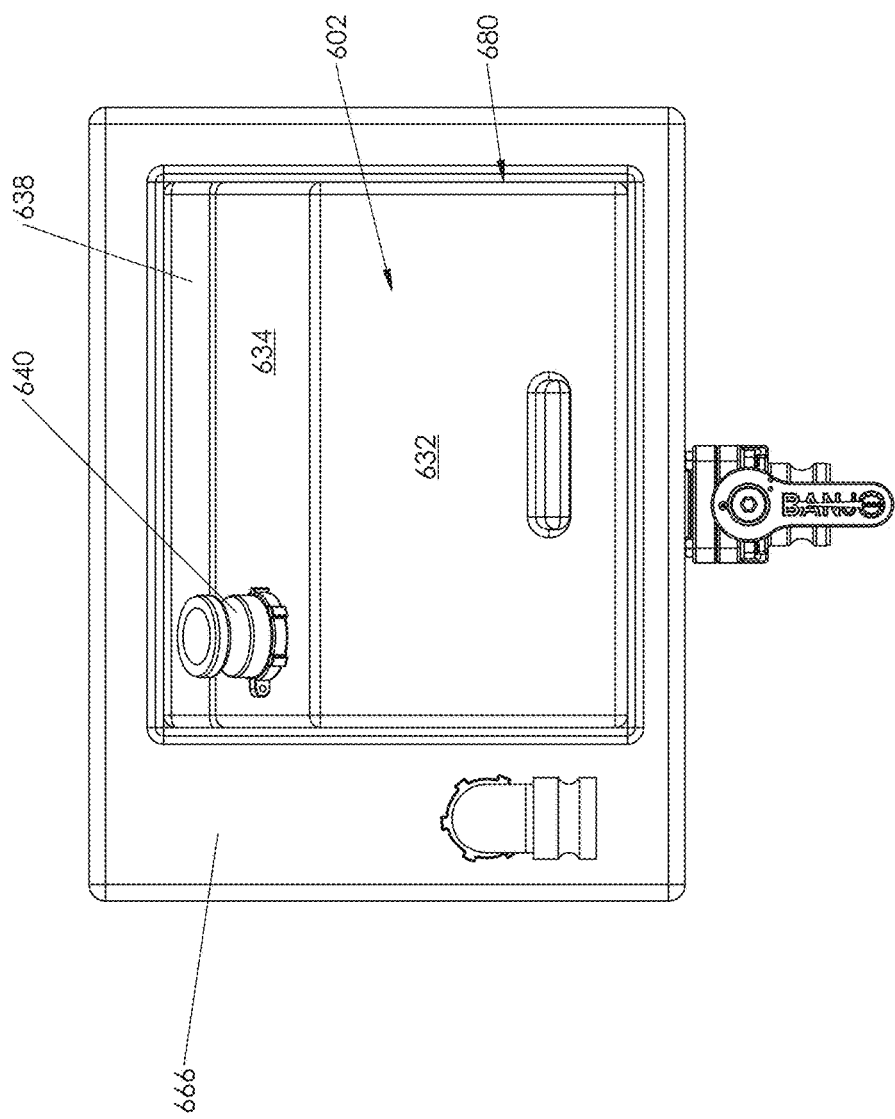
FIG. 42B is a top view of the holding container and the funnel container of FIG. 42A.

FIGS. 41A-C are views of the holding container 608 of the exemplary concrete mixing transport truck chute washout system 600 of FIGS. 39A and 39B. The holding container 608 has a top wall 666 into which the inlet connector 670 is mounted, a front wall 668 into which a drain valve 672 is connected, two opposite side walls 674, a back wall 676, and a bottom wall 678. The top wall preferably contains a well 680 with surrounding walls 682 and a bottom rim 684. As best shown in FIGS. 42A and 42B, the well 680 is sized to receive the funnel container 602 when not in use and for storage and transportation. The well 680 defines an opening having a length L and a width W, and the well 680 has a depth D. The well 680 defining a space that is sized to receive the funnel container 602, with the upper rim 648 of the funnel container 602 adapted to seat on the bottom rim 684, which prevents the funnel container 602 from falling below the well 680 and which help prevent liquid in the holding container 608 from splashing out of the holding container 608. The back wall 676 need not be a continuous flat plan, indeed, as shown, it can include an intermediate slanted portion 676B and a lower portion 676C. With this shape, an upper portion of the holding container 608 is wider than a lower portion, and thus the holding container 608 will conform closely with a rear section 690 of the truck, as shown in FIG. 39A. However, the precise shape of the holding container 608 can otherwise be modified as desired.

In use of the exemplary concrete mixing transport truck chute washout system 600, after completing a concrete pour job, the funnel container 602 is hung with its attachments 614 below the exit end 604 of the chute 606 as shown in FIGS. 39A and 39B, and the material transport hose 612 with its connection ends 620A and 620B are connected to the material outlet connector 640 on the funnel container 602 and an inlet connector 670 on the holding container 608, respectively. The drain valve 672 is closed, and the operator will rinse off the concrete truck and chute so that concrete water and materials (e.g., rock, sand, gravel, etc.) will be washed into the open mouth 616 of the funnel container 602, will pass out of the material outlet connector 640, though the material transport hose 612, into the inlet connector 670, and into the holding container 608. After the cleaning is completed, the funnel container 602 is removed from the chute 604 and its attachment hooks 614 are rotated from their extended position shown in FIGS. 39A-B and FIGS. 40C-D, to their retracted position shown in FIGS. 40A-B. In their deployed position, the attachment hooks 614 extend above the upper rim 648 of the funnel container 602, and in its storage position, the attachment hooks 614 are positioned not to extend above the upper rim 648 of the funnel container 602.

FIGS. 42A and 42B are views showing the funnel container 602 in its storage and transportation position wherein it is placed in the well 680 of the holding container 608. In this position, the bottom wall 632 of the funnel container 602 will be generally flush top wall 666 of the holding container 608, with the handle 642 extending above the top wall 666 of the holding container 608 and with the material outlet connector 640 also being contained in the well 680. The upper rim 684 of the funnel container 602 will rest on the bottom rim 684 of the well 680 to prevent the funnel container 602 from dropping down below the well 680. Various other features of the funnel container 602 and the holding container as shown as described above with respect to these features.

Figure 43B:
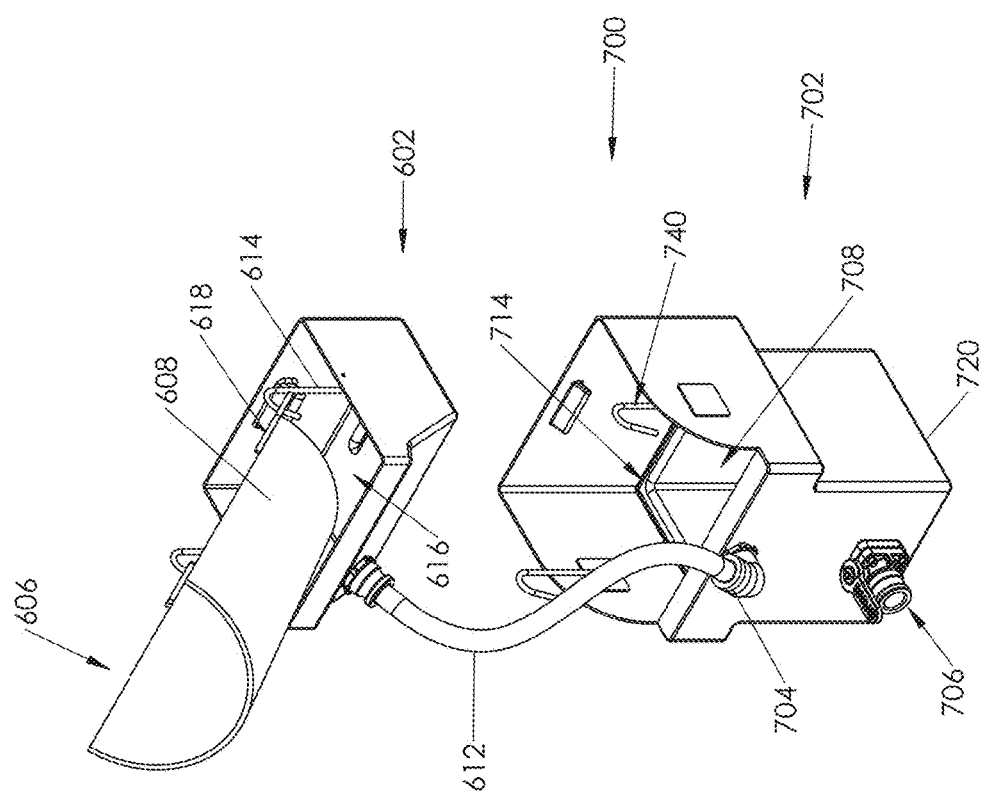
FIG. 43B is an isometric top side view of the system of FIG. 43A.
Figure 44B:
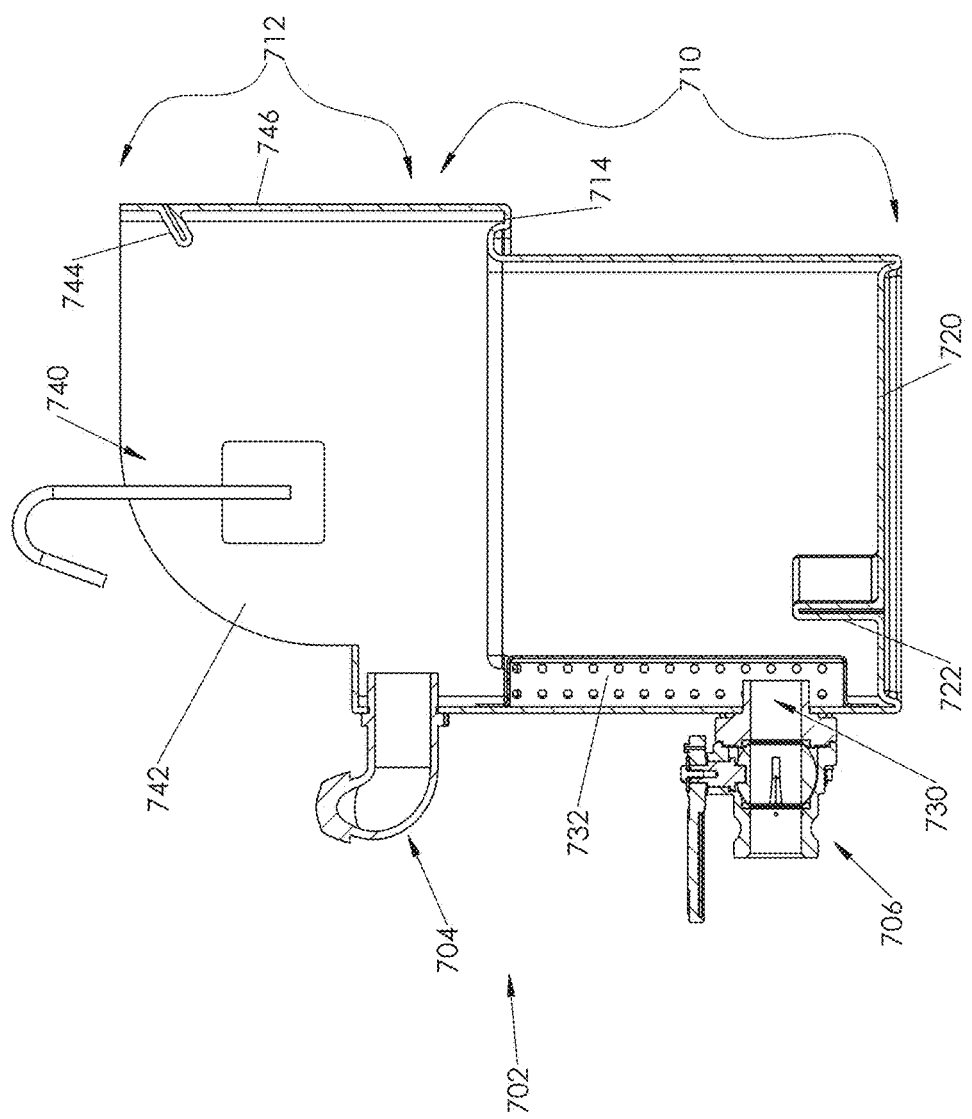
FIG. 44B is a cross-sectional view through view lines 44B-44B of the holding container of FIG. 44A.
Figure 44C:
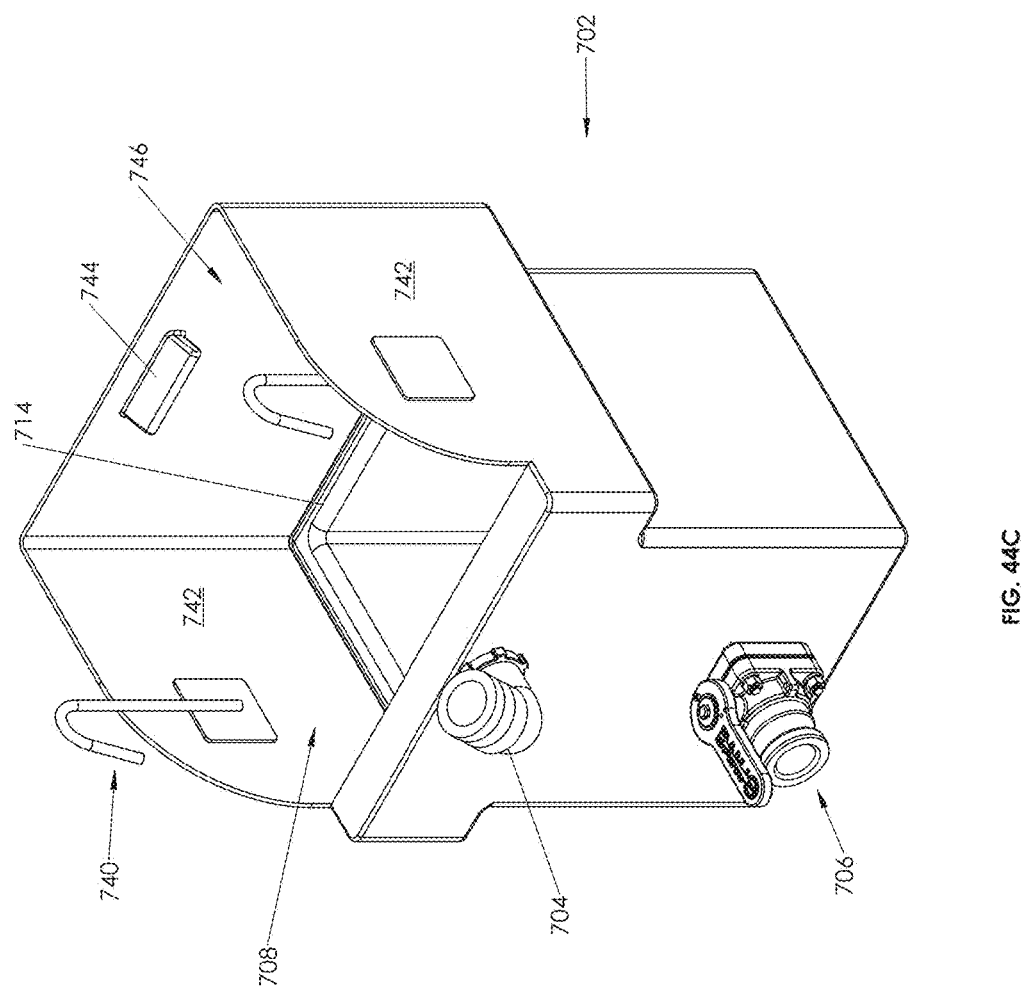
FIG. 44C is a front top isometric view of the holding container of FIG. 44A.
Figure 44D:
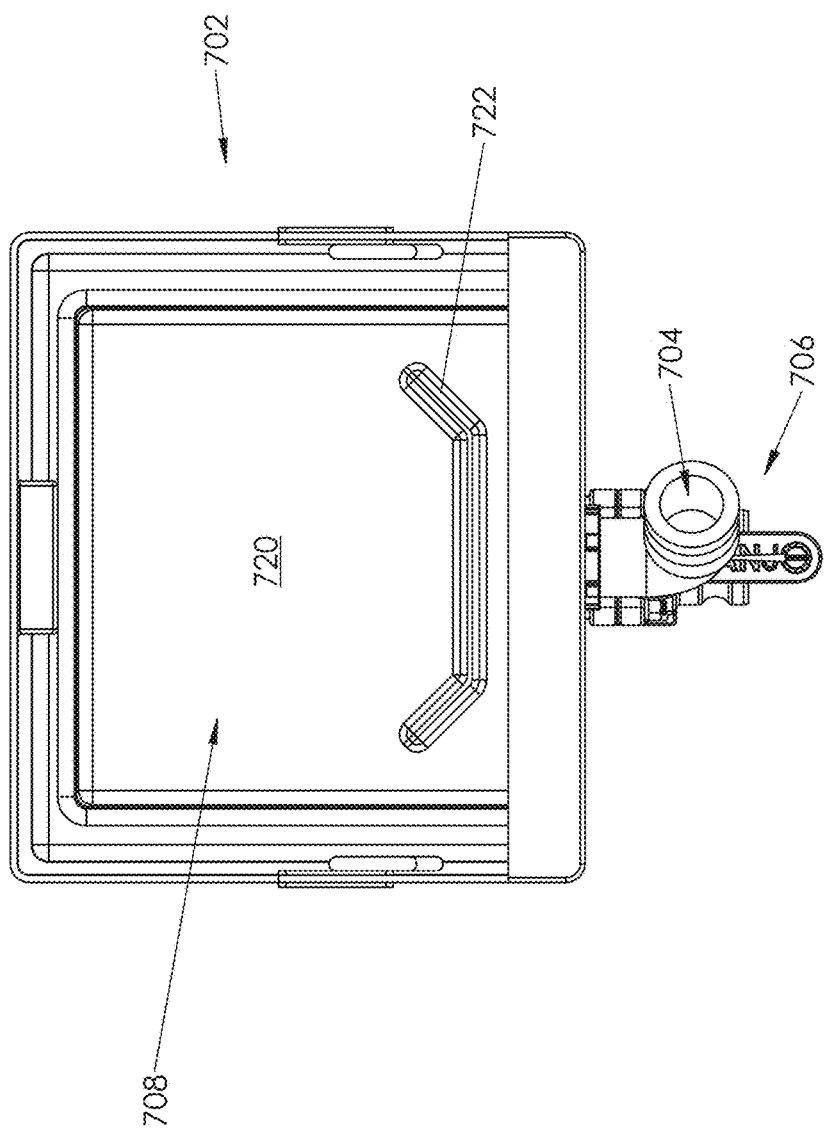
FIG. 44D is a top view of the holding container of FIG. 44A.

FIG. 43A-B are views of an exemplary embodiment of another concrete mixing transport truck chute washout system 700 of invention with an alternate holding container 702 but having the same funnel container 602 as described with reference to FIGS. 39A-B and 40A-D, hung on the exit end 604 of the chute 606 using hooks 614 that engage with the hanging plates 618, and interconnected together with the material transport hose 612. The holding container 702 is very similar to the container unit 12 show and described with respect to FIGS. 1 and 2, with the exception that no tray 14 is used, and that there is a material inlet connector 704 located near its open mouth 708. A drain valve 706 is located near a bottom wall 720 of the holding container.

Figure 45C:
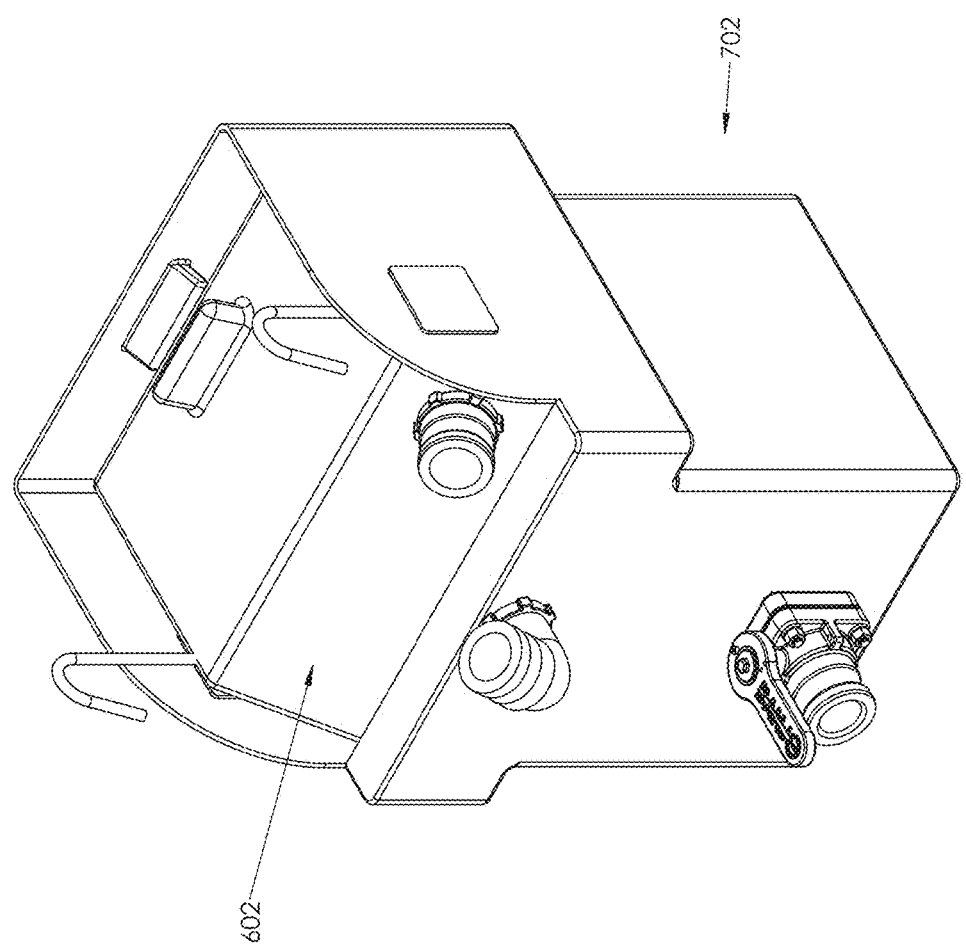
FIG. 45C is a front top isometric view of holding container and funnel container of FIG. 45A.

FIGS. 44A-D are views of the holding container 702. The holding container 702 has a lower portion 710 and an upper portion 712, with a retention rim 714 that will hold the funnel container 602 when placed in open mouth 708, as shown in FIGS. 45A-C. The holding container 702 has a bottom wall 720 and extended upwardly from the bottom wall 720 is a blocking wall 722 in the vicinity of the drain valve 706. The blocking wall 722 will aid in preventing debris from reaching an inlet 730 of the drain valve 706. Further protecting the inlet 730 of the drain valve 706 is a particle filter 732, which can comprise a metal plate perforated with small holes. Thus, while concrete water and some small particles may be allowed to egress out through the outlet drain 706, the blocking wall 722 and particle filter 732 will block the passage of larger particles. Such larger particles and materials can be dumped out separated after the water is drained from the holding container 702. The holding container 702 optionally includes a pair of hanging hooks 740 positioned on opposite side walls 742 of the upper area 712 which optionally allow the holding container 702 itself to be hung at the exit end 604 of the chute 606 if desired. A handle grip 744 extends inwardly from a back wall 746 of the upper area 712. The open mouth 708 and the retention rim 714 are adapted to receive and hold in place the funnel container 602 when it is not in use and in its storage and transportation mode, as is best shown in FIGS. 45A-C below.

FIGS. 45A-C are views of the holding container 702 of FIG. 44A with the funnel container 602 of FIGS. 40A-40D placed in the open mouth 708 of the holding container 702.

In this position, the upper seating rim 648 of the funnel container 602 will rest on the retention rim 714 of the holding container 702 and thereby close off the open mouth, and thus act as a lid, and prevent any contents of the holding container from splashing out during travel of the concrete truck.

While the washout systems 10, 410, 600, and 700 are shown equipped with drainage valves 16, 416, 672, and 706, for certain uses where no supplemental holding tanks are required, drainage valves need not be included in the system, and the container units 12, 412, 608, and 702 can be closed off. Once returned to the concrete mixing facility, the collected water can be drained by first removing the trays holding any solid debris and then dumping out the water collected in the container units.

The preferred embodiments of this invention have been disclosed, however, so that one of ordinary skill in the art would recognize that certain modifications would come within the scope of this invention.

What is claimed is:

1. A dual container concrete mixing transport truck chute washout system, comprising:
    a chute attachable funnel container having an open mouth with an upper rim, an attachment for detachably attaching the funnel container below an exit end of a concrete truck concrete chute, and a material outlet connector to drain liquid and debris from the funnel container; and
    a truck mountable holding container having an upper space that is adapted to store the funnel container when the funnel container is not affixed to the chute, a lower portion for collection of fluid and solid materials, a seat, a material inlet connector, and a fluid drain valve for draining fluid from the holding container, wherein the upper rim of the funnel container is adapted to sit on the seat of the holding container to act as a lid.

2. The dual container concrete mixing transport truck chute washout system of claim 1, wherein the funnel container comprises a pair of opposing side walls, a back wall, a front wall, and a bottom wall, the tops of the opposing side walls, the front wall, and the back wall terminating in the upper rim, wherein the attachment comprises a pair of hooks, one hook each being mounted to each of the opposing side walls.

3. The dual container concrete mixing transport truck chute washout system of claim 2, wherein one hook each is rotatably mounted to each opposing side wall, and wherein in a deployed position, the hooks extend above the upper rim of the funnel container, and in a storage position, the hooks extend below the upper rim of the funnel container.

4. The dual container concrete mixing transport truck chute washout system of claim 2, wherein the funnel container contains at least one of a back wall grip handle intending inwardly from the back wall and/or a bottom wall grip handle intending outwardly from the bottom wall.

5. The dual container concrete mixing transport truck chute washout system of claim 1, further comprising a material transportation hose connectable between the material outlet connector on the funnel container and the material inlet connector on the holding container.

6. The dual container concrete mixing transport truck chute washout system of claim 1, wherein the upper portion of the holding container has a top wall with a well formed therein, the well defining an opening having a length and a width, and having perimeter side walls that extend downwardly into the holding container from the top wall, the perimeter side walls terminating in the seat comprising a bottom rim that extends inwardly from the perimeter side walls, the well defining a space that is sized to receive the funnel container, wherein upper rim of the funnel container seats on the bottom rim and prevents the funnel container from falling below the well and help to prevent any material collected in the holding container from splashing out of the holding container, and wherein the material inlet connector is position on the top wall of the holding container, and the fluid drain valve is positioned on the holding container near the bottom wall.

7. The dual container concrete mixing transport truck chute washout system of claim 6, wherein in the holding container, a blocking wall extends upwardly from the bottom wall in front of a fluid entrance of the fluid drain valve, and wherein a filter is positioned in front of the fluid entrance of the fluid drain valve.

8. The dual container concrete mixing transport truck chute washout system of claim 1, wherein the upper portion of the holding container is in fluid communication with the lower portion, the upper portion having an open mouth, a front wall, two opposite side walls, and a rear wall, wherein the rear wall is taller than the front wall and wherein the upper portion of the holding container unit has a larger cross-sectional area than the cross-sectional area of the lower portion of the holding container.

9. A dual container concrete mixing transport truck chute washout system, comprising:
    a chute attachable funnel container having a pair of opposing side walls, a back wall, a front wall, and a bottom wall, the tops of the opposing side walls, the back wall, and the front wall terminating in an upper rim which defines an open mouth, a pair of hooks, one hook each being mounted to each of the opposing side walls the hooks being for detachably attaching the funnel container below an exit end of a concrete truck concrete chute, and a material outlet connector to drain liquid and debris from the funnel container; and
    a truck mountable holding container having an upper portion that is adapted to store the funnel container when the funnel container is not affixed to the chute, a lower portion for collection of fluid and solid materials, a seat, a material inlet connector, and a fluid drain valve for draining fluid from the holding container, wherein the upper rim of the funnel container is adapted to sit on the seat of the holding container to act as a lid.

10. The dual container concrete mixing transport truck chute washout system of claim 9, wherein one hook each is rotatably mounted to each opposing side wall, and wherein in a deployed position, the hooks extend above the upper rim of the funnel container, and in a storage position, the hooks extend below the upper rim of the funnel container.

11. The dual container concrete mixing transport truck chute washout system of claim 9, wherein the funnel container contains at least one of a back wall grip handle intending inwardly from the back wall and/or a bottom wall grip handle intending outwardly from the bottom wall.

12. The dual container concrete mixing transport truck chute washout system of claim 9, further comprising a material transportation hose connectable between the material outlet connector on the funnel container and the material inlet connector on the holding container.

13. The dual container concrete mixing transport truck chute washout system of claim 9, wherein the upper portion of the holding container has a top wall with a well formed therein, the well defining an opening having a length and a width, and having perimeter side walls that extend downwardly into the holding container from the top wall, the perimeter side walls terminating in the seat comprising a bottom rim that extends inwardly from the perimeter side walls, the well defining a space that is sized to receive the funnel container, wherein upper rim of the funnel container seats on the bottom rim and prevents the funnel container from falling below the well and help to prevent any material collected in the holding container from splashing out of the holding container, and wherein the material inlet connector is position on the top wall of the holding container, and the fluid drain valve is positioned on the holding container near the bottom wall.

14. The dual container concrete mixing transport truck chute washout system of claim 13, wherein in the holding container, a blocking wall extends upwardly from the bottom wall in front of a fluid entrance of the fluid drain valve, and wherein a filter is positioned in front of the fluid entrance of the fluid drain valve.

15. The dual container concrete mixing transport truck chute washout system of claim 9, wherein the upper portion of the holding container is in fluid communication with the lower portion, the upper portion having an open mouth, a front wall, two opposite side walls, and a rear wall, wherein the rear wall is taller than the front wall and wherein the upper portion of the holding container unit has a larger cross-sectional area than the cross-sectional area of the lower portion of the holding container.

\* \* \* \* \*